US011284005B2

(12) United States Patent
Hao

(10) Patent No.: US 11,284,005 B2
(45) Date of Patent: Mar. 22, 2022

(54) VIDEO PROCESSING METHOD AND APPARATUS, TERMINAL DEVICE, AND STORAGE MEDIUM

(71) Applicant: BEIJING MICROLIVE VISION TECHNOLOGY CO., LTD, Beijing (CN)

(72) Inventor: Yipeng Hao, Beijing (CN)

(73) Assignee: BEIJING MICROLIVE VISION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/021,123

(22) Filed: Sep. 15, 2020

(65) Prior Publication Data

US 2020/0412976 A1  Dec. 31, 2020

Related U.S. Application Data

(63) Continuation of application No. PCT/CN2018/124758, filed on Dec. 28, 2018.

(30) Foreign Application Priority Data

Jul. 19, 2018 (CN) .......................... 201810797693.X

(51) Int. Cl.
*H04N 5/232* (2006.01)
*H04N 5/262* (2006.01)

(52) U.S. Cl.
CPC ... *H04N 5/232935* (2018.08); *H04N 5/23245* (2013.01); *H04N 5/2621* (2013.01)

(58) Field of Classification Search
CPC ......... H04N 5/232935; H04N 5/23245; H04N 5/2621; H04N 5/772; H04N 1/2112; H04N 5/907; H04N 2101/00; H04N 5/77
(Continued)

(56) References Cited

U.S. PATENT DOCUMENTS

2010/0260472 A1* 10/2010 Okada .................... H04N 5/915
386/343
2012/0308209 A1* 12/2012 Zaletel ................. G11B 31/006
386/278
(Continued)

FOREIGN PATENT DOCUMENTS

CN   103702041 A   4/2014
CN   105812665 A   7/2016
(Continued)

OTHER PUBLICATIONS

International Search Report and Written Opinion dated Apr. 1, 2019 for PCT Patent Application PCT/CN2018/124758.
(Continued)

*Primary Examiner* — Thai Q Tran
*Assistant Examiner* — Nienru Yang
(74) *Attorney, Agent, or Firm* — Thomas Horstemeyer, LLP

(57) ABSTRACT

Provided are a video processing method and apparatus, a terminal device and a storage medium. The method includes: acquiring a video capturing mode instruction and a video capturing instruction; performing video capturing on a target scene according to the video capturing instruction until a video capturing pause instruction is acquired, and obtaining a corresponding video segment; determining whether to adjust the video segment according to the video capturing mode instruction and obtaining a corresponding target video segment; if a video generation instruction is not acquired, repeatedly acquiring the video capturing mode instruction, the video capturing instruction and the video capturing pause instruction to obtain a corresponding target video segment until the video generation instruction is acquired; and generating a target video according to an existing target video segment.

20 Claims, 36 Drawing Sheets

(58) Field of Classification Search
USPC .......................................................... 386/224
See application file for complete search history.

(56) References Cited

U.S. PATENT DOCUMENTS

| | | | |
|---|---|---|---|
| 2015/0318020 A1* | 11/2015 | Pribula | ................ H04N 9/8205 386/227 |
| 2018/0160031 A1 | 6/2018 | Hoshino | |
| 2018/0198984 A1 | 6/2018 | Palma et al. | |

FOREIGN PATENT DOCUMENTS

| | | | |
|---|---|---|---|
| CN | 106254776 A | 12/2016 |
| CN | 106303238 A | 1/2017 |
| CN | 107155068 A | 9/2017 |
| CN | 108200477 A | 6/2018 |
| CN | 108900771 A | 11/2018 |

OTHER PUBLICATIONS

1st Search Report dated Mar. 15, 2019 for Chinese Patent Application No. 201810797693.X.
1st Office Action dated Mar. 26, 2019 for Chinese Patent Application No. 201810797693.X.
1st Office Action dated Sep. 3, 2019 for Chinese Patent Application No. 201810797693.X.

* cited by examiner

VIDEO PROCESSING METHOD AND APPARATUS, TERMINAL DEVICE, AND STORAGE MEDIUM

CROSS REFERENCE TO RELATED APPLICATIONS

This is continuation of International Patent Application No. PCT/CN2018/124758, filed on Dec. 28, 2018, which is based on and claims priority to Chinese Patent Application No. 201810797693.X filed with the CNIPA on Jul. 19, 2018, disclosures of which are incorporated herein by reference in their entireties.

TECHNICAL FIELD

Embodiments of the present disclosure relate to the field of communications and, for example, to a video processing method and apparatus, a terminal device and a storage medium.

BACKGROUND

With the development of communication technology and terminal devices, a variety of terminal devices, such as a mobile phone and a tablet computer, have become an indispensable part of people's work and life. Moreover, with the increasing popularity of the terminal device, the video capturing function provided by the terminal device has also brought great convenience to the user.

If a video is captured by using the terminal device, a video obtained in one shoot is a complete video. However, if the user wants to splice or edit videos obtained by capturing multiple times, a special video processing software is required to perform the processing. Meanwhile, all captured videos are at a normal speed, so that if a faster-captured video or a slower-captured video is desired, all the captured videos at the normal speed need to be post-processed, for example, to be processed through the special video processing software. The above manner has a relatively high technical threshold on operation, which is not conducive to a daily use of the user and affects a user experience.

SUMMARY

Embodiments of the present disclosure provide a video processing method and apparatus, a terminal device and a storage medium, so as to improve flexibility for a user in capturing and processing a video and improve a user experience.

An embodiment of the present disclosure provides a video processing method, and the method includes steps described below.

A video capturing mode instruction and a video capturing instruction are acquired.

Video capturing is performed on a target scene according to the video capturing instruction until a video capturing pause instruction is acquired, and a video segment between the video capturing instruction and the video capturing pause instruction is obtained.

Whether to adjust the video segment is determined according to the video capturing mode instruction and a corresponding target video segment is obtained, where a target video segment in a different video capturing mode corresponds to a different number of video frames in unit time.

Whether a video generation instruction is acquired is determined.

In response to determining that the video generation instruction is not acquired, the video capturing mode instruction, the video capturing instruction and the video capturing pause instruction are repeatedly acquired to obtain a corresponding target video segment until the video generation instruction is acquired.

A target video is generated according to an existing target video segment.

An embodiment of the present disclosure further provides a video processing method, and the method includes steps described below.

A selection operation on a video capturing mode control and a triggering operation on a video capturing control of a target interface are detected.

A target scene is displayed on the target interface until a release operation on the video capturing control is detected, a corresponding target video segment is stored according to a video capturing mode determined by the video capturing mode control, and the video capturing mode control and the video capturing control are displayed on the target interface, where a target video segment in a different video capturing mode corresponds to a different number of video frames in unit time.

Whether a triggering operation on a next-step control of the target interface is detected is determined.

In response to determining that the triggering operation on the next-step control of the target interface is not detected, the step of storing the corresponding target video segment according to the video capturing mode determined by the video capturing mode control, in response to detecting the selection operation on the video capturing mode control, the triggering operation on the video capturing control, and the release operation on the video capturing control, is repeated until the triggering operation on the next-step control of the target interface is detected.

A video storage interface is jumped to and a result that an existing target video segment is synthesized to obtain a target video is displayed.

An embodiment of the present disclosure further provides a video processing apparatus, and the apparatus includes an instruction acquisition module, a video segment generation module, a target video segment generation module, a video generation instruction determination module, a video generation instruction acquisition module, and a target video generation module.

The instruction acquisition module is configured to acquire a video capturing mode instruction and a video capturing instruction.

The video segment generation module is configured to perform video capturing on a target scene according to the video capturing instruction until a video capturing pause instruction is acquired, and obtain a video segment between the video capturing instruction and the video capturing pause instruction.

The target video segment generation module is configured to determine whether to adjust the video segment according to the video capturing mode instruction and obtain a corresponding target video segment, where a target video segment in a different video capturing mode corresponds to a different number of video frames in unit time.

The video generation instruction determination module is configured to determine whether a video generation instruction is acquired.

The video generation instruction acquisition module is configured to: in response to determining that the video generation instruction is not acquired, repeatedly acquire the video capturing mode instruction, the video capturing instruction and the video capturing pause instruction to obtain a corresponding target video segment until the video generation instruction is acquired.

The target video generation module is configured to generate a target video according to an existing target video segment.

An embodiment of the present disclosure further provides a video processing apparatus, and the apparatus includes a selection and triggering operation detection module, a target video segment storage module, a next-step control triggering determination module, a next-step control triggering detection module, and a target video generation module.

The selection and triggering operation detection module is configured to detect a selection operation on a video capturing mode control and a triggering operation on a video capturing control of a target interface.

The target video segment storage module is configured to display a target scene on the target interface until a release operation on the video capturing control is detected, store a corresponding target video segment according to a video capturing mode determined by the video capturing mode control, and display the video capturing mode control and the video capturing control on the target interface, where a target video segment in a different video capturing mode corresponds to a different number of video frames in unit time.

The next-step control triggering determination module is configured to determine whether a triggering operation on a next-step control of the target interface is detected.

The next-step control triggering detection module is configured to: if the triggering operation on the next-step control of the target interface is not detected, repeat the step of storing the corresponding target video segment according to the video capturing mode determined by the video capturing mode control, in response to detecting the selection operation on the video capturing mode control, the triggering operation on the video capturing control, and the release operation on the video capturing control, until the triggering operation on the next-step control of the target interface is detected.

The target video generation module is configured to jump to a video storage interface and display a result that an existing target video segment is synthesized to obtain a target video.

An embodiment of the present disclosure further provides a terminal device, and the terminal device includes one or more processors and a memory.

The memory is configured to store one or more programs.

The one or more programs is configured to, when executed by the at least one processor, cause the one or more processors to implement the method in the embodiment of the present disclosure.

An embodiment of the present disclosure further provides a computer-readable storage medium configured to store computer programs are configured to, when executed by a processor, implement the method in the embodiment of the present disclosure.

In the solutions provided by the present disclosure, during actual capturing, that is, during the corresponding video segment is acquired, the capturing itself is not treated differently according to the video capturing mode, but whether the video segment is adjusted is determined according to different video capturing modes after the video segment is obtained. In this way, there is no requirement on performance of the hardware device for performing the capturing, and the implementation solution is low-cost, fast and simple, thereby improving flexibility for a user in capturing and processing the video, and the user experience.

DETAILED DESCRIPTION

Figure 1:
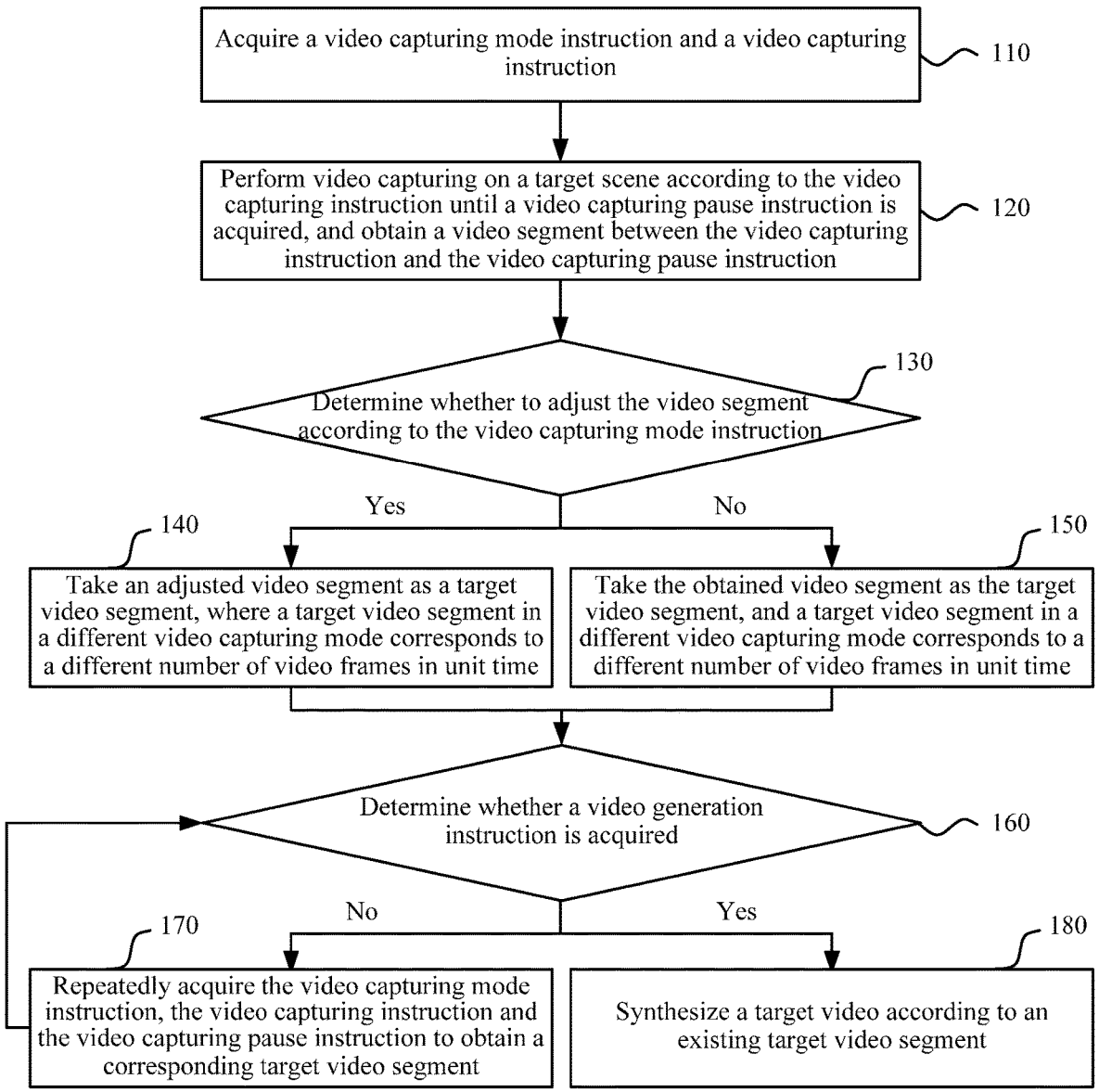
FIG. 1 is a flowchart of a video processing method according to an embodiment of the present disclosure.

The present disclosure will be described below in conjunction with the drawings and embodiments. The specific embodiments set forth below are intended to explain and not to limit the present disclosure. In addition, for ease of description, only part, not all, of structures related to the present disclosure are illustrated in the drawings.

Embodiment

FIG. 1 is a flowchart of a video processing method according to an embodiment of the present disclosure. This embodiment may be applied to a case where a difficulty of video processing is reduced. The method may be executed by a video processing apparatus, the apparatus may be implemented in software and/or hardware, and the apparatus may be configured in a terminal device, such as a mobile phone and/or a tablet computer. As shown in FIG. 1, the method includes steps described below.

In step 110, a video capturing mode instruction and a video capturing instruction are acquired.

In the embodiment of the present disclosure, a complete video may be synthesized by multiple video segments. Target scenes captured in the multiple video segments may be different; or although a same target scene is captured in the multiple video segments, changes need to be shown in term of timing. Accordingly, in order to show a better capturing effect, it may be necessary to set a corresponding capturing mode for each video segment such that a final synthesized video can show the better capturing effect. Based on the above, before capturing the target scenes, the video capturing mode instruction and the video capturing instruction need to be acquired. In this embodiment, the video capturing mode instruction may be used to determine a corresponding video capturing mode, and the video capturing instruction may be used to start a current capturing process. In one embodiment, the video capturing mode instruction may include a normal capturing mode instruction, a quick-motion capturing mode instruction, and a slow-motion capturing mode instruction. A quick motion may include a 2-fold quick motion, a 3-fold quick motion, a 4-fold quick motion, or the like, and a slow motion may include a ½ slow motion, a ⅓ slow motion, a ¼ slow motion, or the like.

In step 120, video capturing is performed on the target scenes according to the video capturing instruction until a video capturing pause instruction is acquired, and a video segment between the video capturing instruction and the video capturing pause instruction is obtained.

In the embodiment of the present disclosure, starting a capturing process of video capturing on the target scenes is determined according to the acquired video capturing instruction until the video capturing pause instruction is acquired, and then current video segment capturing can be finished to obtain the corresponding video segment. In this embodiment, the target scene may refer to an object that a user desires to capture and an environment around the object. The video capturing pause instruction may be used to end the capturing of the current video segment.

In step 130, whether to adjust the video segment is determined according to the video capturing mode instruction; if the video segment is determined to be adjusted, step 140 is executed; and if the video segment is determined not to be adjusted, step 150 is executed.

In step 140, the adjusted video segment is taken as a target video segment, and a target video segment in a different video capturing mode corresponds to a different number of video frames in unit time.

In step 150, the obtained video segment is taken as the target video segment, and a target video segment in a different video capturing mode corresponds to a different number of video frames in unit time.

In the embodiment of the present disclosure, a complete video may be synthesized by multiple video segments. Current target scenes captured in the multiple video segments may be different; or although current target scenes captured in the multiple video segments are the same, changes need to be shown in term of timing. For example, in a same video, a certain video segment needs to show a quick motion, while another video segment needs to show a slow motion, and the above-mentioned showing the quick motion or the slow motion is not implemented by adjusting a playing speed during video playing. Moreover, showing the quick motion or the slow motion implemented by adjusting the playing speed is aimed at the whole video, that is, if the playing speed is selected to be 1.5 (that is, the quick motion), the whole video will be played at the playing speed, and only a certain video segment in the video being played at the playing speed and other video segments in the video being played at a normal playing speed cannot be implemented. The 1.5 described here is relative to only the normal playing speed and is 1.5 times the normal playing speed. In order to present the above-mentioned capturing effect, the obtained video segment may be stored according to the video capturing mode instruction. This takes into account that a video segment adjusted by a different video capturing mode instruction corresponds to a different number of video frames in unit time. In other words, the video capturing mode instruction may be used to determine a number of stored video frames in unit time of the video segments. In one embodiment, multiple video segments are each captured at a same capturing speed. The capturing speed may be determined by a user-setting in advance or by a capturing mode set by the video capturing apparatus itself. The setting mode may be selected according to an actual situation, and is not limited herein. However, considering minimizing the adjustment to the video capturing apparatus as much as possible, the capturing speed may be determined by a capturing mode set for the capturing apparatus itself. For example, the capturing speed is determined according to a video capturing mode set for a camera. Generally, the video capturing mode is a normal-speed capturing mode, and a corresponding capturing speed is the normal capturing speed. Based on the above, under a condition that a preset capturing speed is the normal capturing speed, all video segments will be captured at the normal capturing speed. A quick-motion capturing speed and a slow-motion capturing speed are relative to the normal capturing speed. Exemplarily, the capturing speed is equal to the normal capturing speed/multiple speed, and the multiple speed may be an integer greater than 1, such as 2, 3 or 4, or a fraction less than 1, such as ½, ⅓ or ¼. If the multiple speed is an integer greater than 1, a number of video frames captured at the capturing speed in unit time is less than a number of video frames captured at the normal capturing speed in unit time, and the capturing speed belongs to the quick-motion capturing speed. If the multiple speed is a fraction less than 1, the number of video frames captured at the capturing speed is in unit time greater than the number of video frames captured at the normal capturing speed in unit time, and the capturing speed belongs to the slow-motion capturing speed. Now assuming that the normal capturing speed is 60 frames/s, so the capturing speed of the 2-fold quick motion is 30 frames/s, and the capturing speed of ½ slow motion is 120 frames/s. In this embodiment, the playing speed of the video segments captured under different video capturing mode instructions is the same, and accordingly, playing durations of the video segments captured in unit time are different. Based on this, the above-mentioned playing durations of the video segments captured in unit time are separately described below. The playing duration of the video segments captured at the normal capturing speed is 1 s, the playing duration of the video segments captured at the capturing speed of the 2-fold quick motion is 0.5 s, and the playing duration of the video segments captured at the capturing speed of ½ slow motion is 2 s.

Based on the above, exemplarily, the number of video frames in unit time corresponding to the normal capturing speed is 60 frames, the number of video frames in unit time determined by a certain quick-motion capturing mode is 30 frames, and the number of video frames in unit time determined by a certain slow-motion capturing mode is 120 frames. Existing video segment 1 and video segment 2 are both captured at the normal capturing speed. For the video segment 1, if the acquired video capturing mode instruction is the quick-motion capturing mode instruction, since the video segment 1 is obtained by capturing at the normal capturing speed, the number of video frames in unit time is different from the number of video frames in unit time determined by the quick-motion capturing mode instruction, and the video segment 1 needs to be adjusted. The number of video frames in unit time corresponding to a video segment 1 after being adjusted according to the quick-motion capturing mode instruction is the number of video frames in unit time determined by the quick-motion capturing mode, that is, 30 frames. Similarly, for the video segment 2, if the acquired video capturing mode instruction is the slow-motion capturing mode instruction, since the video segment 2 is obtained by capturing at the normal capturing speed, the number of video frames in unit time is different from the number of video frames in unit time determined by the slow-motion capturing mode instruction, and the video segment 2 also needs to be adjusted. The number of video frames in unit time corresponding to a video segment 2 after being adjusted according to the slow-motion capturing mode instruction is the number of video frames in unit time determined by the slow-motion capturing mode, that is, 120 frames. It is to be understood that when the video segment 1 is stored, the number of video frames in unit time obtained at the normal capturing speed is 60 frames, and after adjustment according to the quick-motion capturing mode instruction, the number of video frames in unit time turns to 30 frames, that is, the number of video frames in unit time when the video segment 1 is stored is 30 frames. Similarly, when the video segment 2 is stored, the number of video frames in unit time obtained at the normal capturing speed is 60 frames, and after adjustment according to the slow-motion capturing mode instruction, the number of video frames in unit time turns to 120 frames, that is, the number of video frames in unit time when the video segment 2 is stored is 120 frames.

In this embodiment, for a certain video segment, if the number of video frames in unit time determined by the video capturing mode instruction is the same as the number of video frames in unit time corresponding to the capturing speed used when the video segment is captured, the video segment does not need to be adjusted according to the video capturing mode instruction. Exemplarily, there is a certain video segment 1, the video segment 1 is obtained by capturing at the normal capturing speed, if the acquired video capturing mode instruction is the normal capturing mode instruction, since the video segment 1 is obtained by capturing at the normal capturing speed, the number of video frames of the video segment 1 is the same as the number of video frames in unit time determined by the normal capturing mode instruction. At this time, the video segment 1 does not need to be adjusted according to the video capturing mode instruction, that is, when the video segment 1 is stored, the number of video frames of the video segment 1 is the same as the number of video frames in unit time determined by the normal capturing mode instruction without adjustment.

In this embodiment, all video segments are obtained by capturing at a same capturing speed. For example, all the video segments are obtained by capturing at the normal capturing speed, and the number of video frames in unit time determined by the normal capturing speed is 60 frames. Now there are existing video segment 1 and video segment 2, for the video segment 1, the acquired capturing mode instruction is the quick-motion capturing mode instruction, and the number of video frames in unit time determined by the quick-motion capturing mode instruction is 30 frames; and for the video segment 2, the acquired capturing mode instruction is the slow-motion capturing mode instruction, and the number of video frames in unit time determined by the slow-motion capturing mode instruction is 120 frames. It can be seen from the foregoing description that both the video segment 1 and the video segment 2 need to be adjusted according to respective video capturing mode instructions. For the video segment 1, the number of video frames in unit time needs to be adjusted from 60 frames to 30 frames. For the video segment 2, the number of video frames in unit time needs to be adjusted from 60 frames to 120 frames. Then, regarding how to implement the adjustment of the number of video frames, a mode in which the number of video frames is copied or extracted may be adopted. For example, adjusting the number of video frames in unit time from 60 frames to 30 frames can be implemented in a manner in which the number of video frames is extracted, that is, 30 frames are extracted from the 60 frames of video frames obtained in unit time according to a preset mode, thus adjusting the number of video frames in unit time from 60 frames to 30 frames is implemented. Similarly, 120 frames are obtained by copying the number of video frames, 60 frames, obtained in unit time according to a preset mode, thus adjusting the number of video frames in unit time from 60 frames to 120 frames is implemented. Both the preset method used in the extraction and the preset method used in the copying can be set according to the actual situation, and is not limited herein. Exemplarily, when during the extraction, extraction is performed every N frames and extracted frames are ranked in a timing sequential order; and when copying is performed, N times copying are performed on each frame and obtained frames are ranked in a timing sequential order.

In this embodiment, the target video segment is obtained by adjusting the video segment according to the video capturing mode instruction, such as the above-mentioned video segment 1 and video segment 2. The video segment 1 and video segment 2 are separately adjusted to obtain a corresponding target video segment 1 and a target video segment 2. It can be understood that if it is determined that the video segment does not need to be adjusted correspondingly according to the video capturing mode instruction, the video segment can be taken as the corresponding target video segment. The video segment may not be stored, and only the target video segment is stored. That is to say, if the video segment is determined to be adjusted according to the video capturing mode instruction, the adjusted video segment is taken as the target video segment; and if the video segment is determined not to be adjusted according to the video capturing mode instruction, the obtained video segment is taken as the target video segment.

In addition, since different video segments are all captured at the same capturing speed, there is no additional requirement on performance of the hardware device performing capturing, where the hardware device includes but is not limited to a camera or the like. That is to say, the hardware device performing the capturing may only support one capturing speed.

In step 160, whether a video generation instruction is acquired is determined; if the video generation instruction is acquired, step 180 is executed; and if the video generation instruction is not acquired, step 170 is executed.

In step 170, the video capturing mode instruction, the video capturing instruction and the video capturing pause instruction are repeatedly acquired to obtain a corresponding target video segment, and then step 160 is returned.

In step 180, a target video is synthesized according to an existing target video segment.

In the embodiment of the present disclosure, the video generation instruction may be used to synthesize the existing target video segments to obtain the target video, that is, if the video generation instruction is acquired, it means that a current whole video capturing process can be ended, capturing of a next video segment will not be performed, and the target video can be generated according to the existing target video segments. If the video generation instruction is not acquired, it means that the current whole video capturing process is not ended, the capturing of the next video segment is needed, that is, the video capturing mode instruction, the video capturing instruction and the video capturing pause instruction are repeatedly acquired to obtain a corresponding target video segment until the video generation instruction is acquired, and then the target video is generated according to the existing target video segments, that is, one corresponding target video segment can be obtained every time step 170 is executed. Since the target video segment in a different video capturing mode corresponds to a different number of video frames in unit time, the obtained different target video segments may correspond to a same number or some different numbers of video frames in unit time. If set video capturing mode instructions are the same, different target video segments correspond to a same number of video frames in unit time. If set video capturing mode instructions are different, different target video segments correspond to some different numbers of video frames in unit time. In this embodiment, the target scenes corresponding to different target video segments may be the same or different, which may be determined according to the actual situation, and is not limited herein. In this embodiment, the number of existing target video segments may be one or at least two, and the number of target video segments is related to acquisition time of the video generation instruction. That is to say, if the video generation instruction is acquired after a first target video segment is obtained, it means that the current whole video capturing process can be ended and the target video is generated according to the existing target video segment. At this time, the number of target video segment is one. If the video generation instruction is not acquired after the first target video segment is obtained, it means that the current whole video capturing process is not over, and the capturing of the next video segment needs to be performed. At this time, the number of target video segments is at least two. Exemplarily, three video segments are obtained now, target scenes corresponding to the three video segments are the same, and the target scene is a same corner in a certain classroom. The three video segments are separately video segment 1, video segment 2 and video segment 3. The video capturing mode instruction acquired when the video segment 1 is captured is the normal capturing mode instruction, the video capturing mode instruction acquired when the video segment 2 is captured is the 2-fold quick-motion capturing mode instruction, and the video capturing mode instruction acquired when the video segment 3 is captured is the ½ slow-motion capturing mode instruction. In one embodiment, the target video may be obtained by splicing and synthesizing the existing target video segments according to a generation sequence. Exemplarily, regarding the above-mentioned three video segments, the video segment 1, the video segment 2 and the video segment 3 are sequentially generated in time sequence, and target video segments corresponding to the three video segments are a target video segment 1, a target video segment 2, and a target video segment 3, respectively. If the video generation instruction is acquired after the target video segment 3 is obtained, it means that the current whole video capturing process can be ended and the existing target video segment 1, target video segment 2 and target video segment 3 are synthesized to obtain the target video.

In one embodiment, the above-mentioned video capturing mode instruction and video capturing instruction may be generated by a user triggering or selecting corresponding controls on a capturing interface of a terminal. The video capturing pause instruction and the video generation instruction may be generated by the user releasing or triggering corresponding controls on the capturing interface of the terminal, and the video capturing pause instruction and the video generation instruction may also be generated by detecting that a length of capturing time reaches a predetermined capturing time threshold. Generation conditions of different instructions may be set according to the actual situation and are not limited herein. Exemplarily, the video capturing mode instruction is generated by a user's selection operation on a video capturing mode control, the video capturing instruction is generated by a user's triggering operation on the video capturing instruction, the video capturing pause instruction is generated by a user's releasing operation on a video capturing control, and the video generation instruction is generated by a user's triggering operation on a video generation control.

A video sharing software on a terminal is described as an example below. For example, in a case where the user needs to captured a video, the user clicks an icon of the video sharing software on a display screen of the terminal to start an application program of the video sharing software, and then an initial capturing interface is entered. The initial capturing interface is provided with the video capturing mode control and the video capturing control. When one video segment is captured and obtained, besides the video capturing mode control and the video capturing control being simultaneously displayed on the capturing interface, the video generation control is further displayed on the capturing interface. In one embodiment, a number of video capturing mode controls is at least one, each video capturing mode control corresponds to a respective one video capturing mode, and correspondingly, each video capturing mode control corresponds to a respective number of video frames in unit time. The video capturing mode control may include a normal capturing speed control, a quick-motion capturing speed control, and a slow-motion capturing speed control. It is preset that all video segments are captured at the normal capturing speed. The user triggers the normal capturing mode control according to the actual situation so as to select a corresponding number of video frames in unit time for a subsequent target video segment, and triggers the video capturing control.

In example one, the video capturing mode instruction, the video capturing instruction, the video capturing pause instruction and the video generation instruction are generated by triggering, selecting or releasing a corresponding control on the capturing interface of the terminal by the user. In this case, a camera begins to perform video capturing on a target scene until the user releases the video capturing control, then capturing on a current video segment is finished, and a video segment 1 is obtained. Since the number of video frames in unit time determined by the video capturing mode instruction is the same as the number of video frames in unit time corresponding to a capturing speed used when the video segment is captured, the video segment does not need to be adjusted according to the video capturing mode instruction, and the video segment 1 is directly taken as a target video segment 1. At the same time, the video capturing mode control and the video capturing control will be displayed simultaneously again on the capturing interface, and in addition, the video generation control will further be displayed on the capturing interface. The user triggers the quick-motion capturing speed control according to the actual situation again so as to select a corresponding number of video frames in unit time for a subsequent target video segment, and triggers the video capturing control again. In this case, the camera begins to perform the video capturing on the target scene again until the user releases the video capturing control again, then capturing of the current video segment is finished, and a video segment 2 is obtained. Since the video segment 2 is obtained by capturing at the normal capturing speed, the number of video frames in unit time is different from the number of video frames in unit time determined by the acquired quick-motion capturing mode instruction, the video segment 2 needs to be adjusted. The number of video frames in unit time corresponding to a video segment 2 after being adjusted according to the quick-motion capturing mode instruction is the number of video frames in unit time determined by the quick-motion capturing mode, and a corresponding target video segment 2 is obtained. At the same time, the video capturing mode control and the video capturing control will be simultaneously displayed on the capturing interface for the third time, and the video generation control will be displayed on the capturing interface for the second time. The user triggers the slow-motion capturing speed control according to the actual situation for the third time so as to select the capturing speed as the slow-motion capturing speed, and triggers the video capturing control for the third time. In this case, the camera begins to perform the video capturing on the target scene for the third time until the user releases the video capturing control for the third time, then capturing of the current video segment is finished, and a video segment 3 is obtained. Since the video segment 3 is obtained by capturing at the normal capturing speed, the number of video frames in unit time is different from the number of video frames in unit time determined by the acquired slow-motion capturing mode instruction, the video segment 3 needs to be adjusted. The number of video frames in unit time corresponding to a video segment 3 after being adjusted according to the slow-motion capturing mode instruction is the number of video frames in unit time determined by the slow-motion capturing mode, and a corresponding target video segment 3 is obtained. At the same time, the video capturing mode control and the video capturing control will be simultaneously displayed on the capturing interface for the fourth time, and the video generation control will be displayed on the capturing interface for the third time. The user triggers the video generation control, current whole video capturing is finished, and the existing target video segment 1, the target video segment 2 and the target video segment 3 are synthesized to obtain the target video.

In example two, the video capturing mode instruction and the video capturing instruction are generated by triggering or selecting a corresponding control on a capturing interface of a terminal by a user. The video capturing pause instruction before the length of capturing time reaching the predetermined capturing time threshold is detected is generated through triggering a corresponding control on the capturing interface of the terminal by the user, while when the length of capturing time reaching the predetermined capturing time threshold is detected, the video capturing pause instruction is automatically generated instead of being generated by releasing a corresponding control on the capturing interface of the terminal by the user. In addition, the video generation instruction does not need to be generated through triggering a corresponding control on the capturing interface of the terminal by the user, but the video generation instruction is automatically generated at the same time. The process of obtaining a target video segment 1, a target video segment 2, and a target video segment 3 is the same as the process of example one, except that after the target video segment 3 is captured and obtained, a sum of lengths of capturing time of the target video segment 1, the target video segment 2, and the target video segment 3 is equal to the predetermined capturing time threshold. At this time, the video segment 3 can be obtained without finishing current video segment capturing by releasing the video capturing control by the user. Whether to adjust video segments is determined according to the video capturing mode instruction, and corresponding target video segment 1, target video segment 2 and target video segment 3 are obtained. At the same time, the existing target video segment 1, target video segment 2 and target video segment 3 can be automatically synthesized to obtain the target video without triggering the video generation control to finish the current whole video capturing by the user.

In this embodiment, triggering the video capturing control may refer to long-pressing the video capturing control, and when the video capturing control is released, the capturing of the current video segment is determined to be finished.

In the solutions of this embodiment, the video capturing mode instruction and the video capturing instruction are acquired; the video capturing is performed on the target scene according to the video capturing instruction until the video capturing pause instruction is acquired, and the video segment between the video capturing instruction and the video capturing pause instruction is obtained; whether to adjust the video segment is determined according to the video capturing mode instruction and the corresponding target video segment is obtained, where a target video segment in a different video capturing mode corresponds to a different number of video frames in unit time; whether the video generation instruction is acquired is determined, if the video generation instruction is not acquired, the steps of the video capturing mode instruction, the video capturing instruction and the video capturing pause instruction are repeatedly acquired to obtain the corresponding target video segment until the video generation instruction is acquired; and the target video is generated according to the existing target video segment. During the actual capturing, that is, when the corresponding video segment is acquired, the capturing itself is not treated differently according to a video capturing mode, but whether the video segment is adjusted is determined according to different video capturing modes after the video segment is obtained, so that there is no requirement on the performance of the hardware device performing the capturing, and the implementation solution is low in cost, fast and simple, thereby improving the flexibility for the user in capturing and processing the video, and the user experience.

In one embodiment, based on the above-mentioned solutions, the video capturing pause instruction may be triggered by the user or by determining whether the length of capturing time reaches the predetermined capturing time threshold.

In the embodiment of the present disclosure, the video capturing pause instruction may be triggered by the user or by determining whether the length of capturing time reaches the predetermined capturing time threshold. The video capturing pause instruction being triggered by the user is applied to a case where the length of capturing time does not reach the predetermined capturing time threshold, while the video capturing pause instruction being triggered by determining whether the length of capturing time reaches the predetermined capturing time threshold is applied to a case where the length of capturing time reaches the predetermined capturing time threshold. Exemplarily, the predetermined capturing time threshold may be 15 seconds, for a video segment 1 and a video segment 2 currently obtained, the length of capturing time of the video segment 1 is 3 seconds, and the length of capturing time of the video segment 2 is 8 seconds. Since the length of capturing time for capturing the video segment 1 is 3 seconds and does not reach 15 seconds set for the predetermined capturing time threshold, the video capturing pause instruction corresponding to the obtained video segment 1 is generated by triggering of the user. Since the length of capturing time for capturing the video segment 2 is 8 seconds, a sum of the length of capturing time for capturing the video segment 2 and the length of capturing time for capturing the video segment 1 is 11 seconds, and the sum also does not reach 15 seconds set by the predetermined capturing time threshold, the video capturing pause instruction corresponding to the obtained video segment 2 is generated also by triggering of the user. Now, capturing on a next video segment is performed. When the length of capturing time of the video segment reaches 4 seconds, since a sum of the length of capturing time of the video segment and the sum of lengths of capturing time of the video segment 1 and the video segment 2 is equal to 15 seconds, the 15 seconds set for the predetermined capturing time threshold is reached. Therefore, the video capturing pause instruction can be automatically generated without being triggered by the user, and correspondingly, the video segment 3 is obtained.

In one embodiment, the video generation instruction may be triggered by the user or by determining whether the length of capturing time reaches the predetermined capturing time threshold. The video generation instruction being triggered by the user is applied to a case where the length of capturing time does not reach the predetermined capturing time threshold, while the video generation instruction being triggered by determining whether the length of capturing time reaches the predetermined capturing time threshold is applied to a case where the length of capturing time reaches the predetermined capturing time threshold. Exemplarily, the predetermined capturing time threshold may be 15 seconds, for a video segment 1 and a video segment 2 currently obtained, the length of capturing time of the video segment 1 is 3 seconds, and the length of capturing time of the video segment 2 is 8 seconds. At this time, the video generation instruction is acquired, and the video generation instruction is generated by triggering of the user. This is because that a sum of the length of capturing time for capturing the video segment 1 and the length of capturing time for capturing the video segment 2 is 11 seconds, and the sum does not reach 15 seconds set by the predetermined capturing time threshold. Now, capturing on a next video segment is performed. When the length of capturing time of the video segment reaches 4 seconds, since a sum of the length of capturing time of the video segment and the sum of lengths of capturing time of the video segment 1 and the video segment 2 is equal to 15 seconds, the 15 seconds set by the predetermined capturing time threshold is reached. Therefore, while the video capturing pause instruction is automatically generated, the video generation instruction can be automatically generated without being triggered by the use.

Based on the above description, it can be known that when the length of capturing time reaching the predetermined capturing time threshold is determined, the video generation instruction can be generated while the video capturing pause instruction is generated without triggering by the user.

In one embodiment, on the basis of the above-mentioned solutions, being triggered by determining whether the length of capturing time reaches the predetermined capturing time threshold may include a step described below. Whether a length of a captured video reaches the predetermined capturing time threshold is determined, and if the length reaches the predetermined capturing time threshold, the video capturing pause instruction is triggered. The length of the captured video may include a length of one captured video segment or a total length of a plurality of captured video segments.

In the embodiment of the present disclosure, the step that the video capturing pause instruction is triggered by determining whether the length of capturing time reaches the predetermined capturing time threshold may include steps described below. Whether the length of the captured video reaches the predetermined capturing time threshold is determined. If the length of the captured video reaches the predetermined capturing time threshold, the video capturing pause instruction can be triggered without being triggered by the user. If the length of the captured video does not reach the predetermined capturing time threshold, the video capturing pause instruction is triggered by the user. In one embodiment, the length of the captured video may include a length of one captured video segment or a total length of a plurality of captured video segments. It is to be understood that the length of the captured video includes the length of one captured video segment, which means that the length of the captured video reaches the predetermined capturing time threshold; and the length of the captured video includes the total length of the plurality of captured video segments, which means that the total length of the plurality of captured video segments reaches the predetermined capturing time threshold.

Exemplarily, the predetermined capturing time threshold is 15 seconds, and now it is assumed that a video segment 1 exists, where the length of the video segment 1 is 15 seconds. Since the length of the video segment 1 is 15 seconds and reaches 15 seconds set by the predetermined capturing time threshold, the length of the captured video is the length of the video segment 1. Now it is assumed that a video segment 1 and a video segment 2 exists, where the length of the video segment 1 is 7 seconds, and a length of the video segment 2 is 8 seconds. Since a total length of the video segment 1 and the video segment 2 is 15 seconds, the length of the captured video is the total length of the video segment 1 and the video segment 2.

In one embodiment, the video generation instruction being triggered by determining whether the length of capturing time reaches the predetermined capturing time threshold may include a step described below. Whether the length of the captured video reaches the predetermined capturing time threshold is determined, and if the length reaches the predetermined capturing time threshold, the video generation instruction is triggered. The length of the captured video may include the length of one captured video segment or the total length of the plurality of captured video segments.

Based on the above-mentioned two modes for triggering the video capturing pause instruction and the video generation instruction, the solutions of the embodiment of the present disclosure will be described below.

In case one: it is determined that the length of capturing time not reaching the predetermined capturing time threshold. Correspondingly, both the video capturing pause instruction and the video generation instruction can only be generated by triggering of the user, that is, the video capturing pause instruction and the video generation instruction will not be generated without the triggering of the user.

For example, the video capturing mode instruction and the video capturing instruction are acquired, the video capturing is performed on the target scene according to the video capturing instruction until the video capturing pause instruction is acquired, and the video segment between the video capturing instruction and the video capturing pause instruction is obtained. Whether to adjust the video segment is determined according to the video capturing mode instruction and a target video segment is obtained. Whether the video generation instruction generated by the triggering of the user is acquired is determined. If the video generation instruction generated by the triggering of the user is not acquired, the following step is repeated: the video capturing mode instruction, the video capturing instruction and the video capturing pause instruction acquired by the triggering of the user are acquired to obtain a corresponding target video segment, until the video generation instruction generated by the triggering of the user is acquired; and then the existing target video segments are synthesized to obtain the target video.

In case two: it is determined the length of capturing time reaches the predetermined capturing time threshold. A case where the target video only includes one target video segment and a case where the target video includes at least two target video segments are separately described below.

1. The target video only includes one target video segment, that is, a length of capturing time of one video segment obtained by capturing reaches the predetermined capturing time threshold. For example, the video capturing mode instruction and the video capturing instruction are acquired; the video capturing is performed on the target scene according to the video capturing instruction until the video capturing pause instruction that is triggered and generated when the length of the capturing time reaches the predetermined capturing time threshold is acquired, and the video segment between the video capturing instruction and the video capturing pause instruction is obtained. Whether to adjust the video segment is determined according to the video capturing mode instruction and the corresponding target video segment is obtained. At the same time, the video generation instruction that is triggered and generated when the length of the capturing time reaches the predetermined capturing time threshold is acquired, and existing target video segments are synthesized to obtain the target video.

2. The target video includes at least two target video segments, that is, a sum of lengths of the capturing time of a plurality of video segments obtained by capturing reaches the predetermined capturing time threshold. The video capturing pause instruction and the video generation instruction corresponding to the last video segment in the plurality of video segments are both generated through that the length of the capturing time reaches the predetermined capturing time threshold. For example, the video capturing mode instruction and the video capturing instruction are acquired; the video capturing is performed on the target scene according to the video capturing instruction until the video capturing pause instruction generated by the triggering of the user is acquired, and the video segment between the video capturing instruction and the video capturing pause instruction is obtained; whether to adjust the video segment is determined according to the video capturing mode instruction, and the corresponding target video segment is obtained; whether the video capturing pause instruction generated through that the length of the capturing time reaches the predetermined capturing time threshold is acquired is determined; if the video capturing pause instruction generated through that the length of the capturing time reaches the predetermined capturing time threshold is not acquired, the video capturing mode instruction, the video capturing instruction repeatedly acquired and the video capturing pause instruction generated by the triggering of the user are repeatedly acquired to obtain the corresponding target video segment until the video capturing pause instruction generated through that the length of the capturing time reaches the predetermined capturing time threshold is acquired, and a last video segment is obtained. At the same time, the video generation instruction that is generated through that the length of the capturing time reaches the predetermined capturing time threshold is acquired, and existing target video segments are synthesized to obtain the target video. In this embodiment, the video capturing pause instruction corresponding to the last video segment is generated through that the length of the capturing time reaches the predetermined capturing time threshold, and the video generation instruction is also generated through that the length of the capturing time reaches the predetermined capturing time threshold.

In one embodiment, on the basis of the above-mentioned solutions, before the step that the video capturing is performed on the target scene according to the video capturing instruction until the video capturing pause instruction is acquired, and the video segment between the video capturing instruction and the video capturing pause instruction is obtained, the method may further include that whether a first special effect instruction is acquired is determined. Correspondingly, the step that the video capturing is performed on the target scene according to the video capturing instruction until the video capturing pause instruction is acquired, and the video segment between the video capturing instruction and the video capturing pause instruction is obtained may include a step described below. If the first special effect instruction is acquired, the video capturing is performed on the target scene according to the first special effect instruction and the video capturing instruction until the video capturing pause instruction is acquired, and the video segment between the video capturing instruction and the video capturing pause instruction is obtained.

In the embodiment of the present disclosure, in order to present a better video capturing effect, a capturing special effect may be set before the video capturing on the target scene is performed. Based on the above, it is necessary to determine whether the first special effect instruction is acquired before performing the video capturing on the target scene according to the video capturing instruction. The first special effect instruction may include at least one of a beautification instruction, a prop instruction, or a countdown instruction. The beautification instruction may include at least one of a filter instruction, a skin peeling instruction, or an eye zoom and face-lift instruction. The prop instruction may include a variety of props. The filter instruction may include normal, sweet melt, age, innocence, or the like. The skin peeling instruction and the eye zoom and face-lift instruction are numerically represented, such as 0, 1, 2, or the like.

If the first special effect instruction is acquired, the video capturing can be performed on the target scene according to the first special effect instruction and the video capturing instruction, that is, a special effect corresponding to the first special effect instruction is added to a video capturing process, so that a better video capturing effect can be presented. In the above-mentioned video capturing process, the capturing of the current video segment can be finished to obtain a corresponding video segment till the video capturing pause instruction is acquired.

Exemplarily, before the video capturing is performed on the target scene, the first special effect instruction is determined to be acquired, the first special effect instruction includes the beautification instruction and the prop instruction, the capturing process of the video capturing on the target scene is determined to be started according to the acquired video capturing instruction till the video capturing pause instruction is acquired, and then capturing of the current video segment can be finished to obtain the video segment between the video capturing instruction and the video capturing pause instruction. Correspondingly, the obtained corresponding video segment includes an effect that can be implemented by the first special effect instruction.

In one embodiment, on the basis of the above-mentioned solutions, after the target video is generated according to the existing target video segment, the method may further include steps described below. Whether an edit instruction is acquired is determined. If the edit instruction is acquired, the target video is processed according to the edit instruction to obtain a processed target video.

In the embodiment of the present disclosure, in order to present a better video capturing effect, the target video can be edited and processed after the target video is generated according to the existing target video segment. Based on the above description, it is necessary to determine whether the edit instruction is acquired after the target video is generated according to the existing target video segment. In this embodiment, the edit instruction may include at least one of a music cut instruction, a music selection instruction, or a cover selection instruction. In one embodiment, the edit instruction may further include a second special effect instruction and a filter instruction. The second special effect instruction may include a filter special effect instruction or a time special effect instruction, the filter special effect instruction may include an out-of-body experience, illusion or shaking, and the time special effect instruction may include time passage, flash, slow motion, or the like. In one embodiment, the filter instruction described herein is the same as the filter instruction in the beautification instruction described above. In this embodiment, since the second special effect instruction may include the filter special effect instruction and the time special effect instruction, and the first special effect instruction may include the beautification instruction, the prop instruction and the countdown instruction, content included in the second special effect instruction and content included in the first special effect instruction are different. In addition, the second special effect instruction described herein targets for a synthetized target video and performs a later edit process on the target video, and the second special effect instruction can be applied to a specific moment selected in the target video.

If the edit instruction is acquired, the target video is processed according to the edit instruction to obtain the processed target video, that is, the later edit process is performed on the target video, thereby presenting a better video capturing effect.

In one embodiment, on the basis of the above-mentioned solutions, after if the edit instruction is acquired, the target video is processed according to the edit instruction to obtain the processed target video, the method further includes a step described below. Whether a storage mode instruction is acquired is determined, and the storage mode instruction includes a draft box instruction or an issuing instruction. If the storage mode instruction is acquired, the processed target video is stored according to the storage mode instruction.

In the embodiment of the present disclosure, the storage mode instruction may refer to a storage form of the target video, and may include the draft box instruction or the issuing instruction. If a selected storage mode instruction is the draft box instruction, the target video will be stored in the draft box, and the target video in the draft box can only be seen by a current user. If the selected storage mode instruction is the issuing instruction, the target video will be uploaded to the network such that the target video can also be seen by other users.

After the processed target video is obtained, whether the storage mode instruction is acquired is determined, and if the storage mode instruction is acquired, the processed target video can be stored correspondingly according to the storage mode instruction. The above achieves that the user can select an appropriate storage form for the target video according to the actual situation.

In one embodiment, on the basis of the above-mentioned solutions, after if the storage mode instruction is acquired, the processed target video is stored according to the storage mode instruction, the method further includes: determining whether a video play instruction is acquired. If the video play instruction is acquired, the processed target video is played according to the video play instruction.

In the embodiment of the present disclosure, when the processed target video is stored according to the storage mode instruction, whether the video play instruction is acquired is determined, and if the video play instruction is acquired, the processed target video can be played according to the video play instruction.

In this embodiment, since the target video is obtained by synthesizing a plurality of video segments, where when stored, the plurality of target video segments correspond to respective number of video frames in unit time, the target video can directly present a corresponding capturing effect when being played, that is, the target video may present a video segment with the normal capturing mode, a video segment with the quick-motion capturing mode, or a video segment with the slow-motion capturing mode. That is to say, the target video may have multiple representation effects when being played, instead of only one representation effect.

In this embodiment, in addition to the above-mentioned video capturing mode instruction, video capturing instruction, video capturing pause instruction and video generation instruction can be generated by triggering, selecting or releasing corresponding controls on the capturing interface of the terminal, the first special effect instruction, edit instruction, storage mode instruction and play instruction can also be generated by triggering or selecting corresponding controls on the target interface.

In one embodiment, in a process of capturing the video segment, a deletion operation may be performed on the obtained video segment. For example, whether a deletion instruction is acquired is determined, and if the deletion instruction is acquired, the corresponding obtained video segment is deleted according to the deletion instruction. The above is applicable to a case where the user is not satisfied with a certain captured video segment, and the corresponding video segment can be deleted by the deletion instruction. The video segment to be deleted may be a last video segment previous to the current video segment or last several video segments previous to the current video segment, which can be determined according to the actual situation and is not limited herein.

Figure 2:
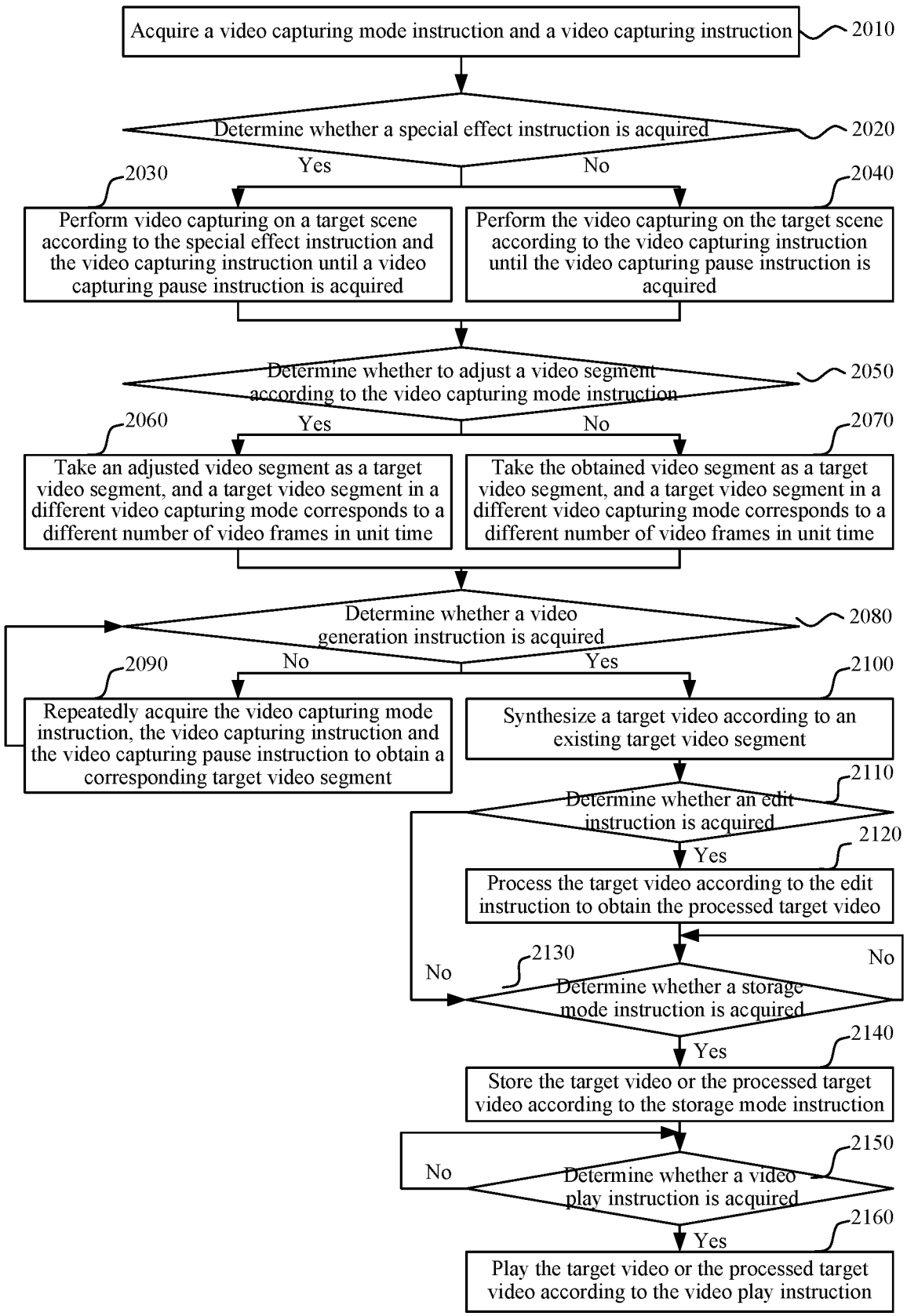
FIG. 2 is a flowchart of another video processing method according to an embodiment of the present disclosure.

FIG. 2 is a flowchart of another video processing method according to an embodiment of the present disclosure. This embodiment may be applied to a case where a difficulty of video processing is reduced. The method may be executed by a video processing apparatus, the apparatus may be implemented in software and/or hardware, and the apparatus can be configured in a terminal device, such as a mobile phone and/or a tablet computer. As shown in FIG. 2, the method includes steps described below.

In step 2010, a video capturing mode instruction and a video capturing instruction are acquired.

In step 2020, whether a special effect instruction is acquired is determined, and if the special effect instruction is acquired, step 2030 is executed; and if the special effect instruction is not acquired, step 2040 is executed.

In step 2030, video capturing is performed on a target scene according to the special effect instruction and the video capturing instruction until a video capturing pause instruction is acquired, and step 2050 is turned to and executed.

In step 2040, the video capturing is performed on the target scene according to the video capturing instruction until the video capturing pause instruction is acquired, and step 2050 is turned to and executed.

In step 2050, whether to adjust a video segment is determined according to the video capturing mode instruction; if the video segment is determined to be adjusted, step 2060 is executed; and if the video segment is determined not to be adjusted, step 2070 is executed.

In step 2060, the adjusted video segment is taken as a target video segment, a target video segment in a different video capturing mode corresponds to a different number of video frames in unit time, and step 2080 is executed.

In step 2070, the obtained video segment is taken as a target video segment, a target video segment in a different video capturing mode corresponds to a different number of video frames in unit time, and step 2080 is executed.

In step 2080, whether a video generation instruction is acquired is determined; if the video generation instruction is acquired, step 2100 is executed; and if the video generation instruction is not acquired, step 2090 is executed.

In step 2090, the video capturing mode instruction, the video capturing instruction and the video capturing pause instruction are repeatedly acquired to obtain a corresponding target video, and then step 2080 is returned.

In step 2100, a target video is synthesized according to an existing target video segment.

In step 2110, whether an edit instruction is acquired is determined, and if the edit instruction is acquired, step 2120 is executed; and if the edit instruction is not acquired, step 2130 is executed.

In step 2120, the target video is processed according to the edit instruction to obtain the processed target video.

In step 2130, whether a storage mode instruction is acquired is determined; if the storage mode instruction is acquired, step 2140 is executed; and if the storage mode instruction is not acquired, step 2130 is continued to be executed.

In step 2140, the target video or the processed target video is stored according to the storage mode instruction.

In step 2150, whether a video play instruction is acquired is determined; if the video play instruction is acquired, step 2160 is executed; and if the video play instruction is not acquired, step 2150 is returned to and executed.

In step 2160, the target video or the processed target video is played according to the video play instruction.

In the embodiment of the present disclosure, the special effect instruction may include at least one of a beautification instruction, a prop instruction, or a countdown instruction; the edit instruction may include at least one of a music cut instruction, a music selection instruction, or a cover selection instruction; and the storage mode instruction may include a draft box instruction or an issuing instruction.

In the solutions of this embodiment, the video capturing mode instruction and the video capturing instruction are acquired; the video capturing is performed on the target scene according to the video capturing instruction until the video capturing pause instruction is acquired, and the video segment between the video capturing instruction and the video capturing pause instruction is obtained; whether to adjust the video segment is determined according to the video capturing mode instruction, and the corresponding target video segment is obtained, where the target video segment in a different video capturing mode corresponds to a different number of video frames in unit time; whether the video generation instruction is acquired is determined, if the video generation instruction is not acquired, the video capturing mode instruction, the video capturing instruction and the video capturing pause instruction are repeatedly acquired to obtain the corresponding target video segment until the video generation instruction is acquired; the target video is generated according to the existing target video segment, and the target video is processed according to the acquired edit instruction. During the actual capturing, that is, when the corresponding video segment is acquired, the capturing itself is not treated differently according to a video capturing mode, but whether the video segment is adjusted is determined according to different video capturing modes after the video segment is obtained, so that there is no requirement on the performance of the hardware device performing the capturing, and the implementation solution is low in cost, fast and simple, thereby improving the flexibility for the user in capturing and processing the video, and the user experience.

Figure 3:
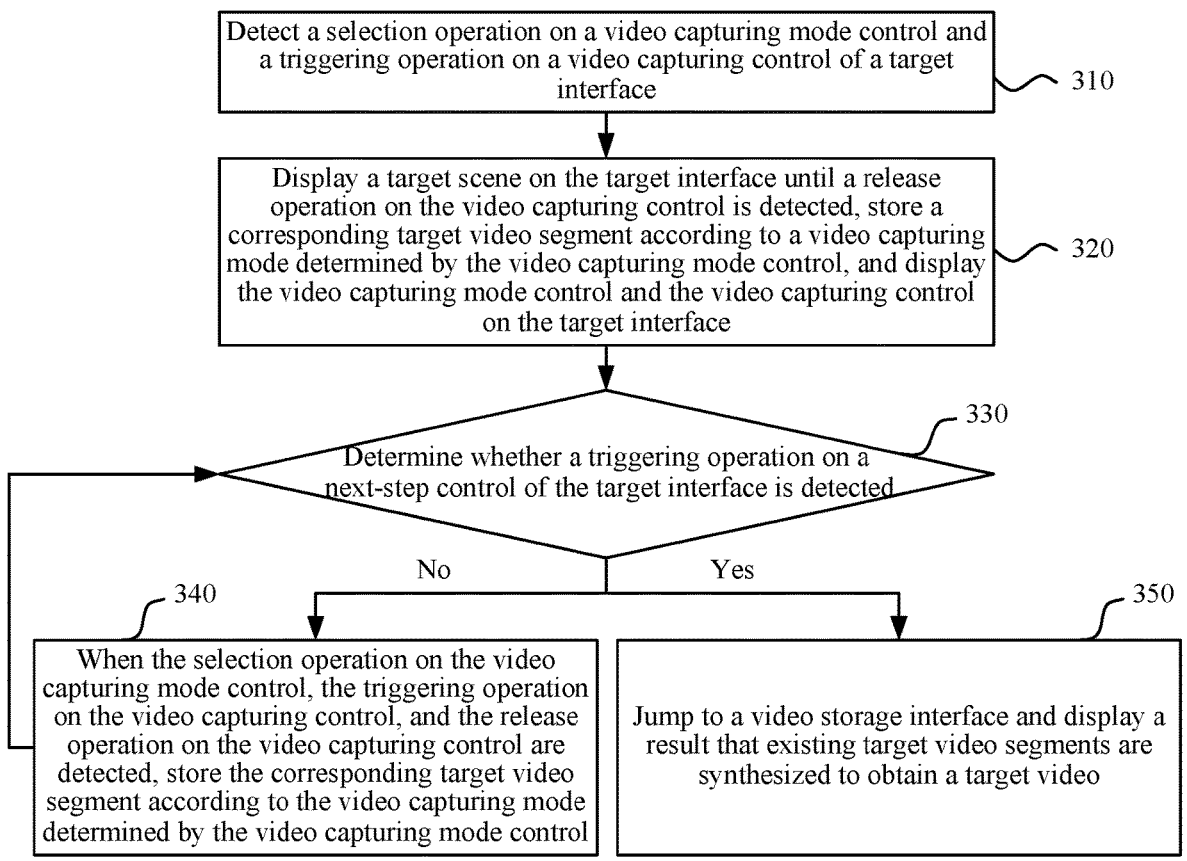
FIG. 3 is a flowchart of another video processing method according to an embodiment of the present disclosure.

FIG. 3 is a flowchart of another video processing method according to an embodiment of the present disclosure. This embodiment may be applied to a case where a difficulty of video processing is reduced. As shown in FIG. 3, the method includes steps described below.

In step 310, a selection operation on a video capturing mode control and a triggering operation on a video capturing control are detected on a target interface.

In step 320, a target scene is displayed on the target interface until a release operation on the video capturing control is detected, a corresponding target video segment is stored according to a video capturing mode determined by the video capturing mode control, and the video capturing mode control and the video capturing control are displayed on the target interface.

In step 330, whether a triggering operation on a next-step control of the target interface is detected is determined; if the triggering operation on the next-step control of the target interface is detected, step 350 is turned to and executed; and if the triggering operation on the next-step control of the target interface is not detected, step 340 is turned to and executed.

In step 340, when the selection operation on the video capturing mode control, the triggering operation on the video capturing control, and the release operation on the video capturing control are detected, the corresponding target video segment is stored according to the video capturing mode determined by the video capturing mode control, and step 330 is returned to and executed.

In step 350, a video storage interface is jumped to and a result that an existing target video segment is synthesized to obtain a target video is displayed.

In the embodiment of the present disclosure, a video capturing process can be implemented through operation on relevant controls of the target interface by the user. In this embodiment, the target interface may refer to a capturing interface operable by the user. For example, the selection operation on the video capturing mode control and the triggering operation on the video capturing control by the user are detected on the target interface, where the selection operation on the video capturing mode control of the target interface by the user may be used to select a corresponding number of video frames in unit time for subsequent target video segment storage; the triggering operation on the video capturing control of the target interface by the user may be used to start a current video capturing process; the release operation on the video capturing control of the target interface by the user may be used to finish capturing on a current video segment; and the triggering operation on the next-step control of the target interface by the user may be used to finish capturing on a current video, and trigger the existing video segment to be synthesized to obtain the target video. In one embodiment, the number of video capturing controls is at least two. The video capturing mode control may include a quick-motion capturing mode control, a normal capturing mode control, and a slow-motion capturing mode control. Correspondingly, if the user selects the quick-motion capturing control in the video capturing mode control, the corresponding target video segment can be stored according to a number of video frames in unit time corresponding to a quick-motion capturing mode determined by the quick-motion capturing mode control; if the user selects the normal capturing mode control in the video capturing mode control, the corresponding target video segment can be stored according to a number of video frames in unit time corresponding to a normal capturing mode determined by the normal capturing mode control; and if the user selects the slow-motion capturing mode control in the video capturing mode control, the corresponding target video segment can be stored according to a number of video frames in unit time corresponding to a slow-motion capturing mode determined by the slow-motion capturing mode control. In order to further satisfy the needs of the user and present a better video capturing effect, more video capturing mode controls, such as a 2-fold quick-motion capturing mode control or a ½ slow-motion capturing mode control, may be set on the target interface, which may be set according to the actual situation and is not limited herein.

When the selection operation on the video capturing mode control of the target interface by the user is detected, the selected corresponding number of video frames in unit time for subsequent target video segment storage is determined; when the triggering operation on the video capturing control of the target interface by the user is detected, a capturing process of performing video capturing on the target scene displayed on the target interface is determined to be started, the video capturing on the target scene is performed at a default capturing speed until the release operation on the video capturing control by the user is detected, and then the capturing of the current video segment is finished to obtain the corresponding video segment; and the video segment is stored as the corresponding target video segment according to the video capturing mode determined by the video capturing mode control. Meanwhile, the video capturing mode control and the video capturing control are displayed again on the target interface to facilitate capturing of a next video segment. Whether the triggering operation on the next-step control of the target interface by the user is detected is determined, if the triggering operation on the next-step control of the target interface by the user is not detected, the selection operation on the video capturing mode control and the triggering operation on the video capturing control of the target interface by the user are repeatedly detected; the selected corresponding number of video frames in unit time for subsequent target video segment storage is determined according to the selection operation on the video capturing mode control of the target interface by the user; the capturing process of performing the video capturing on the target scene displayed on the target interface is determined to be started according to the triggering operation on the video capturing control of the target interface by the user, the video capturing on the target scene is performed at the default capturing speed until the release operation on the video capturing control by the user is detected, and then the capturing of the current video segment is finished to obtain the corresponding video segment; and the video segment is stored as the corresponding target video segment according to the video capturing mode determined by the video capturing mode control. Meanwhile, the video capturing mode control and the video capturing control are displayed again on the target interface to facilitate capturing of the next video segment. In this embodiment, one corresponding target video segment can be obtained every time step 340 is executed, and the target video segment in a different video capturing mode corresponds to a different number of video frames in unit time. Alternatively, if the triggering operation on the next-step control of the target interface by the user is detected, the current video capturing can be finished and the existing target video segments can be merged to obtain the target video, and meanwhile a video storage interface is jumped to and a result that the existing target video segments are merged to obtain the target video is displayed. In one embodiment, the target video may be obtained by splicing and synthesizing the existing target video segments according to a generation sequence.

In the solutions of this embodiment, the selection operation on the video capturing mode control and the triggering operation on the video capturing control are detected on the target interface; the target scene is displayed on the target interface until the release operation on the video capturing control is detected, the corresponding target video segment is stored according to the video capturing mode determined by the video capturing mode control, and the video capturing mode control and the video capturing control are displayed on the target interface, where the target video segment in a different video capturing mode corresponds to a different number of video frames in unit time; whether the triggering operation on the next-step control of the target interface is detected is determined; if the triggering operation on the next-step control of the target interface is not detected, the corresponding target video segment is stored according to the video capturing mode determined by the video capturing mode control when the selection operation on the video capturing mode control, the triggering operation on the video capturing control, and the release operation on the video capturing control are repeatedly detected until the triggering operation on the next-step control of the target interface is detected; and the video storage interface is jumped to and the result that the existing target video segment is synthesized to obtain the target video is displayed. During the actual capturing, that is, when the corresponding video segment is acquired, the capturing itself is not treated differently according to the video capturing mode, but whether the video segment is adjusted is determined according to different video capturing modes after the video segment is obtained, so that there is no requirement on the performance of the hardware device performing the capturing, and the implementation solution is low in cost, fast and simple, thereby improving the flexibility for the user in capturing and processing the video, and the user experience.

In one embodiment, on the basis of the above-mentioned solutions, while displaying the target scene on the target interface, the method may further include steps described below. A progress bar is displayed. If it is detected that the progress bar is completely displayed, the video storage interface is jumped to and the result that the existing target video segment is synthesized to obtain the target video is displayed.

In the embodiment of the present disclosure, while the target scene is displayed on the target interface, the progress bar is also displayed, and the progress bar can represent a length of capturing time, that is, a length of the progress bar is correspondingly prolonged as the video capturing progresses. If the progress bar is completely displayed, it may indicate that the length of capturing time reaches a predetermined capturing time threshold. That is to say, at this time, it is not necessary for the user to release the video capturing control to generate the video capturing pause instruction and to trigger the next-step control to generate the video generation instruction, the video capturing pause instruction can be automatically generated, and meanwhile the video generation instruction can be automatically generated, and then the video storage interface is jumped to and the result that the existing target video segments are synthesized to obtain the target video is displayed.

In one embodiment, if the video capturing pause instruction is generated by the user releasing the video capturing control, and meanwhile the video generation instruction is generated by the user triggering the next-step control, it may indicate that the progress bar is not completely displayed. Therefore, correspondingly, the video capturing pause instruction and the video generation instruction will not be automatically generated, and then the video storage interface will not be jumped to and the result that the existing target video segments are synthesized to obtain the target video will not be displayed. If the progress bar is completely displayed, only the manner in which the last target video segment corresponds to the acquired video capturing pause instruction is different from the manner in which previous existing target video segments correspond to the acquired video capturing pause instruction, and meanwhile, a manner in which the video generation instruction is acquired is different from the manner for the situation in which the progress bar is not displayed completely. A solution for the case where the progress bar is completely displayed is described below. The selection operation on the video capturing mode control and the triggering operation on the video capturing control are detected on the target interface. The target scene is displayed on the target interface until the release operation on the video capturing control is detected, the corresponding target video segment is stored according to the video capturing mode determined by the video capturing mode control, and the video capturing mode control and the video capturing control are displayed on the target interface. The corresponding target video segment (for all target video segments before the last target video segment) is stored according to the video capturing mode determined by the video capturing mode control when the selection operation on the video capturing mode control, the triggering operation on the video capturing control, and the release operation on the video capturing control are continuously detected. Alternatively, after the last selection operation on the video capturing mode control and the triggering operation on the video capturing control of the target interface are detected, the video storage interface is jumped to and the result that the existing target video segments are synthesized to obtain the target video is displayed till the progress bar is detected to be completely displayed (the video capturing pause instruction is acquired at this time).

In one embodiment, on the basis of the above-mentioned solutions, before the triggering operation on the video capturing control is detected, the method may further include: detecting a selection operation on a first special effect control of the target interface. Correspondingly, displaying the target scene on the target interface may include displaying a target scene superposed with the first special effect control, of the target interface, selected by the user.

In the embodiment of the present disclosure, in order to present a better video capturing effect, a capturing special effect may be set before the video capturing on the target scene is performed. For example, the capturing special effect can be implemented by a user triggering operation on the first special effect control of the target interface. Based on the above, it is necessary to detect the selection operation on the first special effect control of the target interface by the user before detecting the triggering operation on the video capturing control by the user. In one embodiment, the first special effect control may include at least two of a beautification control, a prop control, or a countdown control. The beautification control may include at least one of a filter control, a skin peeling control, or an eye zoom and face-lift control. The prop control may include a variety of props. The filter control may include a normal control, a sweet melt control, a age control, an innocence control, or the like. In this embodiment, if the selection operation on the first special effect control of the target interface by the user is detected, a corresponding special effect is superposed during the capturing process of the video segment of the target scene, that is, the obtained corresponding video segment includes the corresponding special effect. In this embodiment, the target scene is displayed on the target interface until the release operation on the video capturing control by the user is detected, the corresponding video segment is obtained, and the first special effect control is further displayed on the target interface in addition to the video capturing mode control and the video capturing control.

In one embodiment, on the basis of the above-mentioned solutions, after the video storage interface is jumped to and the result that the existing target video segments are synthesized to obtain the target video, the method may further include steps described below. A video edit interface is jumped to, and the video edit interface includes an edit control and a next-step control. If a selection operation on the edit control is detected, the target video is processed according to the selected edit control, and the processed target video is taken as the target video. If a triggering operation on the next-step control of the video edit interface is detected, the video storage mode interface is jumped to, and the video storage mode interface includes the storage mode control.

In the embodiment of the present disclosure, in order to present a better video capturing effect, the target video may be edited and processed. For example, after jumping to the video storage interface and displaying the result that the existing video segments are synthesized to obtain the target video, the video edit interface is jumped to, and the video edit interface may include the edit control and the next-step control. The edit control may include at least two of a music cut instruction, a music selection instruction, a cover selection instruction, or a filter control. In one embodiment, the edit control may further include a second special effect control and the filter control. The second special effect control may include a filter special effect control or a time special effect control, the filter special effect control may include controls such as out-of-body experience, illusion or a shaking, and the time special effect instruction may include controls such as time passage, flash, or slow motion. The triggering operation on the next-step control of the video edit interface by the user may be used for jumping from the video edit interface to the video storage mode interface. The filter control in the edit control described herein is the same as the filter control in the beautification control described above. The second special effect control described herein performs later edit processing on the target video for the target video that has been synthesized but not been edited. The edit processing on the target video is implemented by the selection operation on the edit control of the video edit interface by the user. Based on the above, if the selection operation on the edit control by the user is detected, the target video is edited and processed according to the selected edit control, and if the triggering operation on the next-step control of the edit interface by the user is detected, the video storage mode interface is jumped to. The video storage mode interface may include the storage mode control, and the user can select an appropriate storage form for the target video through a selection operation on the storage mode control.

As can be seen from the foregoing description, the target interface also includes a next-step control, and for triggering operations on the two next-step controls by the user, the triggering operation on the next-step control of the target interface by the user can be used to finish capturing of current whole video and trigger synthesization of the existing video segments and the result that the target interface jumps to the video storage interface to obtain the target video; while the triggering operation on the next-step control of the video edit interface by the user can be used to indicate that the video edit interface jumps to the video storage mode interface.

In this embodiment, both the second special effect control and the first special effect control in the embodiment of the present disclosure described above can play a role of adding special effects. However, the second special effect control includes the filter special effect control or the time special effect control, while the first special effect control includes at least two of the beautification control, the prop control or the countdown control, and the content of the two controls is different.

In one embodiment, on the basis of the above-mentioned solutions, after jumping to the video storage mode interface, the method may further include: detecting the selection operation on the storage mode control, jumping to a video presentation mode interface and displaying a storage result of the target video, where the storage mode control includes a draft box control and an issuing control.

In the embodiment of the present disclosure, the user can select a suitable storage form for the target video through a selection operation on the storage mode control. If the selection operation on the storage mode control of the video storage interface by the user is detected, the video presentation mode interface is jumped to and the storage result of the target video is displayed. The storage mode control may include the draft box control and the issuing control. If a selected storage mode control is the draft box control, the target video will be stored in the draft box, and the target video in the draft box can only be seen by a current user. If the selected storage mode control is the issuing instruction, the target video will be uploaded to the network such that the target video can also be seen by other users. The target video described herein refers to the target video after being edited and processed. However, if the target video is not edited and processed, the target video refers to the video directly synthesized.

In one embodiment, on the basis of the above-mentioned solutions, after jumping to the video presentation mode interface and displaying the storage result of the target video, the method may further include: in response to detecting a triggering operation on a work control of a user home page interface, jumping to a video playing interface and playing the target video.

In the embodiment of the present disclosure, user basic information and user work information are usually displayed on the user home page interface, and relevant operations can be performed on the above-mentioned information through corresponding controls on the user home page interface, such as modifying the user basic information, playing the user work, and the like. When the user needs to watch the target video, it can be implemented by triggering the work control of the user home page interface. Correspondingly, when the triggering operation on the work control of the user home page interface is detected, the video playing interface is jumped to and the target video is played. In addition, the video play interface further displays a sharing control, a praise control, a comment control, and the like. Exemplarily, the user can share the target video to other application software by triggering the sharing control. The user can praise the target video by triggering the praising control. The user can input corresponding words or expressions to comment on the target video by triggering the comment control.

In one embodiment, after the first video segment is obtained, while the video capturing mode control and the video capturing control are displayed on the target interface, the deletion control can also be displayed. Triggering the deletion control can be used to delete the obtained video segment. The video segment to be deleted can be a last video segment previous to the current video segment or last several video segments previous to the current video segment, which can be determined according to the actual situation and is not limited herein. The above is applicable to a case where the user is not satisfied with a certain captured video segment, and the corresponding video segment can be deleted by triggering the deletion control of the target interface.

Figure 4A:
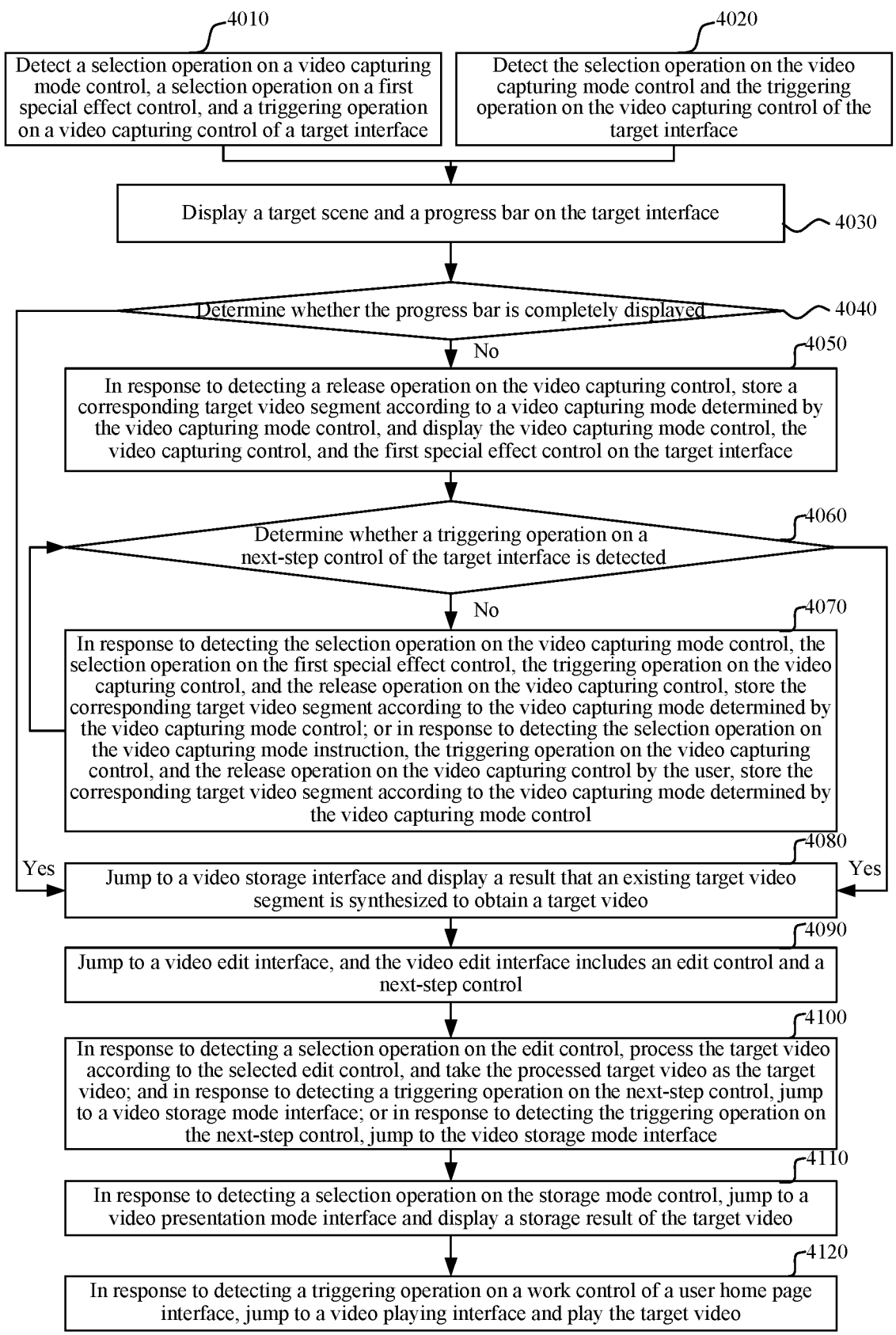
FIG. 4A is a flowchart of another video processing method according to an embodiment of the present disclosure.

FIG. 4A is a flowchart of another video processing method according to an embodiment of the present disclosure. This embodiment may be applied to a case where a difficulty of video processing is reduced. As shown in FIG. 4A, the method includes steps described below.

In step 4010, a selection operation on a video capturing mode control, a selection operation on a first special effect control, and a triggering operation on a video capturing control of a target interface are detected, and step 4030 are turned to and executed.

In step 4020, the selection operation on the video capturing mode control and the triggering operation on the video capturing control of the target interface are detected.

In step 4030, a target scene and a progress bar are displayed on the target interface.

In step 4040, whether the progress bar is completely displayed is determined; if the progress bar is completely displayed, step 4080 is turned to and executed; and if the progress bar is not completely displayed, step 4050 is executed.

In step 4050, a corresponding target video segment is stored according to a video capturing mode determined by the video capturing mode control, and the video capturing mode control, the video capturing control, and the first special effect control are displayed on the target interface in response to detecting a release operation on the video capturing control.

In step 4060, whether a triggering operation on a next-step control of the target interface is detected is determined; if the triggering operation on the next-step control of the target interface is detected, step 4080 is turned to and executed; and if the triggering operation on the next-step control of the target interface is not detected, step 4070 is executed.

In step 4070, in response to detecting the selection operation on the video capturing mode control, the selection operation on the first special effect control, the triggering operation on the video capturing control, and the release operation on the video capturing control, the corresponding target video segment is stored according to the video capturing mode determined by the video capturing mode control; or in response to detecting the selection operation on the video capturing mode instruction, the triggering operation on the video capturing control, and the release operation on the video capturing control are detected, after the corresponding target video segment is stored according to the video capturing mode determined by the video capturing mode control, step 4060 is returned to and executed.

In step 4080, a video storage interface is jumped to and a result that an existing target video segment is synthesized to obtain a target video is displayed.

In step 4090, a video edit interface is jumped to, and the video edit interface includes an edit control and a next-step control.

In step 4100, in response to detecting a selection operation on the edit control, the target video is processed according to the selected edit control, and the processed target video is taken as the target video; and in response to detecting a triggering operation on the next-step control, a video storage mode interface is jumped to. Alternatively, in response to detecting the triggering operation on the next-step control, the video storage mode interface is jumped to, and the video storage mode interface includes a storage mode control.

In step 4110, in response to detecting a selection operation on the storage mode control, a video presentation mode interface is jumped to and a storage result of the target video is displayed, and the storage mode control includes a draft box control and a next-step control.

In step 4120, in response to detecting a triggering operation on a work control of a user home page interface, a video playing interface is jumped to and the target video is played.

A video sharing software on a terminal is described as an example below.

Figure 4B:
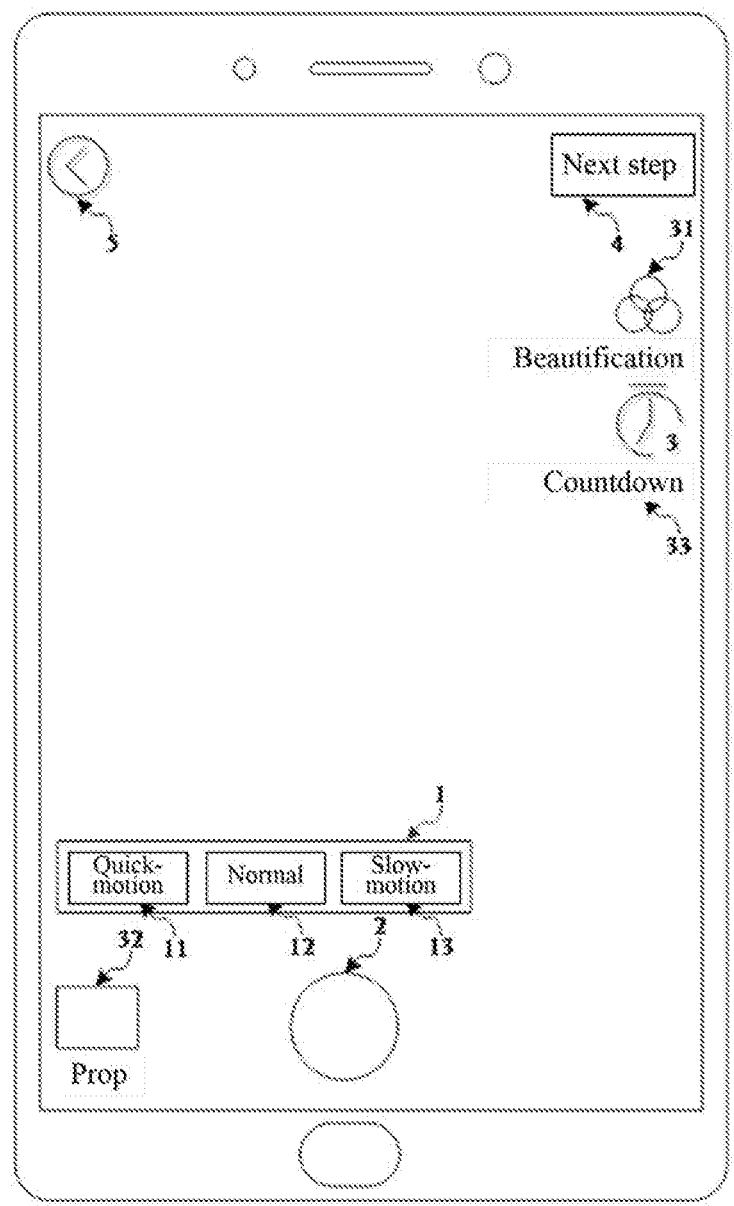
FIG. 4B is a structural diagram of an initial target interface according to an embodiment of the present disclosure.

As shown in FIG. 4B, a structural diagram of an initial target interface is illustrated, that is, no video has been captured yet. The initial target interface may include a video capturing mode control 1, a video capturing control 2, a first special effect control (not shown in the figure), a next-step control 4, and a back control 5. The video capturing mode control 1 may include a quick-motion capturing mode control 11, a normal capturing mode control 12, and a slow-motion capturing mode control 13. In this embodiment, the number of video capturing mode controls 1 is more than one, and the video capturing mode control 1 is not limited to that shown in FIG. 4A. The first special effect control 3 may include a beautification control 31, a prop control 32, and a countdown control 33. When a user needs to perform video capturing on the target scene, it can be implemented by operating relevant controls of the initial target interface. In this embodiment, the initial target interface will change correspondingly in a video capturing process. A process involved in the video capturing in such a manner that the user controls the control of the target interface is described below.

Figure 4C:
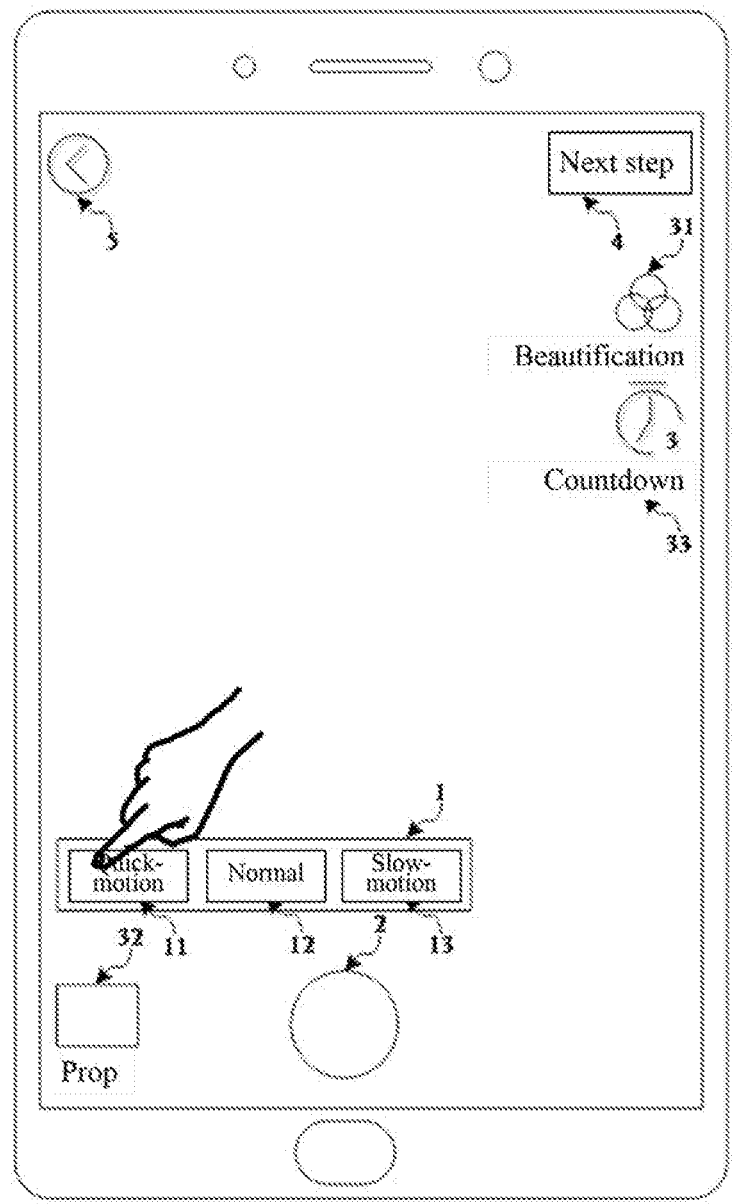
FIG. 4C is a structural diagram of another initial target interface according to an embodiment of the present disclosure.
Figure 4D:
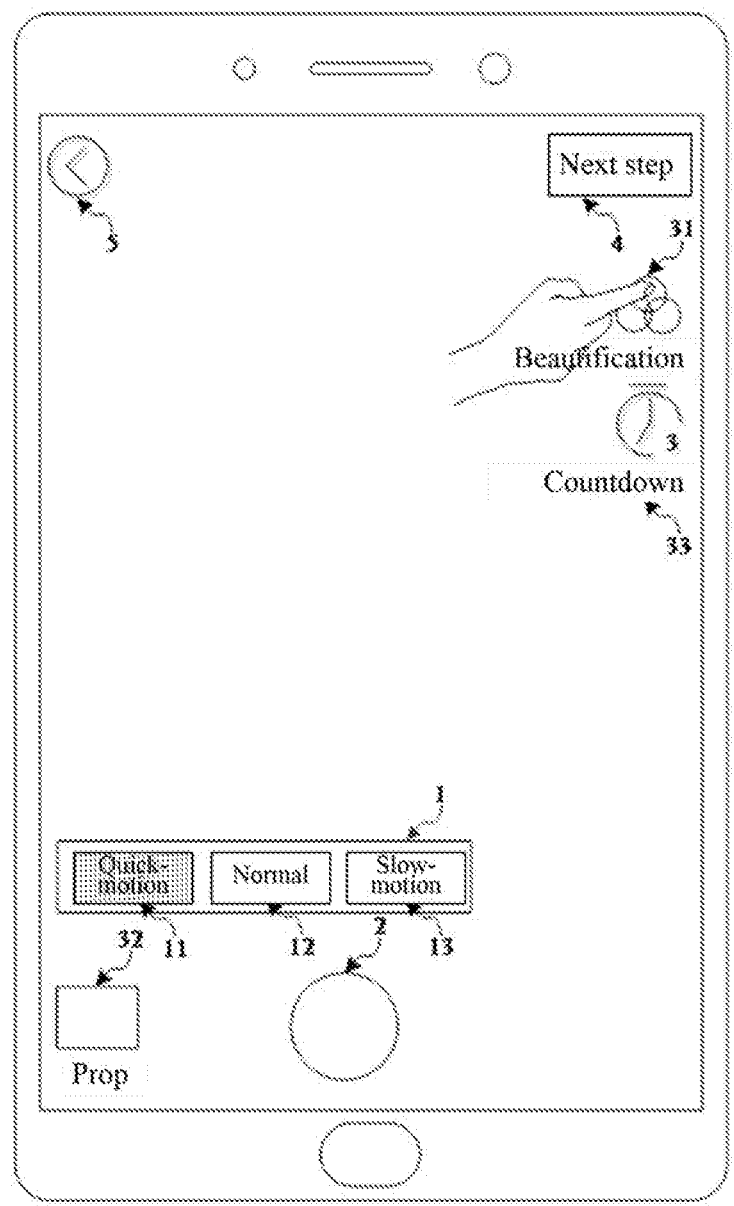
FIG. 4D is a structural diagram of another initial target interface according to an embodiment of the present disclosure.
Figure 4E:
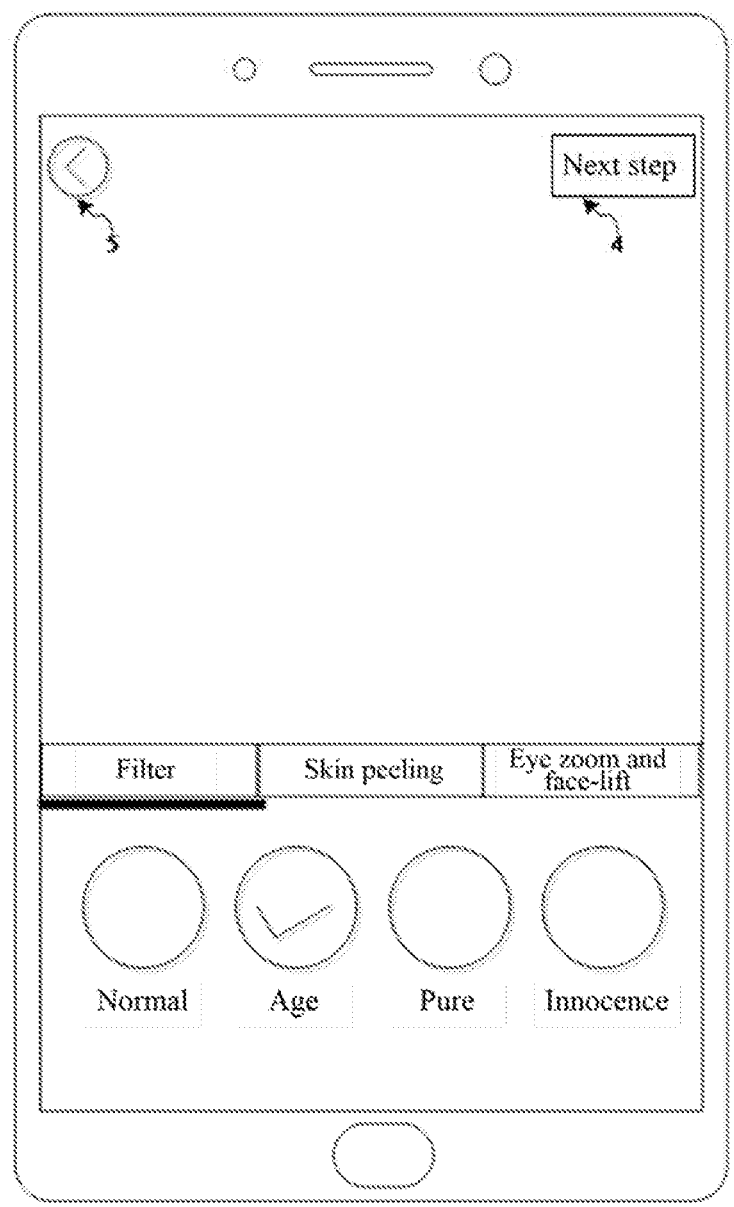
FIG. 4E is a structural diagram of a special effect selection interface according to an embodiment of the present disclosure.
Figure 4F:
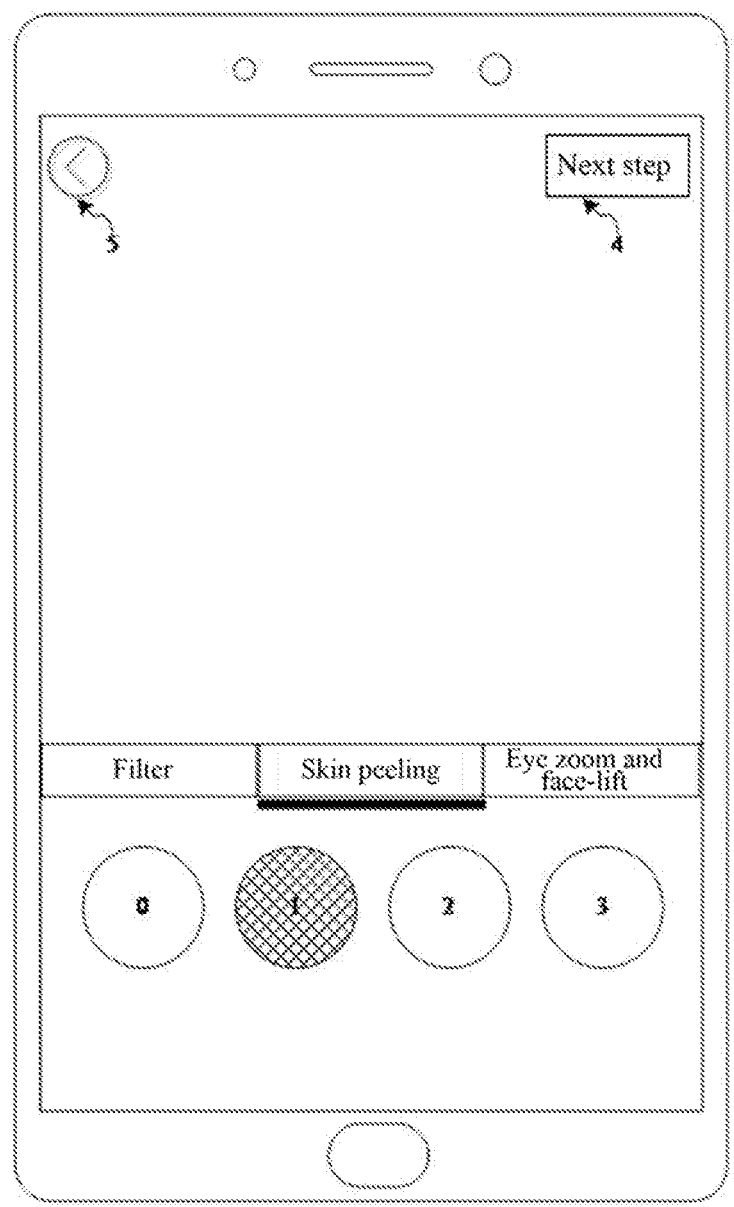
FIG. 4F is a structural diagram of another special effect selection interface according to an embodiment of the present disclosure.
Figure 4G:
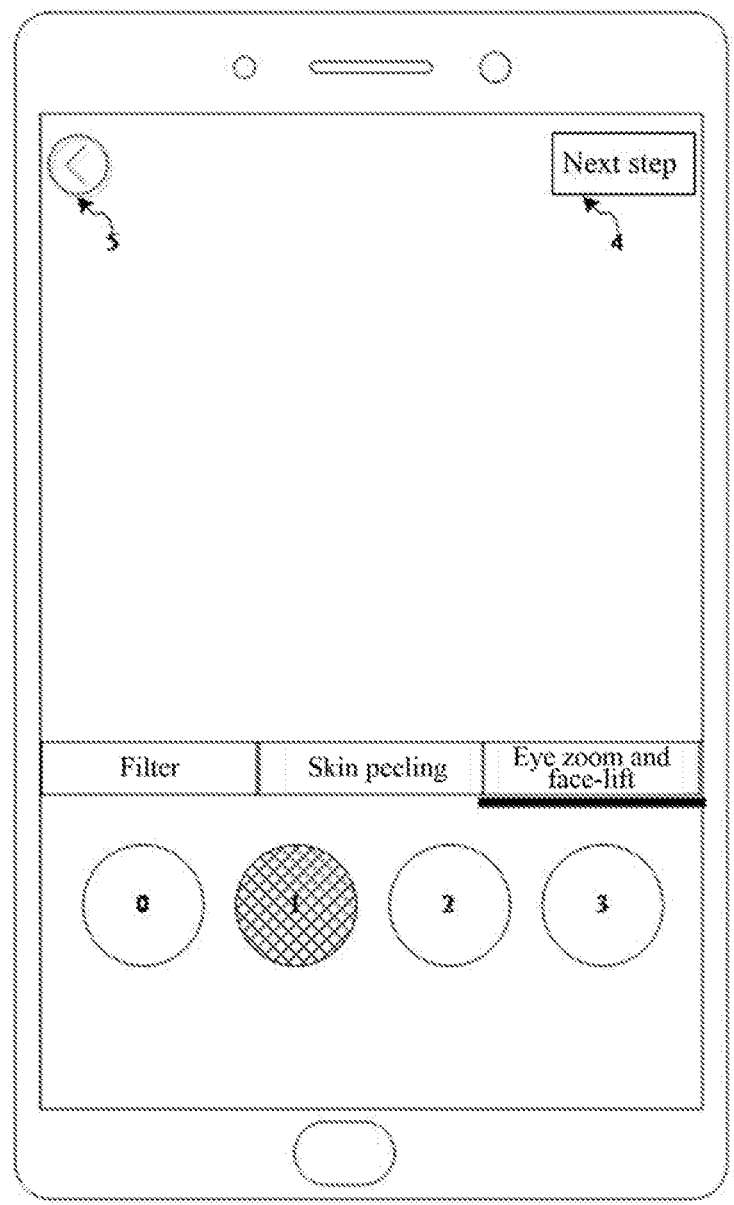
FIG. 4G is a structural diagram of another special effect selection interface according to an embodiment of the present disclosure.
Figure 4H:
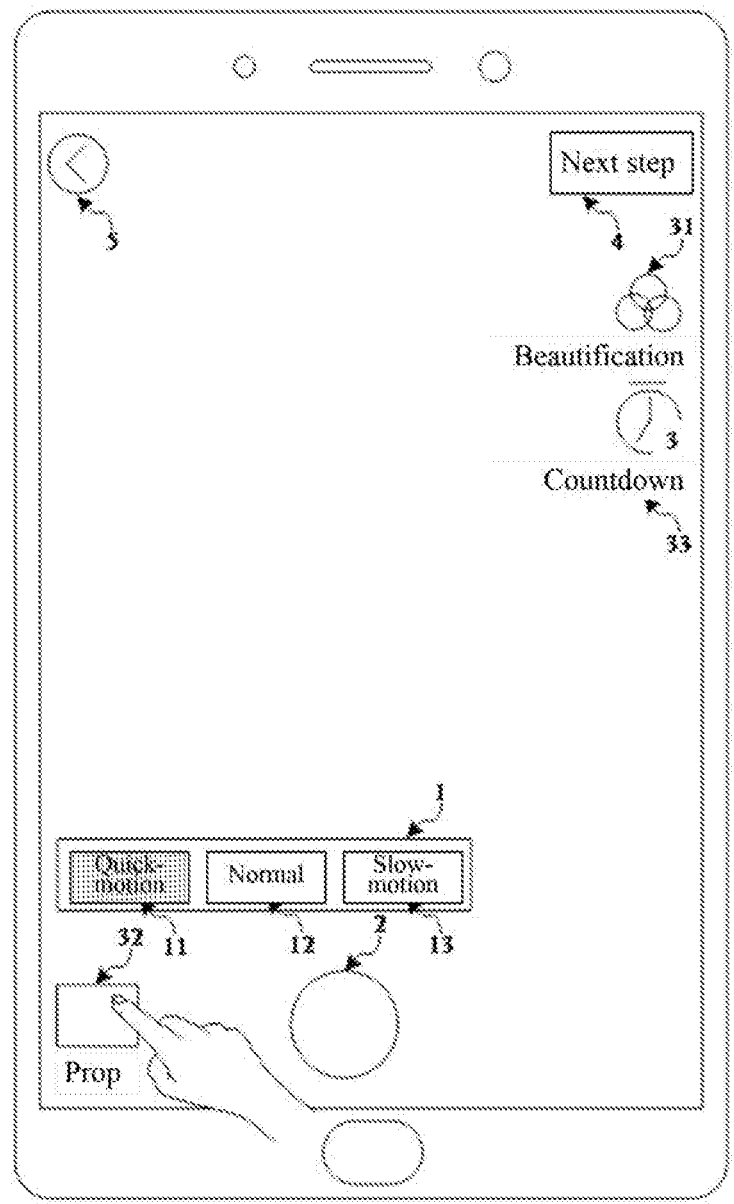
FIG. 4H is a structural diagram of another special effect selection interface according to an embodiment of the present disclosure.
Figure 4I:
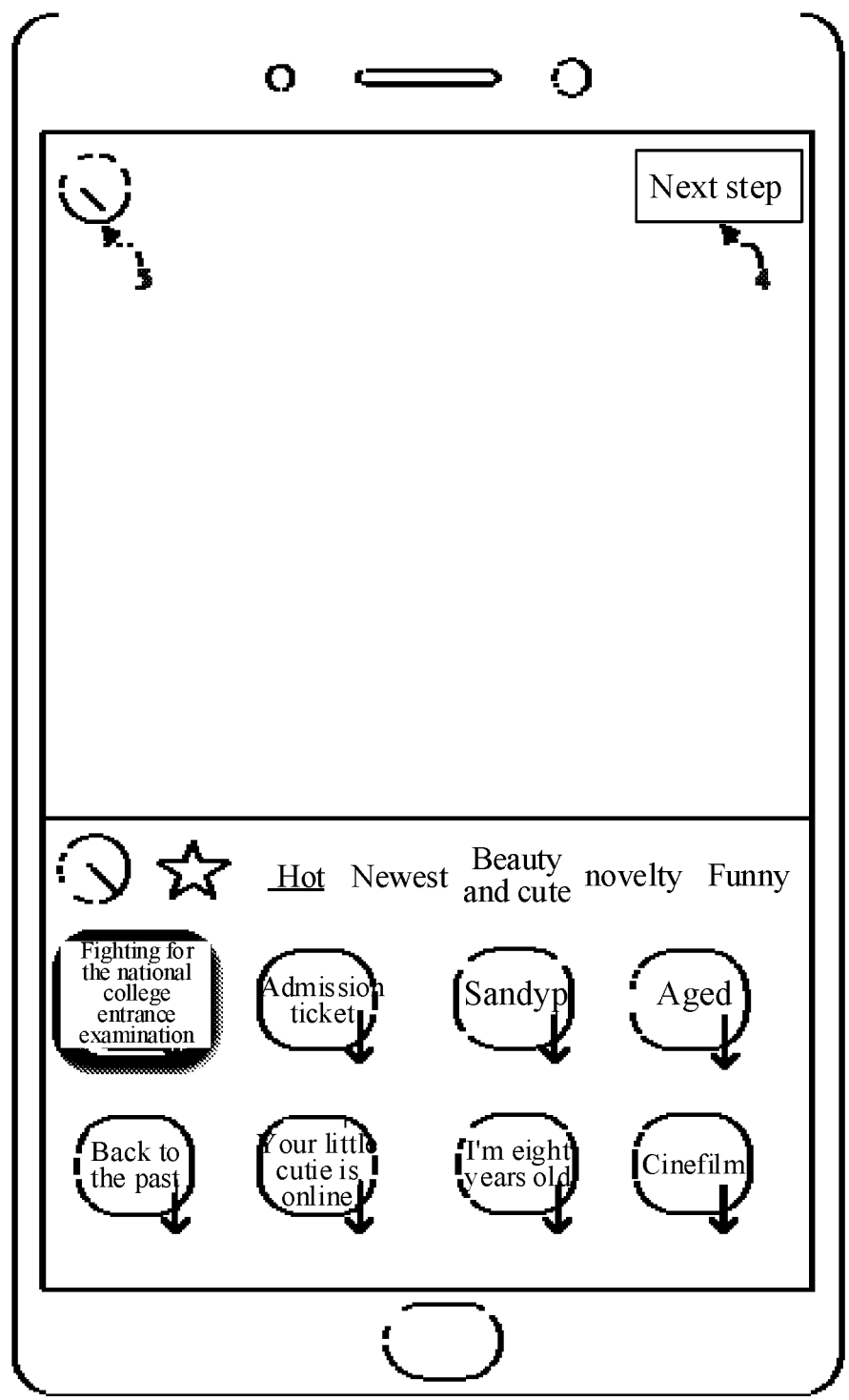
FIG. 4I is a structural diagram of another special effect selection interface according to an embodiment of the present disclosure.

Firstly, the user completes selection operations of a capturing mode and a special effect form by controlling relevant controls of the initial target interface. As shown in FIG. 4C, the user selects the quick-motion capturing mode control 11 by the selection operation on the video capturing mode control 1 of the initial target interface. As shown in FIG. 4D, a beautification interface shown in FIG. 4E is jumped to by the triggering operation of the user on the beautification control 31 of the initial target interface. At the same time, the beautification interface displays a filter control, a skin peeling control, and an eye zoom and face-lift control, age is selected by a triggering operation on the filter control. A skin peeling selection interface shown in FIG. 4F is jumped to by a triggering operation on the skin peeling control and a numerical value 1 is selected. Moreover, an eye zoom and face-lift selection interface shown in FIG. 4G is jumped to by a triggering operation on the eye zoom and face-lift control and a numerical value 1 is selected. As shown in FIG. 4H, a prop interface as shown in FIG. 4I is jumped to by a triggering operation of the user on the prop control 32 of the initial target interface, and fighting for the national college entrance examination is selected. Furthermore, the countdown control 33 is not triggered, that is, the special effect is not selected. So far, the selection operations of the video capturing mode and the special effect form are completed.

Figure 4J:
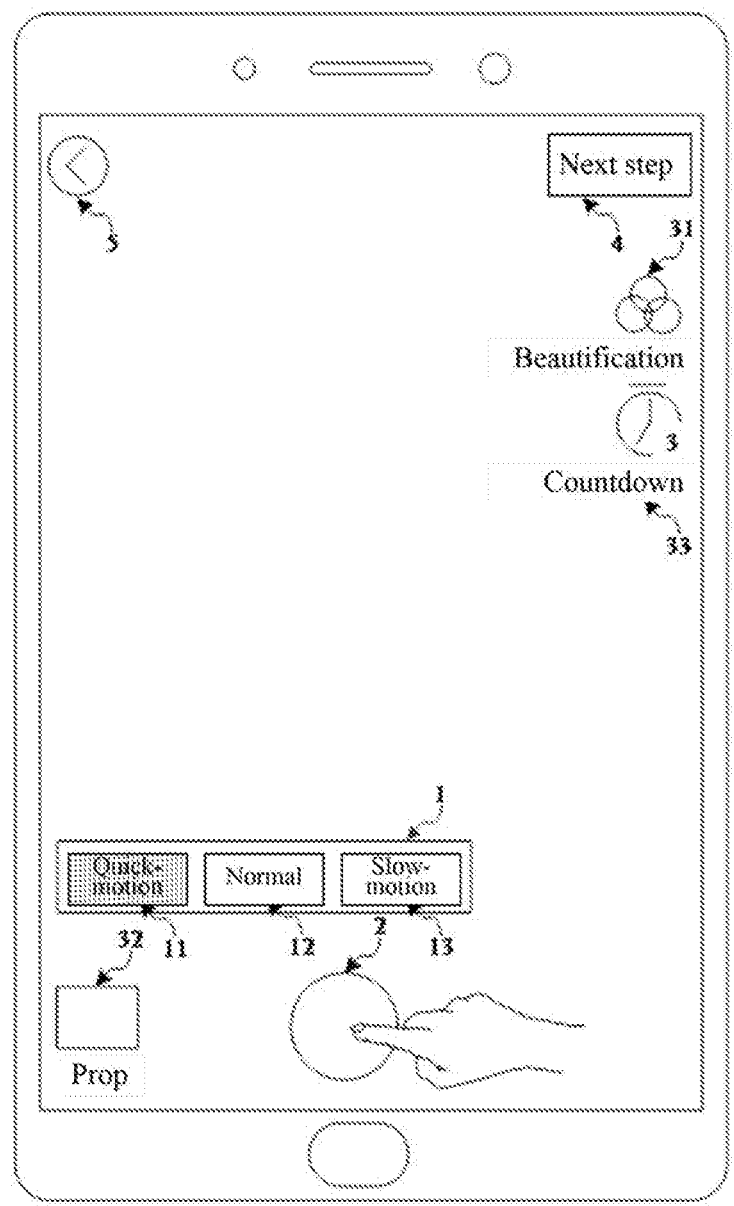
FIG. 4J is a structural diagram of a capturing interface according to an embodiment of the present disclosure.
Figure 4K:
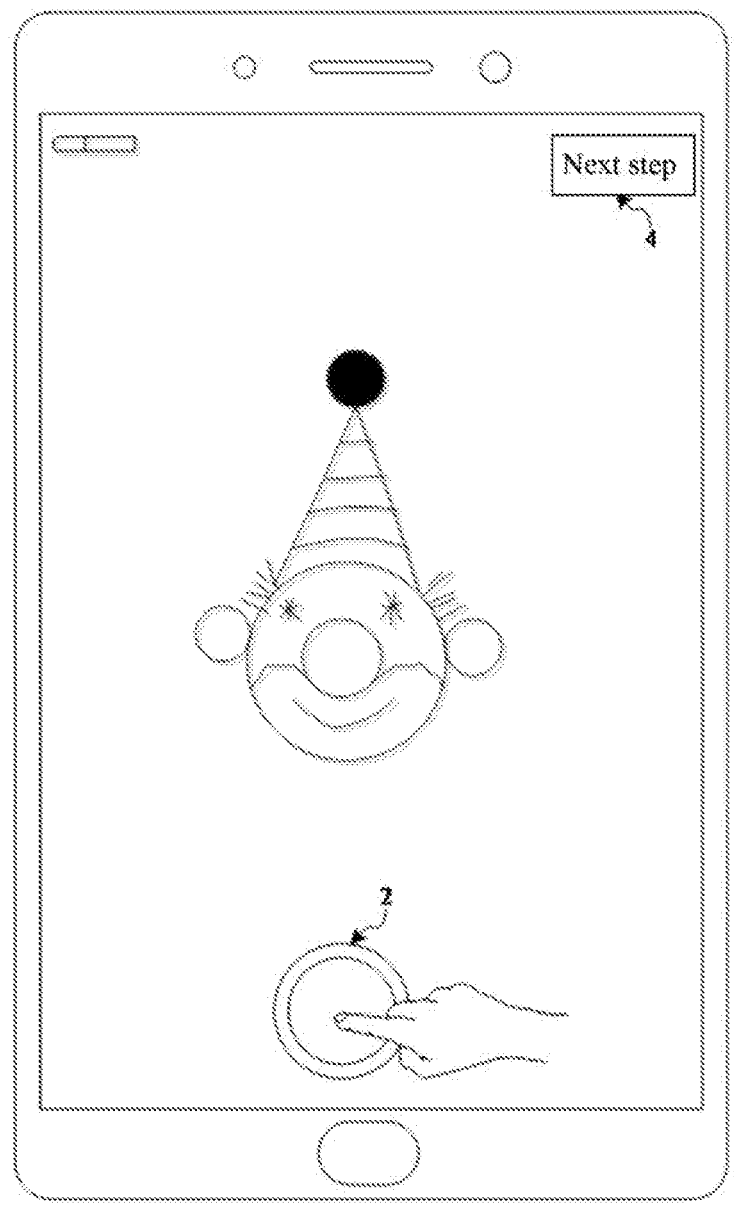
FIG. 4K is a structural diagram of another capturing interface according to an embodiment of the present disclosure.
Figure 4L:
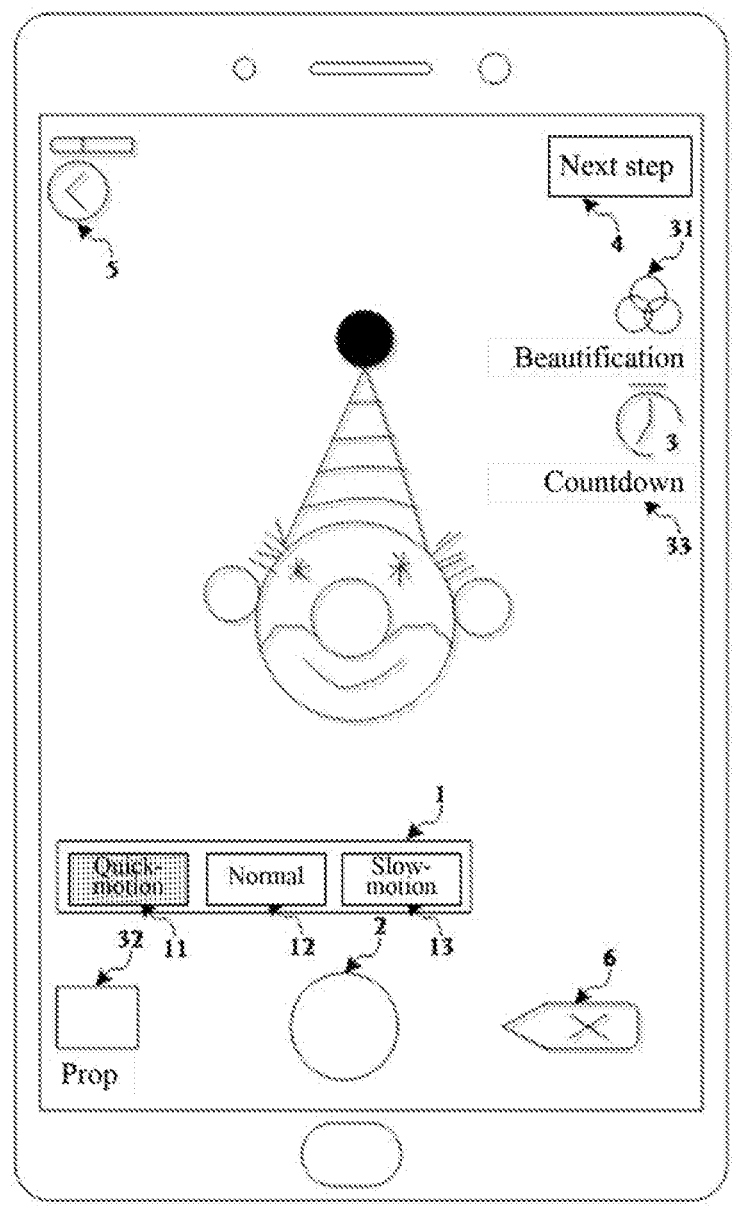
FIG. 4L is a structural diagram of a deletion interface according to an embodiment of the present disclosure.
Figure 4M:
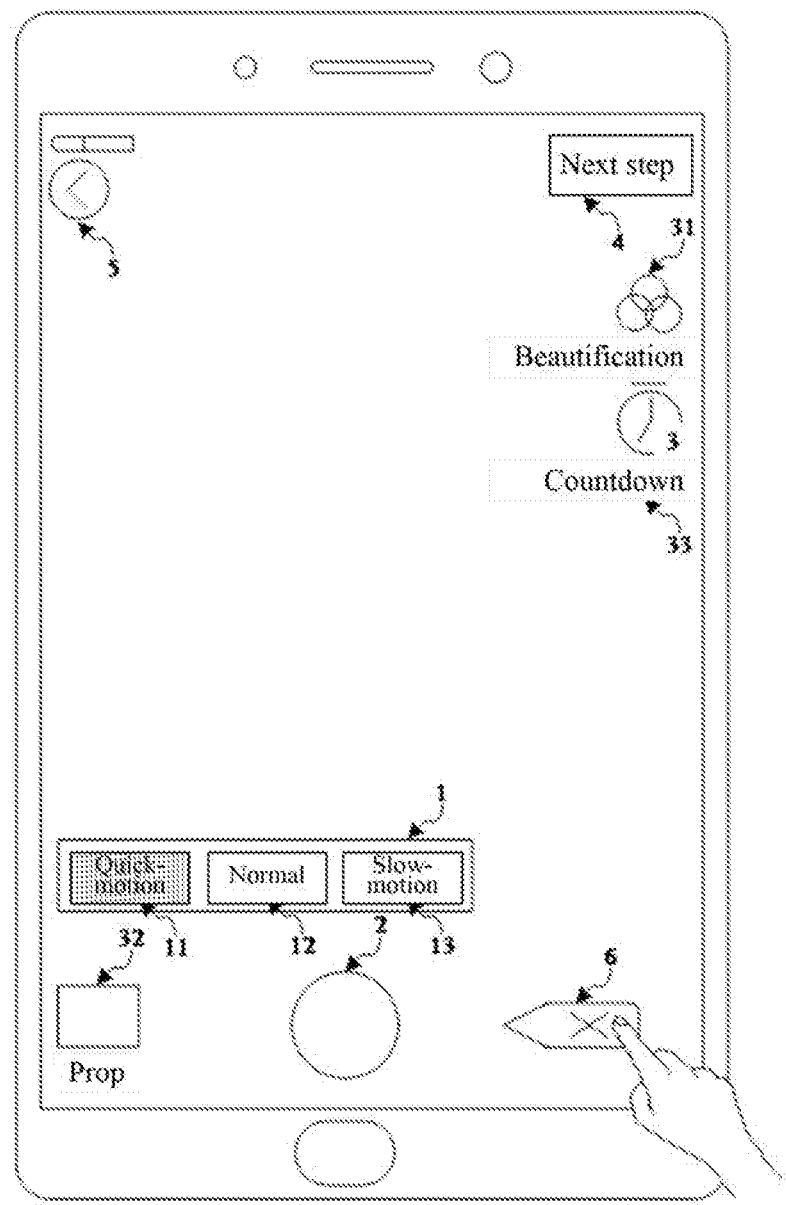
FIG. 4M is a structural diagram of another deletion interface according to an embodiment of the present disclosure.
Figure 4N:
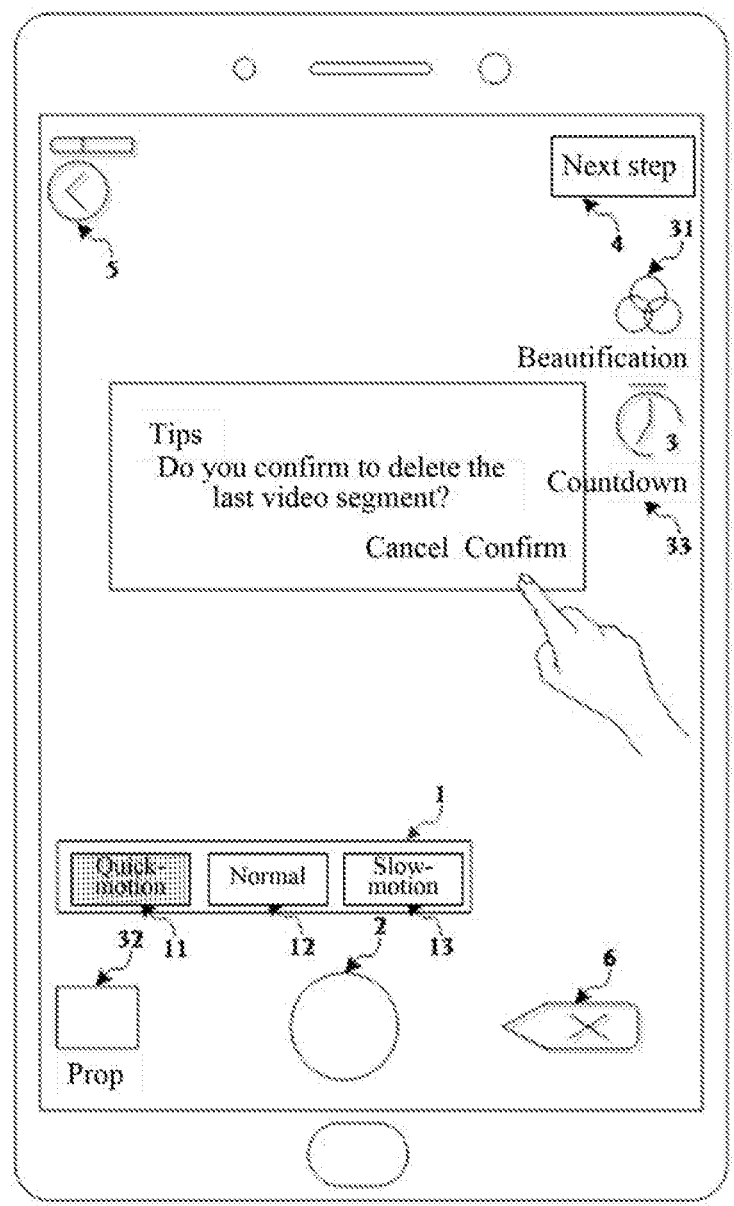
FIG. 4N is a structural diagram of another capturing interface according to an embodiment of the present disclosure.
Figure 4O:
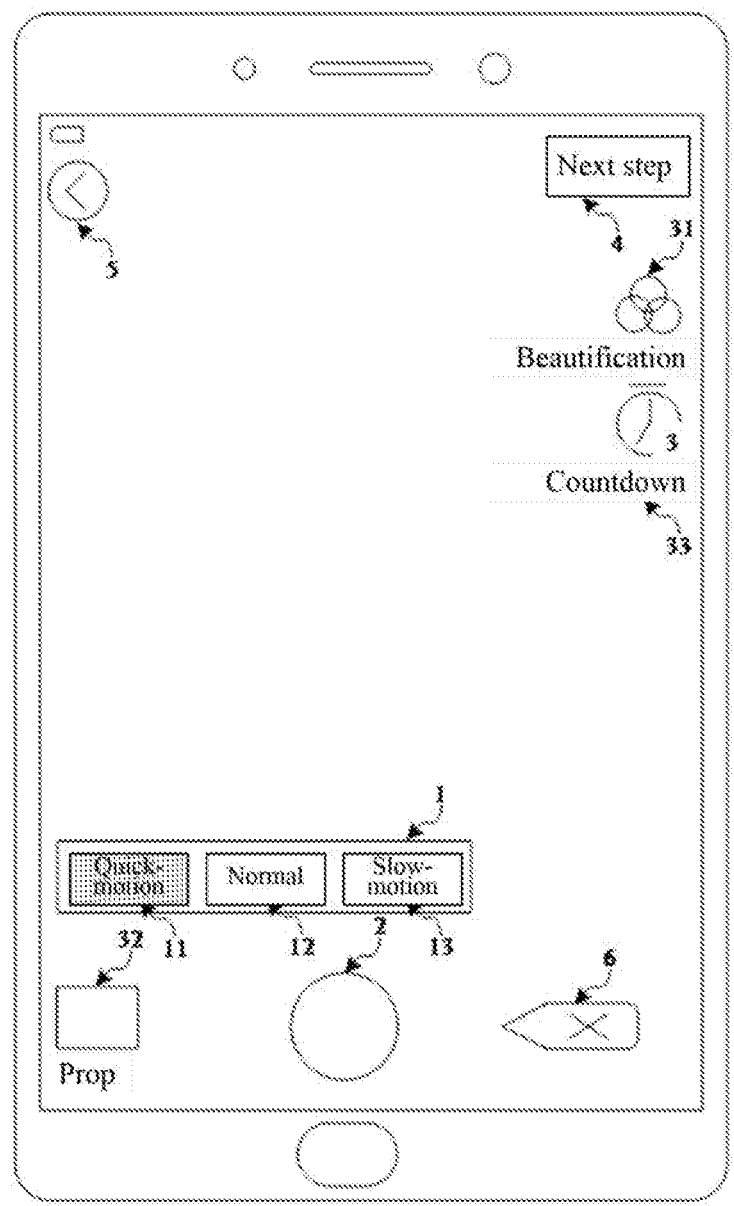
FIG. 4O is a structural diagram of a target interface according to an embodiment of the present disclosure.

As shown in FIG. 4J, a capturing interface shown in FIG. 4K is jumped to by triggering the video capturing control 2 by the user. At this time, the user needs to press the video capturing control 2 for a long time to capture the target scene, and a progress bar is displayed on an upper left corner of the capturing interface. When the user releases the video capturing control 2, capturing of the current video segment is finished, and a corresponding current video segment is obtained. The corresponding current target video segment is stored according to a capturing mode determined by the quick-motion capturing mode control, and a target interface shown in FIG. 4L is jumped to. The target interface further includes an undo control 6, and triggering the undo control 6 can be used for deleting a stored last target video segment. As shown in FIG. 4M, an undo interface shown in FIG. 4N is jumped to by a triggering operation of the user on the undo control 6 of the target interface, and a dialog box is displayed on the undo interface. As shown in FIG. 4N, a target interface shown in FIG. 4O is jumped to by a triggering operation on a confirmation control of the undo interface. Compared with the target interface before revocation, the difference is the progress bar shown in the upper left corner of the figure. After a corresponding target video segment is deleted, a length of a corresponding position of the progress bar is also deleted. In addition, in order to obtain a next video segment, the user may repeatedly perform the above-mentioned selection operation on the video capturing mode control 1 and the first special effect control 3, the triggering operation on the video capturing control 2 and the subsequent capturing operation. In this embodiment, when the progress bar is not completely displayed, the user finishes capturing on each video segment by the release operation on the video capturing control 2.

Figure 4P:
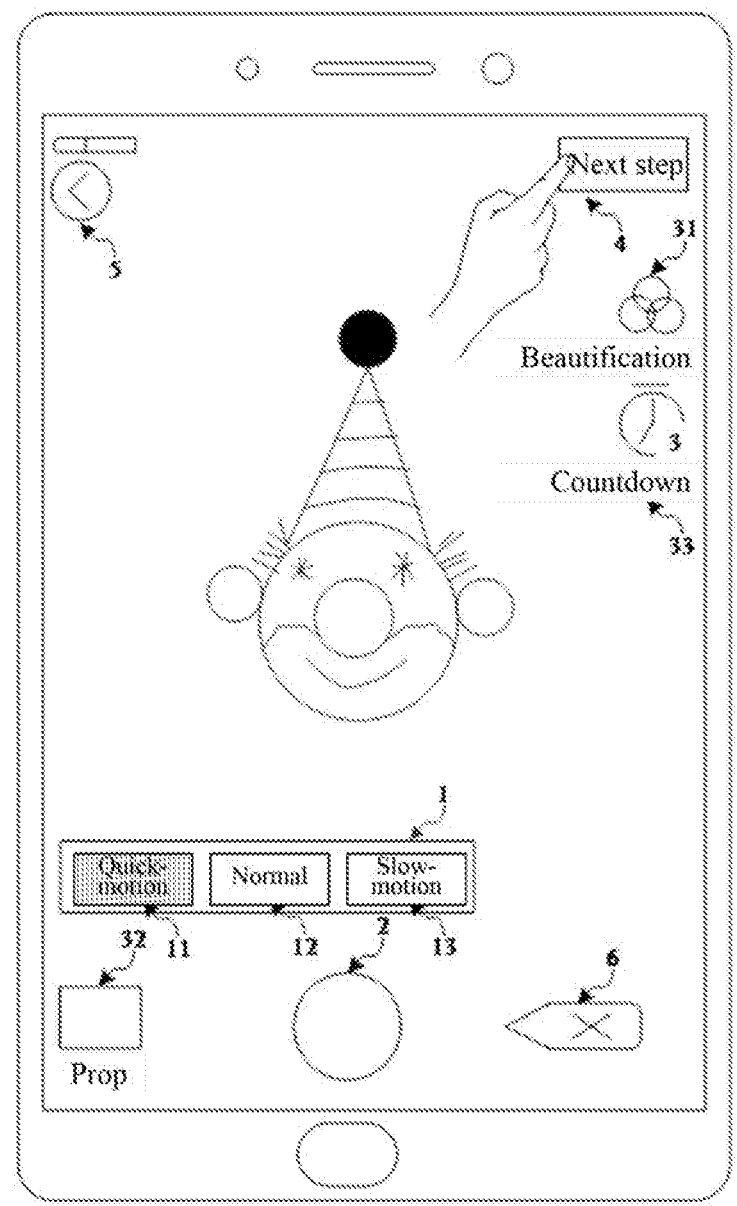
FIG. 4P is a structural diagram of another target interface according to an embodiment of the present disclosure.
Figure 4Q:
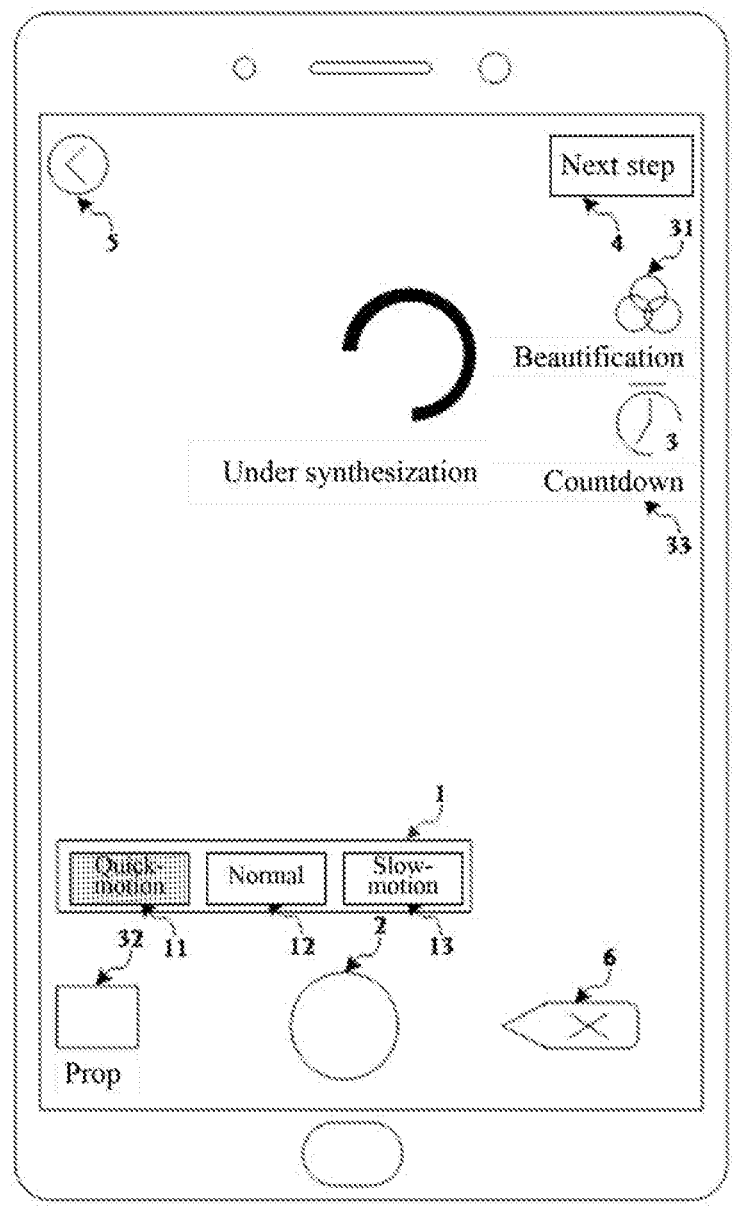
FIG. 4Q is a structural diagram of a video storage interface according to an embodiment of the present disclosure.
Figure 4R:
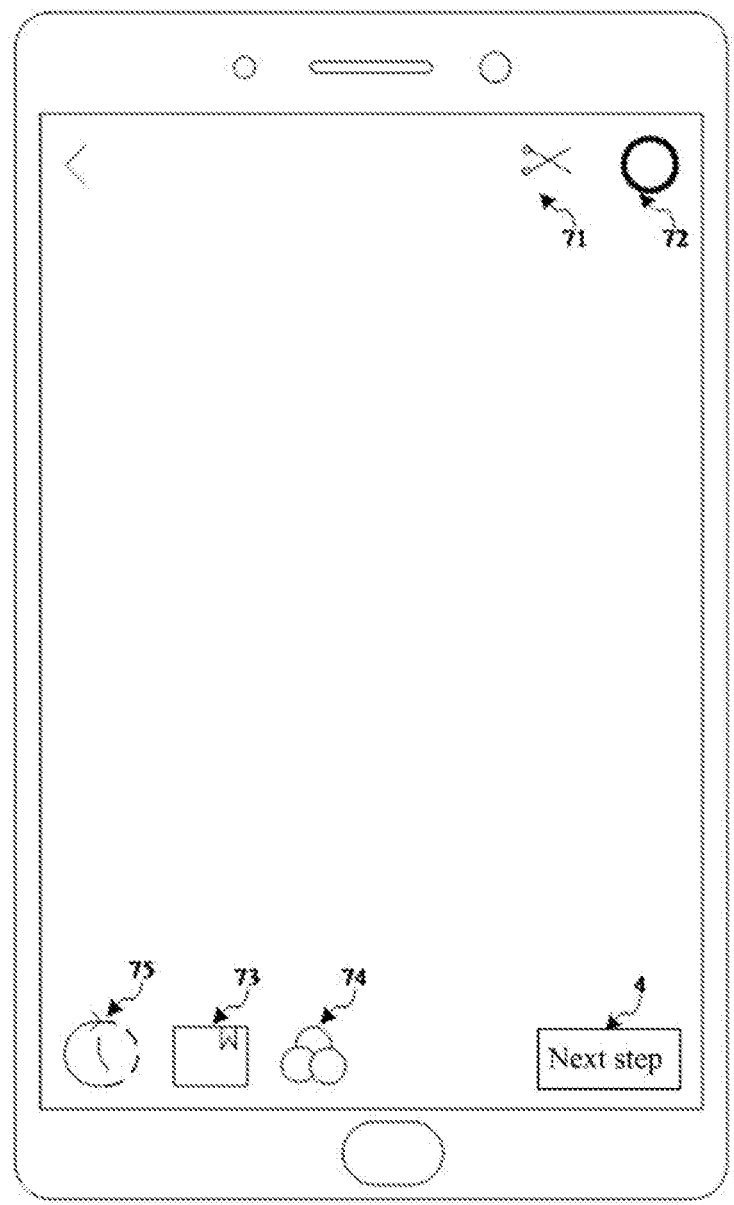
FIG. 4R is a structural diagram of a video edit interface according to an embodiment of the present disclosure.
Figure 4S:
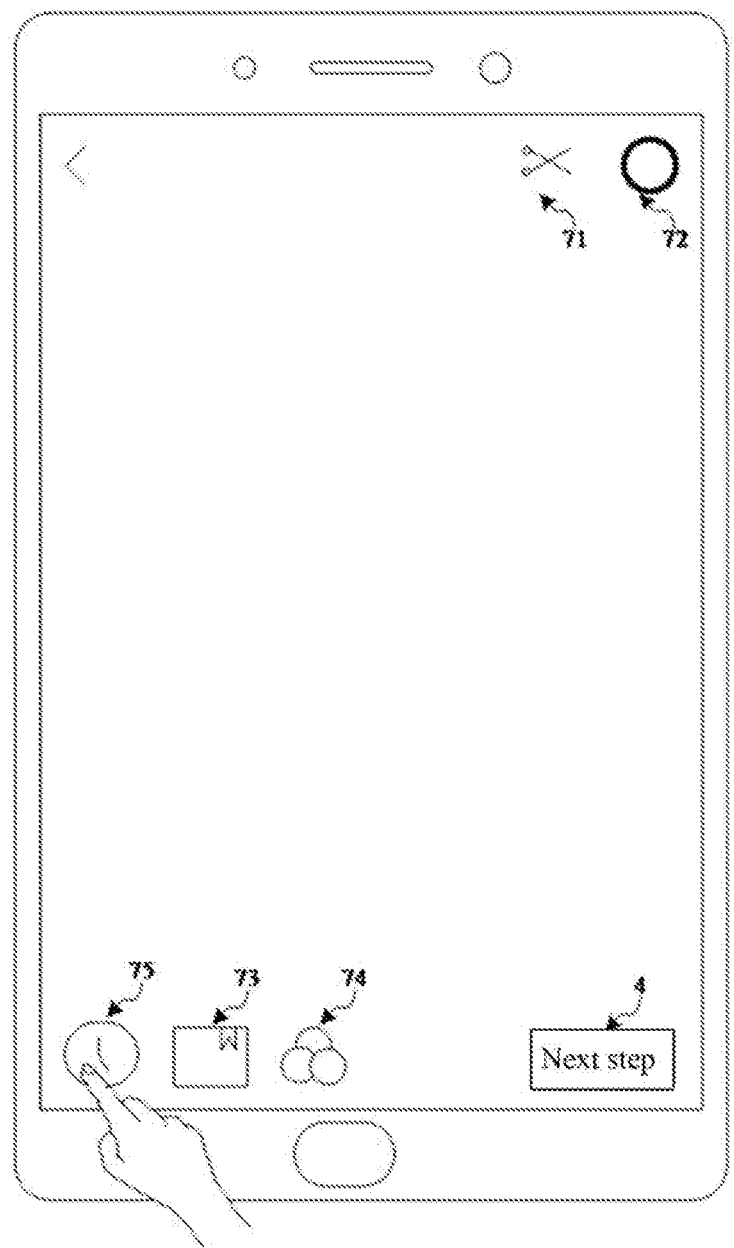
FIG. 4S is a structural diagram of another video edit interface according to an embodiment of the present disclosure.
Figure 4T:
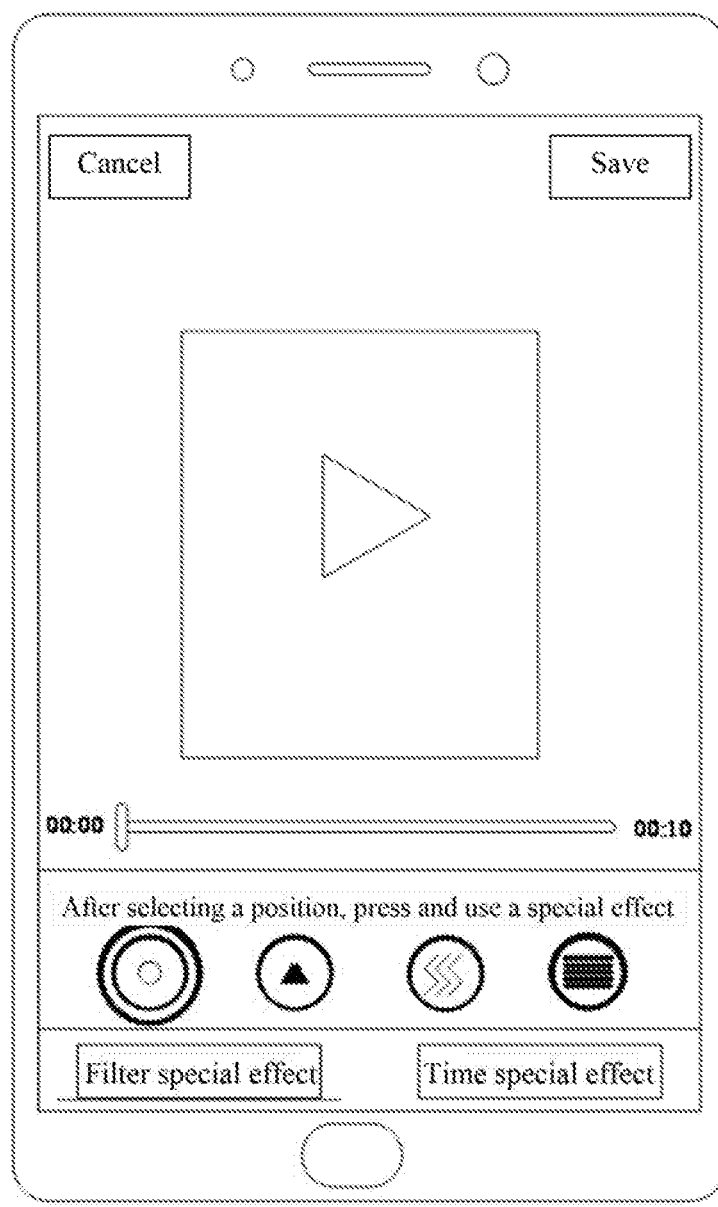
FIG. 4T is a structural diagram of another video edit interface according to an embodiment of the present disclosure.
Figure 4U:
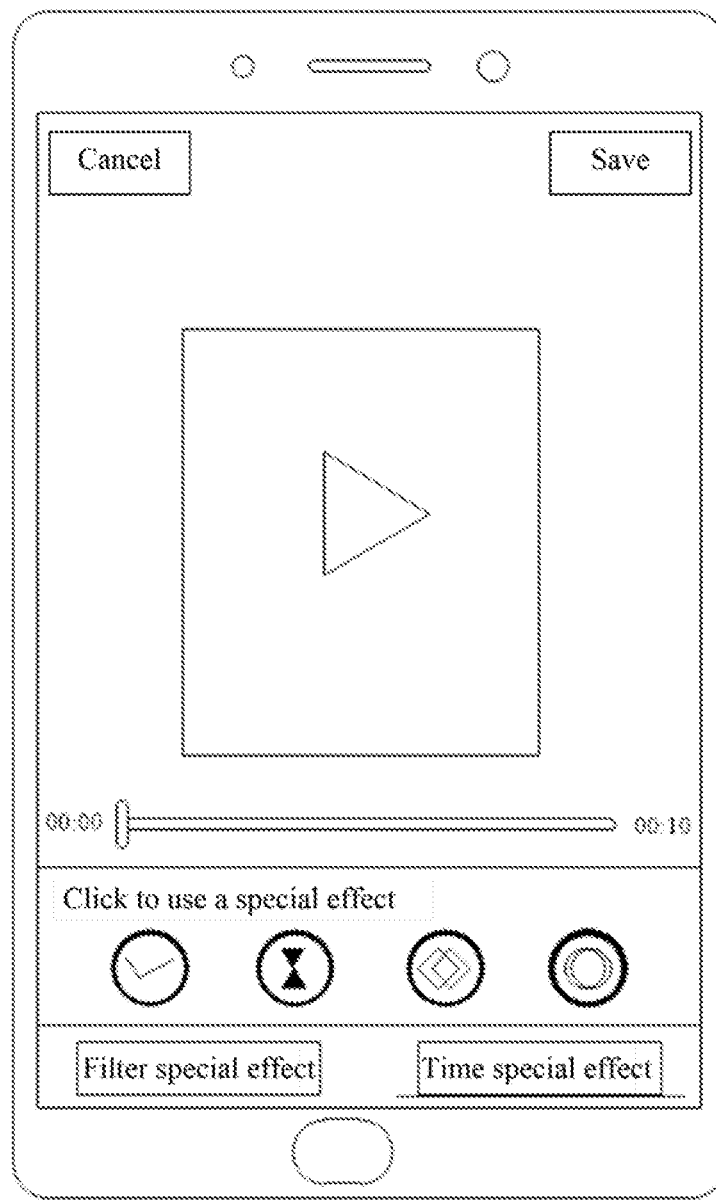
FIG. 4U is a structural diagram of another video edit interface according to an embodiment of the present disclosure.

As shown in FIG. 4P, a video storage interface shown in FIG. 4Q is jumped to by the triggering operation of the user on the next-step control 4 of the target interface, and the obtained target video segments are synthesized to obtain the target video. After the target video is synthesized, a video edit interface shown in FIG. 4R is jumped to, and the video edit interface may include the edit control (not shown in the figure). The edit control may include a music cut control 71, a music selection control 72, a cover selection control 73, and a filter control 74. The filter control 74 described herein is the same as the filter in the beautification control described above. The edit control 7 may further include a second special effect control 75. As shown in FIG. 4S, a second special effect control selection interface shown in FIG. 4T is jumped to by a triggering operation on the second special effect control 75 of the video edit interface. The second special effect control selection interface includes a filter special effect control and a time special effect control. Through the selection operation on the filter special effect control, a first filter special effect is selected. A time special effect selection interface shown in FIG. 4U is jumped to by the triggering operation on the time special effect control, and a first time special effect is selected.

Figure 4V:
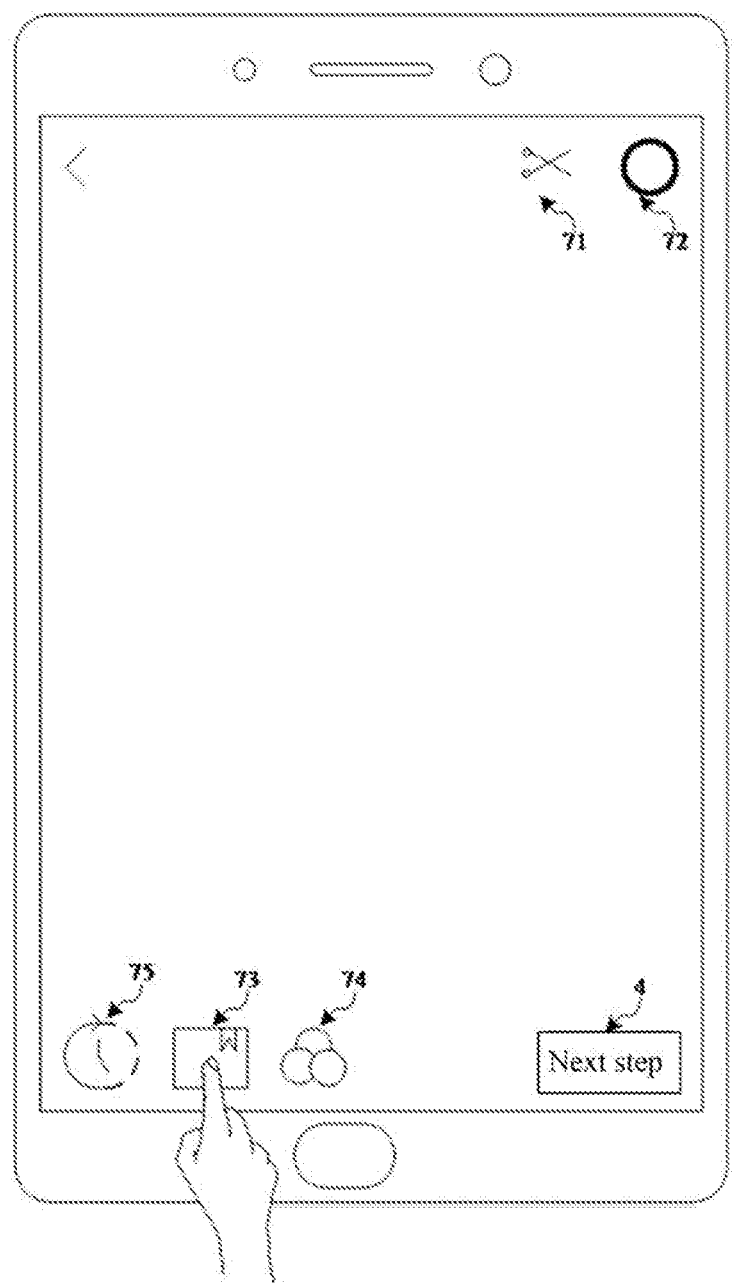
FIG. 4V is a structural diagram of another video edit interface according to an embodiment of the present disclosure.
Figure 4W:
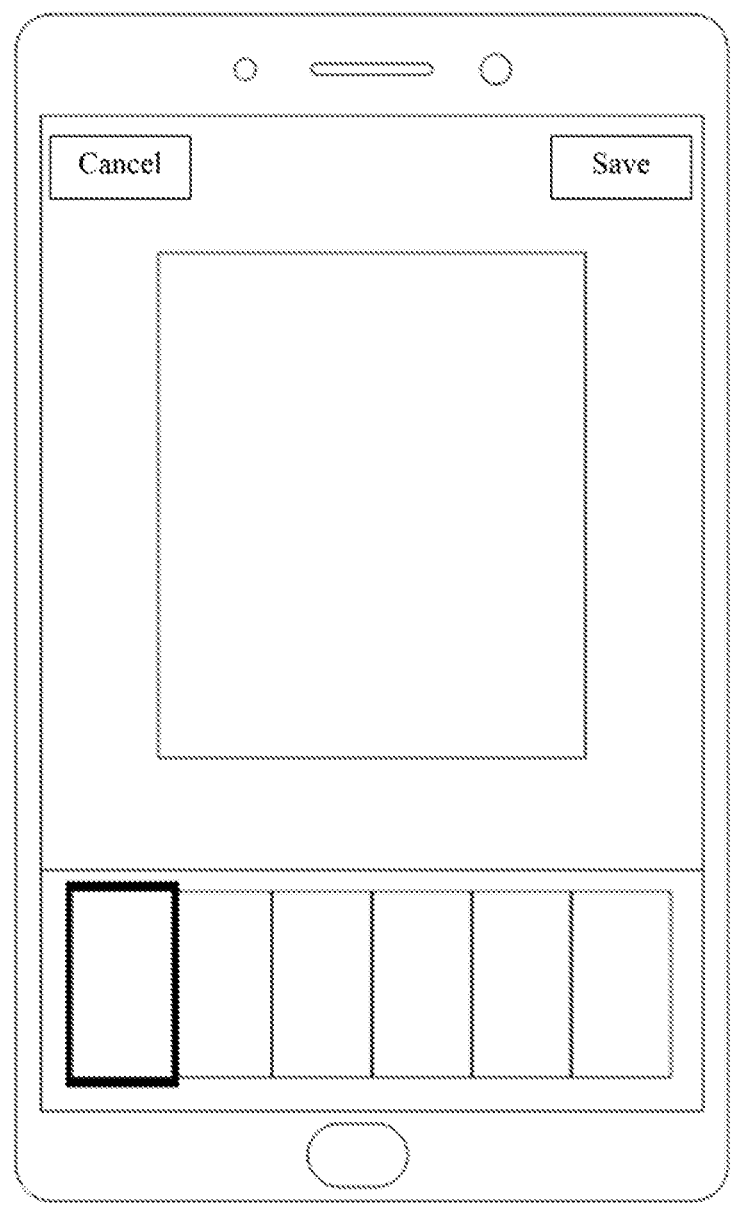
FIG. 4W is a structural diagram of another video edit interface according to an embodiment of the present disclosure.
Figure 4X:
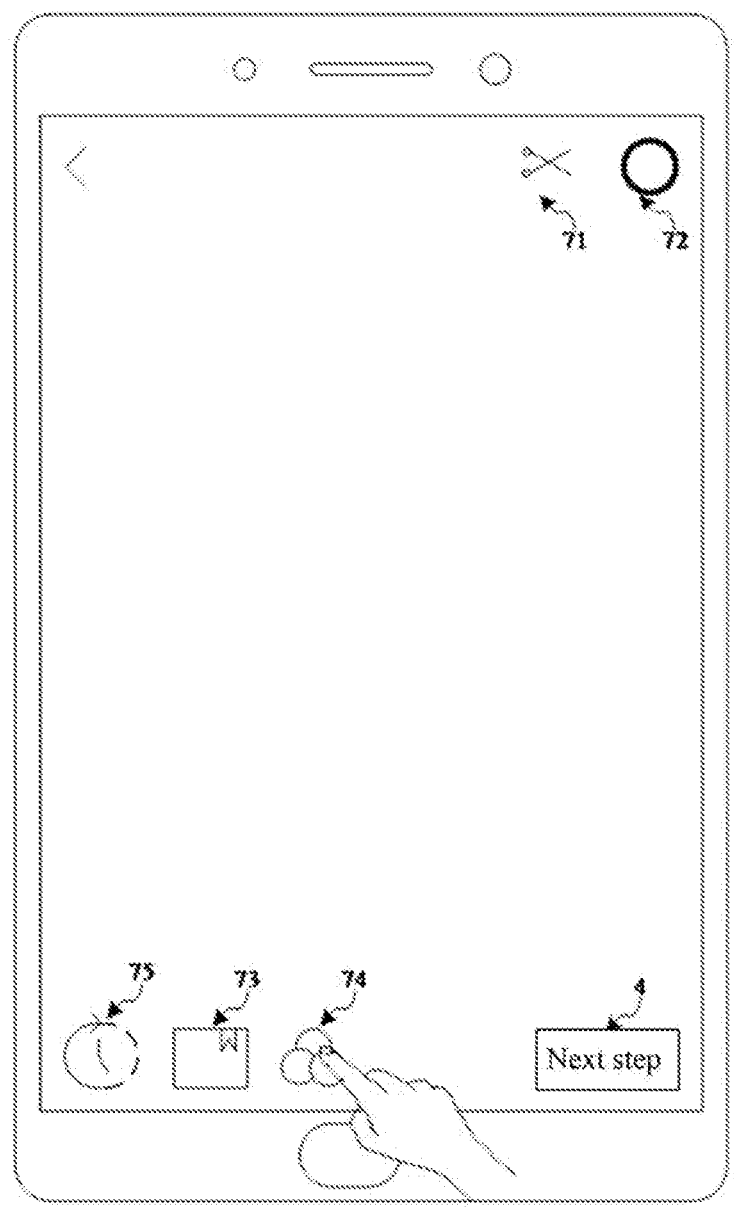
FIG. 4X is a structural diagram of another video edit interface according to an embodiment of the present disclosure.
Figure 4Y:
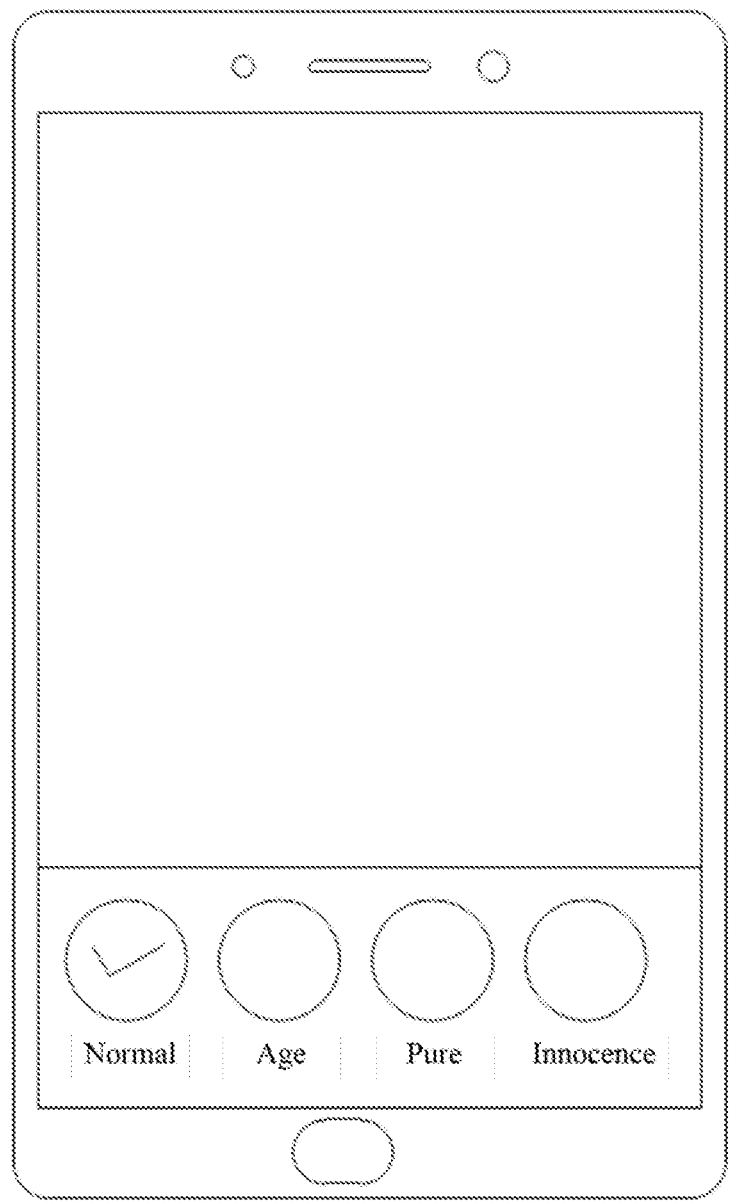
FIG. 4Y is a structural diagram of another video edit interface according to an embodiment of the present disclosure.

As shown in FIG. 4V, a cover selection interface as shown in FIG. 4W is jumped to by a triggering operation on the cover selection control 73 of the video edit interface, and a first cover is selected. As shown in FIG. 4X, a filter selection interface shown in FIG. 4Y is jumped to by a triggering operation on the filter control 74 of the video edit interface, and normal is selected. In addition, the music cut control 71 and the music selection control 72 are not triggered, that is, the above-mentioned edit processing manner is not selected. So far, the synthesization operation of the target video segment and the edit processing operation of the synthesized target video are completed.

Figure 4Z:
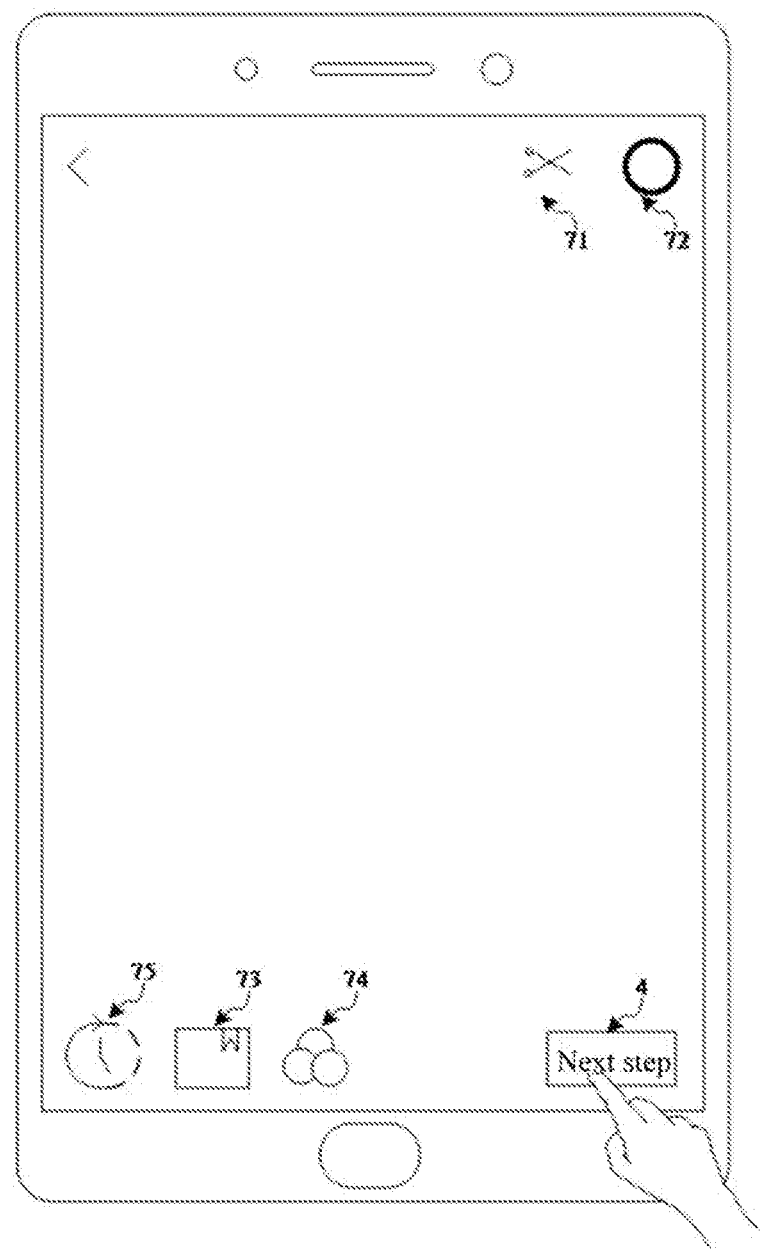
FIG. 4Z is a structural diagram of another target interface according to an embodiment of the present disclosure.
Figure 5A:
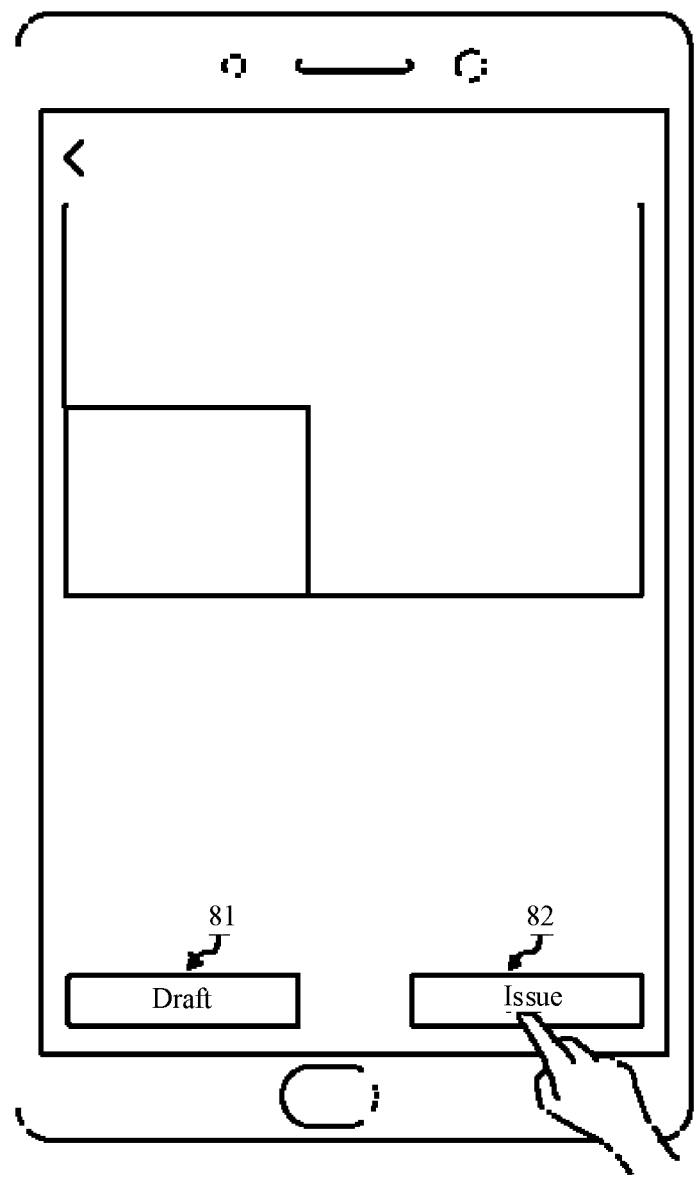
FIG. 5A is a structural diagram of a video storage mode interface according to an embodiment of the present disclosure.
Figure 5B:
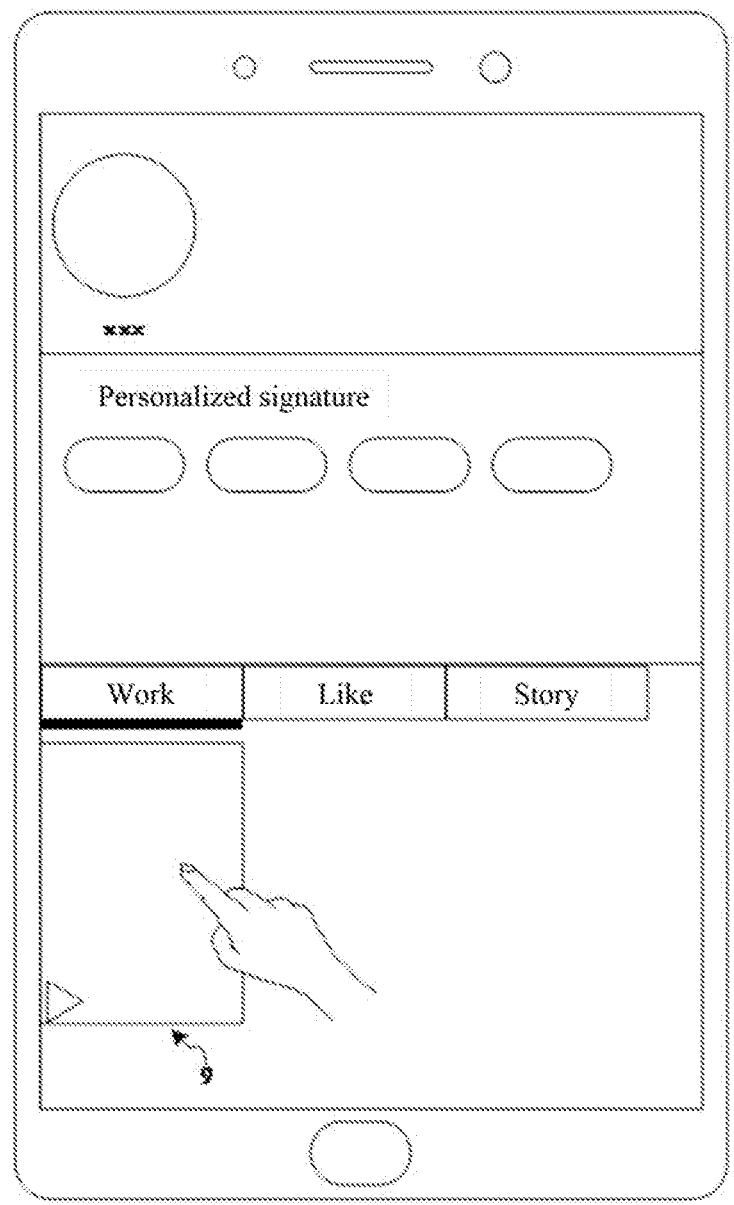
FIG. 5B is a structural diagram of a user home page interface according to an embodiment of the present disclosure.
Figure 5C:
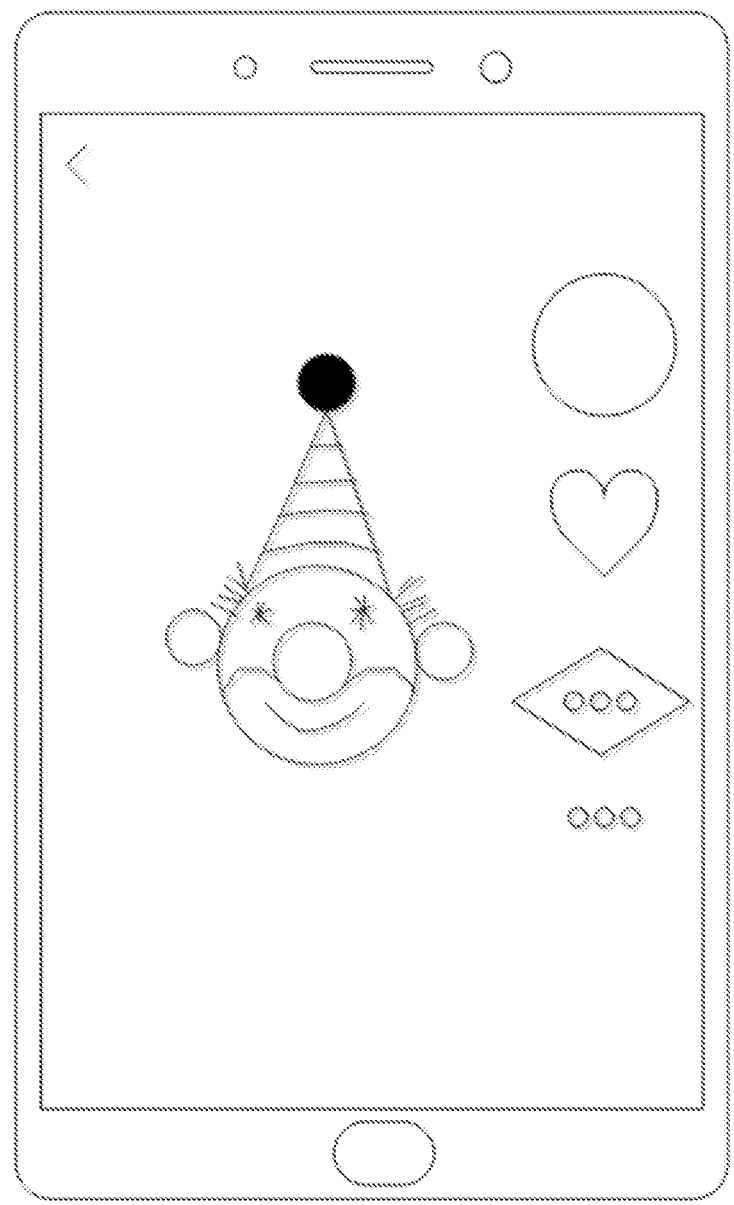
FIG. 5C is a structural diagram of a video playing interface according to an embodiment of the present disclosure.

As shown in FIG. 4Z, a video storage mode interface shown in FIG. 5A is jumped to by a triggering operation of the user on the next-step control 4 of the video edit interface. The video storage mode interface may include a storage mode control (not shown in the figure), and the storage mode control may include the draft box control 81 and the issuing control 82. The user home page interface shown in FIG. 5B is jumped to by a triggering operation of the user on the issuing control 82, and the user home page interface may include the work control 9. A video play interface shown in FIG. 5C is jumped to by a triggering operation on the work control 9, and the target video is played. The video play interface may include a sharing control, a praise control, a comment control and the like. Both the first special effect control and the second special effect control in this embodiment can play a role of adding special effects. However, the first special effect control includes the beautification control, the prop control and the countdown control, while the second special effect control includes the filter special effect control or the time special effect control, and the content included in the two controls is different.

Figure 5D:
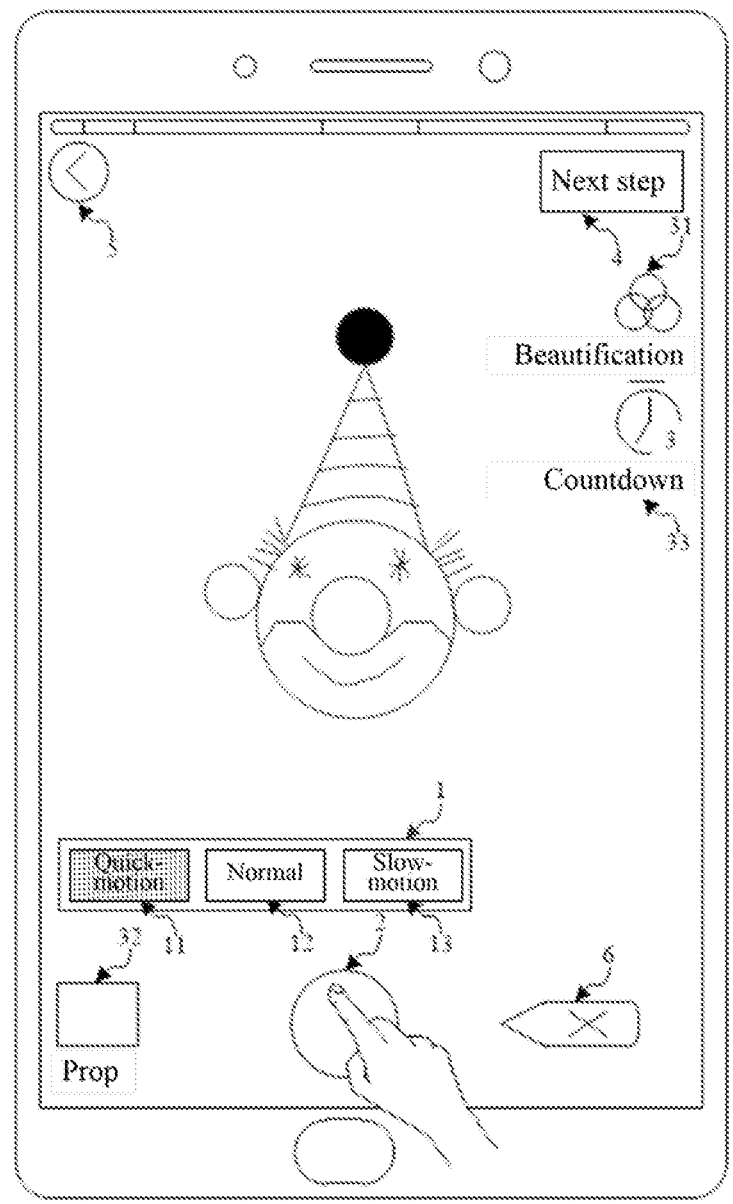
FIG. 5D is a structural diagram of another target interface according to an embodiment of the present disclosure.
Figure 5E:
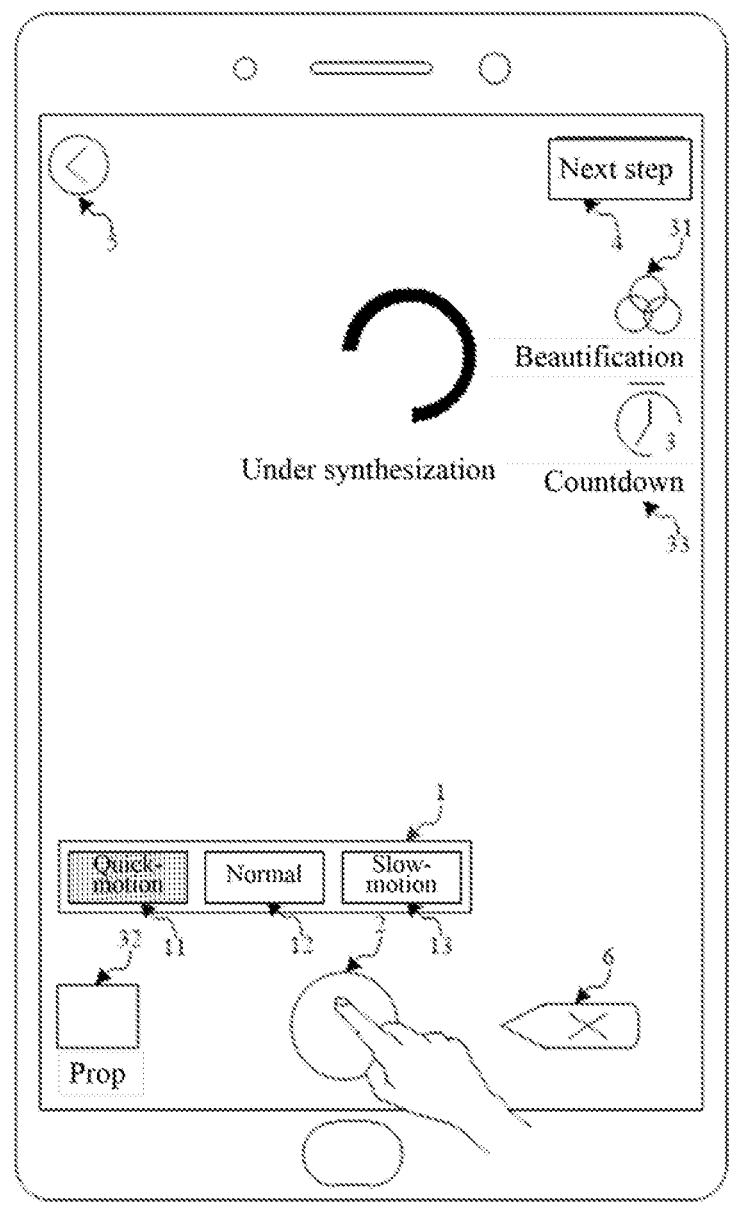
FIG. 5E is a structural diagram of a video storage interface according to an embodiment of the present disclosure.

In addition, after the last selection operation on the video capturing mode control and the triggering operation on the video capturing control of the target interface by the user are detected, until that the progress bar is completely displayed is detected, the video storage interface is jumped to, and the video storage interface is jumped to without having to detect the triggering operation on the video capturing control of the target interface by the user. Exemplarily, as shown in FIG. 5D, when the progress bar is completely displayed is detected, the video storage interface shown in FIG. 5E is jumped to, and the obtained video segments are synthesized to obtain the target video. At this time, the user can still maintain the triggering operation on the video capturing control 2. After the target video is synthesized, the video edit interface shown in FIG. 4R is jumped to.

In the solutions of this embodiment, the selection operation on the video capturing mode control and the triggering operation on the video capturing control of the target interface are detected; the target scene is displayed on the target interface until the release operation on the video capturing control is detected, the corresponding target video segment is stored according to the video capturing mode determined by the video capturing mode control, and the video capturing mode control and the video capturing control are displayed on the target interface, where the target video segment in a different video capturing mode corresponds to a different number of video frames in unit time; whether the triggering operation on the next-step control of the target interface is detected is determined; if the triggering operation on the next-step control of the target interface is not detected, the corresponding target video segment is stored according to the video capturing mode determined by the video capturing mode control when the selection operation on the video capturing mode control, the triggering operation on the video capturing control, and the release operation on the video capturing control are repeatedly detected until the triggering operation on the next-step control of the target interface is detected; and the video storage interface is jumped to and the result that the existing target video segment is synthesized to obtain the target video is displayed. During the actual capturing, that is, when the corresponding video segment is acquired, the capturing itself is not treated differently according to the video capturing mode, but whether the video segment is adjusted is determined according to different video capturing modes after the video segment is obtained, so that there is no requirement on the performance of the hardware device performing the capturing, and the implementation solution is low in cost, fast and simple, thereby improving the flexibility for the user in capturing and processing the video, and the user experience.

Figure 6:
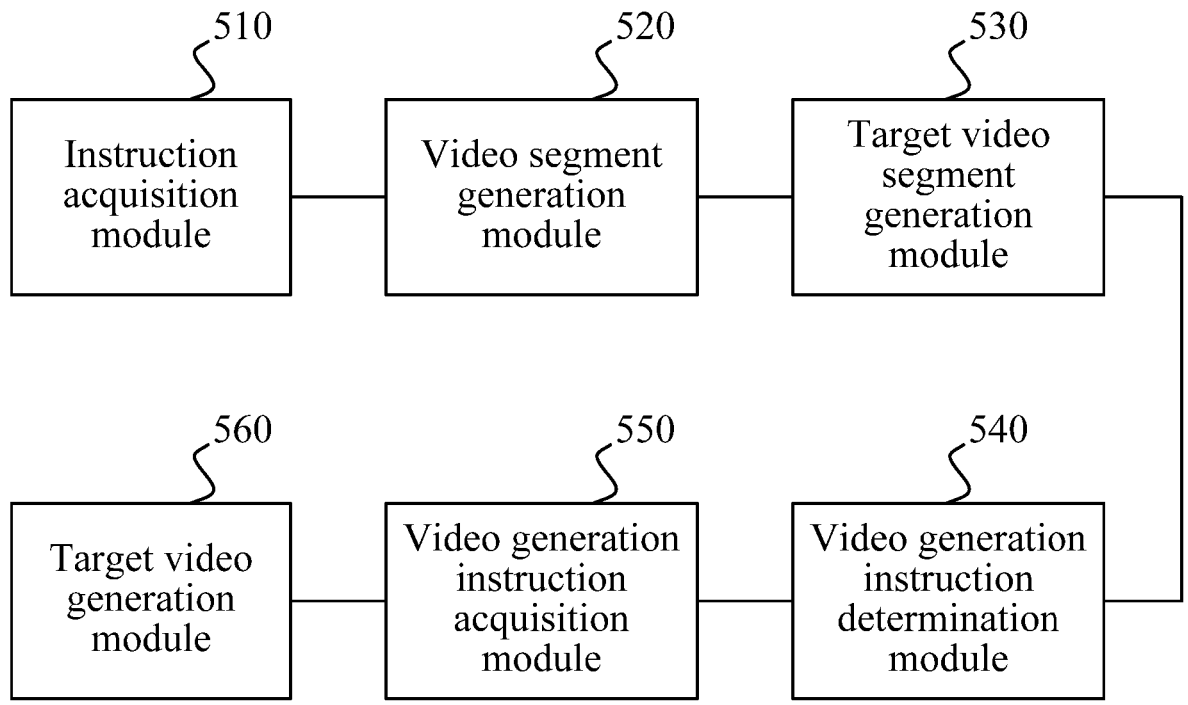
FIG. 6 is a structural diagram of a video processing apparatus according to an embodiment of the present disclosure.

FIG. 6 is a structural diagram of a video processing apparatus according to an embodiment of the present disclosure. This embodiment may be applied to a case where a difficulty of video processing is reduced. The apparatus may be implemented in software and/or hardware, and the apparatus can be configured in a terminal device, such as a mobile phone and/or a tablet computer. As shown in FIG. 6, the apparatus includes an instruction acquisition module 510, a video segment generation module 520, a target video segment generation module 530, a video generation instruction determination module 540, a video generation instruction acquisition module 550, and a target video generation module 560.

The instruction acquisition module 510 is configured to acquire a video capturing mode instruction and a video capturing instruction.

The video segment generation module 520 is configured to perform video capturing on a target scene according to the video capturing instruction until a video capturing pause instruction is acquired, and obtain a video segment between the video capturing instruction and the video capturing pause instruction.

The target video segment generation module 530 is configured to determine whether to adjust the video segment according to the video capturing mode instruction and obtain a corresponding target video segment, where a target video segment in a different video capturing mode corresponds to a different number of video frames in unit time.

The video generation instruction determination module 540 is configured to determine whether a video generation instruction is acquired.

The video generation instruction acquisition module 550 is configured to: in response to determining that the video generation instruction is not acquired, repeatedly acquire the video capturing mode instruction, the video capturing instruction and the video capturing pause instruction to obtain a corresponding target video segment until the video generation instruction is acquired.

The target video generation module 560 is configured to generate a target video according to an existing target video segment.

In the solutions of this embodiment, the video capturing mode instruction and the video capturing instruction are acquired through the instruction acquisition module 510; the video segment generation module 520 performs the video capturing on the target scene according to the video capturing instruction until the video capturing pause instruction is acquired, and obtains the video segment between the video capturing instruction and the video capturing pause instruction; the target video segment generation module 530 determines whether to adjust the video segment according to the video capturing mode instruction and obtains the corresponding target video segment, where the target video segment in a different video capturing mode corresponds to a different number of video frames in unit time; the video generation instruction determination module 540 determines whether the video generation instruction is acquired, if video generation instruction acquisition module 550 does not acquire the video generation instruction, the video capturing mode instruction, the video capturing instruction and the video capturing pause instruction are repeatedly acquired to obtain the corresponding target video segment until the video generation instruction is acquired; and the target video generation module 560 generates the target video according to the existing target video segment. During the actual capturing, that is, when the corresponding video segment is acquired, the capturing itself is not treated differently according to a video capturing mode, but whether the video segment is adjusted is determined according to different video capturing modes after the video segment is obtained, so that there is no requirement on the performance of the hardware device performing the capturing, and the implementation solution is low in cost, fast and simple, thereby improving the flexibility for the user in capturing and processing the video, and the user experience.

In one embodiment, on the basis of the above-mentioned solutions, the video capturing pause instruction may be triggered by the user or by determining whether the length of capturing time reaches the predetermined capturing time threshold.

In one embodiment, on the basis of the above-mentioned solutions, being triggered by determining whether the length of capturing time reaches the predetermined capturing time threshold includes a step described below. Whether a length of a captured video reaches the predetermined capturing time threshold is determined, and if the length reaches the predetermined capturing time threshold, the video capturing pause instruction is triggered. The length of the captured video includes a length of one captured video segment or a total length of a plurality of captured video segments.

In one embodiment, on the basis of the above-mentioned solutions, the apparatus may further include a special effect instruction determination module configured to determine whether a special effect instruction is acquired. The video segment generation module 520 may include a video segment generation unit. The video segment generation unit is configured to: if the special effect instruction is acquired, perform the video capturing on the target scene according to the special effect instruction and the video capturing instruction until the video capturing pause instruction is acquired, and obtain the video segment between the video capturing instruction and the video capturing pause instruction.

In one embodiment, on the basis of the above-mentioned solutions, the apparatus may further include an edit instruction determination module and a target video processing module. The edit instruction determination module is configured to determine whether an edit instruction is acquired. The target video processing module is configured to: if the edit instruction is acquired, process the target video according to the edit instruction to obtain the processed target video.

In one embodiment, the apparatus further includes a storage mode instruction determination module and a target video storage module. The storage mode instruction determination module is configured to determine whether a storage mode instruction is acquired, and the storage mode instruction may include a draft box instruction or an issuing instruction. The target video storage module is configured to store the processed target video according to the storage mode instruction if the storage mode instruction is acquired.

In one embodiment, the apparatus may further include a video play instruction determination module and a target video play module. The video play instruction determination module is configured to determine whether a video play instruction is acquired. The target video play module is configured to play the processed target video according to the video play instruction if the video play instruction is acquired.

The video processing apparatus provided by the embodiment of the present disclosure can execute the video processing method provided by any embodiment of the present disclosure, and has functional modules and effects corresponding to the execution method.

Figure 7:
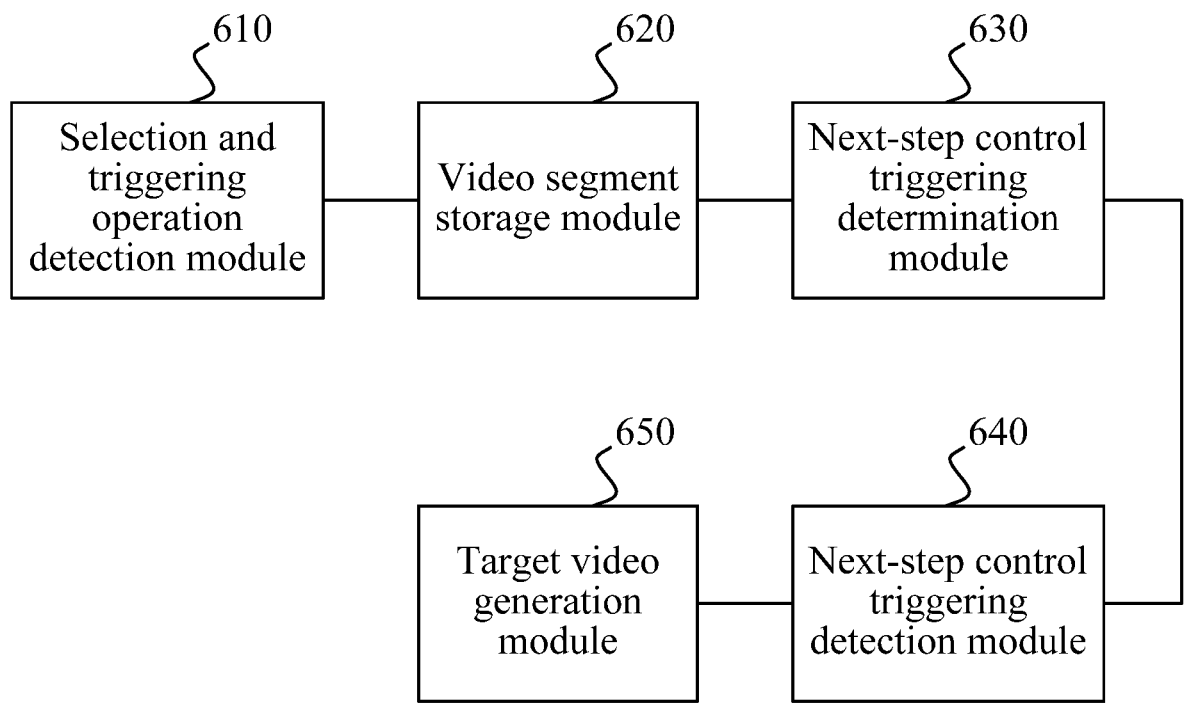
FIG. 7 is a structural diagram of another video processing apparatus according to an embodiment of the present disclosure.

FIG. 7 is a structural diagram of another video processing apparatus according to an embodiment of the present disclosure. This embodiment may be applied to a case where a difficulty of video processing is reduced. The apparatus may be implemented in software and/or hardware, and the apparatus can be configured in a terminal device, such as a mobile phone and/or a tablet computer. As shown in FIG. 7, the apparatus includes a selection and triggering operation detection module 610, a target video segment storage module 620, a next-step control triggering determination module 630, a next-step control triggering detection module 640 and a target video generation module 650.

The selection and triggering operation detection module 610 is configured to detect a selection operation on a video capturing mode control and a triggering operation on a video capturing control of a target interface.

The target video segment storage module 620 is configured to display a target scene on the target interface until a release operation on the video capturing control is detected, store a corresponding target video segment according to a video capturing mode determined by the video capturing mode control, and display the video capturing mode control and the video capturing control of the target interface, where a target video segment in a different video capturing mode corresponds to a different number of video frames in unit time.

The next-step control triggering determination module 630 is configured to determine whether a triggering operation on a next-step control of the target interface is detected.

The next-step control triggering detection module 640 is configured to: in response to determining that the triggering operation on the next-step control of the target interface is not detected, repeatedly store a corresponding target video segment according to a video capturing mode determined by the video capturing mode control in response to the selection operation on the video capturing mode control, the triggering operation on the video capturing control, and the release operation on the video capturing control being detected until the triggering operation on the next-step control of the target interface is detected.

The target video generation module 650 is configured to jump to a video storage interface and display a result that an existing target video segment is synthesized to obtain a target video.

In the solutions of this embodiment, the selection operation on the video capturing mode control and the triggering operation on the video capturing control of the target interface are detected through the selection and triggering operation detection module 610; the target video segment storage module 620 displays the target scene on the target interface until the release operation on the video capturing control is detected, stores the corresponding target video segment according to the video capturing mode determined by the video capturing mode control, and displays the video capturing mode control and the video capturing control on the target interface, where target video segment in a different video capturing mode corresponds to a different number of video frames in unit time; the next-step control triggering determination module 630 determines whether the triggering operation on the next-step control of the target interface is detected; if the next-step control triggering detection module 640 does not detect the triggering operation on the next-step control of the target interface, the corresponding target video segment is repeatedly stored according to the video capturing mode determined by the video capturing mode control in response to the selection operation on the video capturing mode control, the triggering operation on the video capturing control, and the release operation on the video capturing control being detected until the triggering operation on the next-step control of the target interface is detected; and the target video generation module 650 jumps to the video storage interface and displays the result that the existing target video segment is synthesized to obtain the target video. During the actual capturing, that is, when the corresponding video segment is acquired, the capturing itself is not treated differently according to a video capturing mode, but whether the video segment is adjusted is determined according to different video capturing modes after the video segment is obtained, so that there is no requirement on the performance of the hardware device performing the capturing, and the implementation solution is low in cost, fast and simple, thereby improving the flexibility for the user in capturing and processing the video, and the user experience.

In one embodiment, on the basis of the above-mentioned solutions, the target video segment storage module 620 is further configured to display a progress bar. If the progress bar is completely displayed, the video storage interface is jumped to and the result that the existing target video segment is synthesized to obtain the target video is displayed.

In one embodiment, on the basis of the above-mentioned solutions, the apparatus may further include a special effect control selection operation detection module configured to detect a selection operation on the special effect control of the target interface. The target video segment storage module 620 is configured to implement displaying the target scene on the target interface in a mode described below. A target scene on which the selected special effect control is superposed is displayed on the target interface.

In one embodiment, on the basis of the above-mentioned solutions, the apparatus may further include a video edit interface jump module and a video storage mode interface jump module. The video edit interface jump module is configured to jump to the video edit interface, and the video edit interface may include an edit control and a next-step control. The video storage mode interface jump module is configured to: if the selection operation on the edit control is detected, process the target video according to the selected edit control, and take the processed target video as the target video; and if the triggering operation of the user on the next-step control of the video edit interface is detected, jump to the video storage mode interface, and the video storage mode interface may include the storage mode control.

In one embodiment, on the basis of the above-mentioned solutions, the apparatus may further include a video presentation module interface jump module.

The video presentation module interface jump module is configured to: when the selection operation on the storage mode control is detected, jump to the video presentation mode interface and display the storage result of the target video, where the storage mode control may include the draft box control and the issuing control.

In one embodiment, on the basis of the above-mentioned solutions, the apparatus may further include a target video play module configured to when the triggering operation on the work control of the user home page interface is detected, jump to a video play interface and play the target video.

The video processing apparatus provided by the embodiment of the present disclosure can execute the video processing method provided by any embodiment of the present disclosure, and has functional modules and effects corresponding to the execution method.

Figure 8:
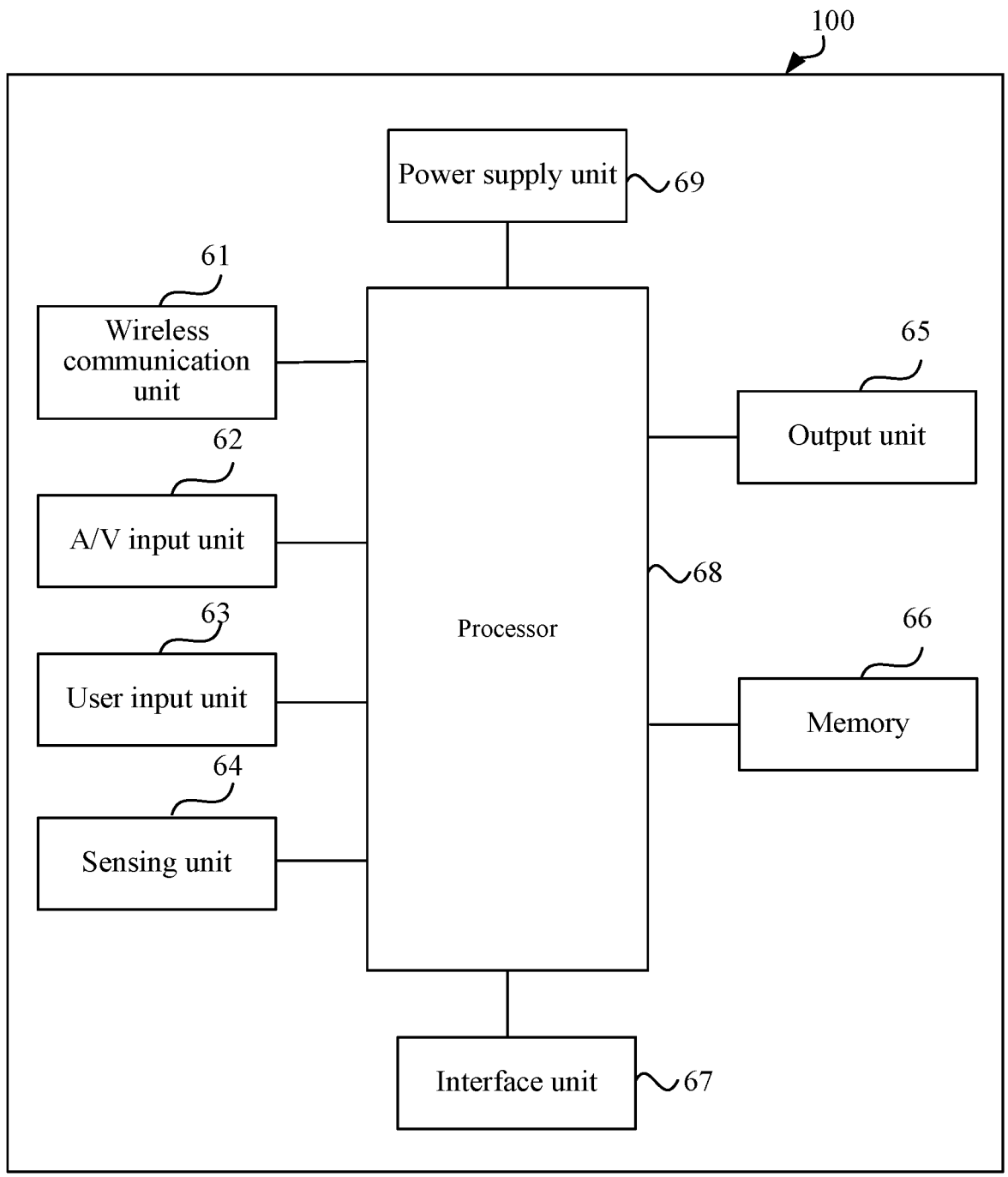
FIG. 8 is a structural diagram of a terminal device according to an embodiment of the present disclosure.

FIG. 8 is a schematic diagram of a hardware structure of a terminal device according to an embodiment of the present disclosure. The terminal device may be implemented in various forms. The terminal device in the present disclosure may include, but is not limited to, a mobile terminal device such as a mobile phone, a smart phone, a notebook computer, a digital broadcast receiver, a personal digital assistants (PDA), a portable android device (PAD), a portable multimedia player (PMP), a navigation apparatus, a vehicle-mounted terminal device, a vehicle-mounted display terminal, a vehicle-mounted electronic rearview mirror and the like, and a fixed terminal device such as a digital television (TV), a desktop computer and the like.

As shown in FIG. 8, the terminal device 100 may include a wireless communication unit 61, an audio/video (A/V) input unit 62, a user input unit 63, a sensing unit 64, an output unit 65, a memory 66, an interface unit 67, a processor 68, a power supply unit 69, and the like. FIG. 8 shows a terminal device having a variety of components. However, it is not required to implement all shown components, and more or fewer components may be implemented instead.

In one embodiment, the wireless communication unit 61 allows radio communication between the terminal device 100 and a wireless communication system or network. The A/V input unit 62 is configured to receive an audio signal or a video signal. The user input unit 63 may be configured to generate key input data according to a command input by the user to control at least one operation of the terminal device. The sensing unit 64 is configured to detect a current state of the terminal device 100, a position of the terminal device 100, the presence or absence of user's touch input to the terminal device 100, an orientation of the terminal device 100, acceleration or deceleration movement and direction of the terminal device 100, and the like; and generate a command or signal for controlling the operation of the terminal device 100. The interface unit 67 serves as an interface through which at least one external apparatus can be connected to the terminal device 100 for communication. The output unit 65 is configured to provide an output signal in a visual, audio, and/or tactile manner. The memory 66 may be configured to store software programs for processing and controlling operations performed by the processor 68 and the like, or may temporarily store data that has been output or will be output. The memory 66 may include at least one type of storage medium. In addition, the terminal device 100 may cooperate with a network storage apparatus that performs a storage function of the memory 66 through a network connection. The processor 68 generally controls an overall operation of the terminal device. In addition, the processor 68 may include a multimedia module configured to reproduce or play back multimedia data. The processor 68 can perform pattern recognition processing so as to recognize handwriting input or picture drawing input performed on a touch screen as characters or images. The power supply unit 69 receives external or internal power under the control of the processor 68 and provides appropriate power required to operate at least one element and component.

The processor 68 is configured to execute at least one functional application and data processing by running a program stored in the memory 66, for example, implement the video processing method provided by any embodiment of the present disclosure. For example, the processor 68 implements steps described below when executed. The video capturing mode instruction and the video capturing instruction are acquired. The video capturing is performed on the target scene according to the video capturing instruction until the video capturing pause instruction is acquired, and the video segment between the video capturing instruction and the video capturing pause instruction is obtained. Whether to adjust the video segment is determined according to the video capturing mode instruction and the corresponding target video segment is obtained. The target video segment in a different video capturing mode corresponds to a different number of video frames in unit time. Whether the video generation instruction is acquired is determined. If the video generation instruction is not acquired, the video capturing mode instruction, the video capturing instruction and the video capturing pause instruction are repeatedly acquired to obtain the corresponding target video segment until the video generation instruction is acquired. The target video is generated according to the existing target video segment.

Another video processing method provided by the embodiment of the present disclosure may further be implemented. For example, the processor 68 implements steps described below when executes the program. The selection operation on the video capturing mode control and the triggering operation on the video capturing control of the target interface are detected. The target scene are displayed on the target interface until the release operation on the video capturing control is detected, the corresponding target video segment is stored according to the video capturing mode determined by the video capturing mode control, and the video capturing mode control and the video capturing control are displayed on the target interface, where the target video segment in a different video capturing mode corresponds to a different number of video frames in unit time. Whether the triggering operation on the next-step control of the target interface is detected is determined. If the triggering operation on the next-step control of the target interface is not detected, the corresponding target video segment is repeatedly stored according to the video capturing mode determined by the video capturing mode control when the selection operation on the video capturing mode control, the triggering operation on the video capturing control, and the release operation on the video capturing control are detected until the triggering operation on the next-step control of the target interface is detected. The video storage interface is jumped to and the result that the existing target video segment is synthesized to obtain the target video is displayed.

An embodiment of the present disclosure further provides a computer-readable storage medium configured to store computer programs for implementing the video processing method provided by any embodiment of the present disclosure when executed by a processor. For example, when the computer programs are executed, the processor implements steps described below. The video capturing mode instruction and the video capturing instruction are acquired. The video capturing is performed on the target scene according to the video capturing instruction until the video capturing pause instruction is acquired, and the video segment between the video capturing instruction and the video capturing pause instruction is obtained. Whether to adjust the video segment is determined according to the video capturing mode instruction and the corresponding target video segment is obtained. The target video segment in a different video capturing mode corresponds to a different number of video frames in unit time. Whether the video generation instruction is acquired is determined. If the video generation instruction is not acquired, the video capturing mode instruction, the video capturing instruction and the video capturing pause instruction are repeatedly acquired to obtain the corresponding target video segment until the video generation instruction is acquired. The target video is generated according to the existing target video segment.

Another video processing method provided by the embodiment of the present disclosure may further be implemented. For example, the processor implements steps described below when executes the program. The selection operation on the video capturing mode control and the triggering operation on the video capturing control of the target interface are detected. The target scene are displayed on the target interface until the release operation on the video capturing control is detected, the corresponding target video segment is stored according to the video capturing mode determined by the video capturing mode control, and the video capturing mode control and the video capturing control are displayed on the target interface, where the target video segment in a different video capturing mode corresponds to a different number of video frames in unit time. Whether the triggering operation on the next-step control of the target interface is detected is determined. If the triggering operation on the next-step control of the target interface is not detected, the corresponding target video segment is repeatedly stored according to the video capturing mode determined by the video capturing mode control when the selection operation on the video capturing mode control, the triggering operation on the video capturing control, and the release operation on the video capturing control are detected until the triggering operation on the next-step control of the target interface is detected. The video storage interface is jumped to and the result that the existing target video segment is synthesized to obtain the target video is displayed.

The computer storage medium of embodiments of the present disclosure may adopt any combination of one or more computer readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or component, or any combination thereof. More specific examples of the computer-readable storage media include (non-exhaustive list): an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination thereof. In the present disclosure, the computer-readable storage medium may be any tangible medium including or storing a program. The program may be used by or used in conjunction with an instruction execution system, apparatus or component.

The computer-readable signal medium may include a data signal propagated on a base band or as a part of a carrier wave, and carries computer-readable program codes. Such propagated data signals may take multiple forms including, but not limited to, electromagnetic signals, optical signals, or any suitable combination thereof. The computer-readable signal medium may further be any computer-readable medium other than a computer-readable storage medium. The computer-readable medium may send, propagate or transmit the program used by or used in conjunction with the instruction execution system, apparatus or component.

The program codes included in the computer-readable medium may be transmitted by using any suitable medium, including, but not limited to, wireless, wire, optical cable, radio frequency (RF), and the like, or any suitable combination thereof.

Computer program codes for performing the operations of the present disclosure may be written in one or more programming languages or combination thereof, including object-oriented programming languages such as Java, Smalltalk, C++, Ruby, Go, as well as conventional procedural programming languages such as "C" or similar programming languages. The program codes may be entirely executed on a user computer, partially executed on the user computer, executed as an independent software package, partially executed on the user computer and partially executed on a remote computer, or entirely executed on the remote computer or a server. In a case related to the remote computer, the remote computer may be connected to the user computer via any kind of network including a local area network (LAN) or a wide area network (WAN), or may be connected to an external computer (for example, be connected via the Internet by using an Internet service provider).

What is claimed is:

1. A video processing method, comprising:
    acquiring a video capturing mode instruction and a video capturing instruction;
    performing video capturing on a target scene according to the video capturing instruction until a video capturing pause instruction is acquired, and obtaining a video segment between the video capturing instruction and the video capturing pause instruction; wherein a video segment in a different video capturing mode corresponds to a same capturing speed;
    determining whether to adjust the video segment between the video capturing instruction and the video capturing pause instruction according to the video capturing mode instruction: in response to determining to adjust the video segment between the video capturing instruction and the video capturing pause instruction, adjusting the video segment between the video capturing instruction and the video capturing pause instruction and taking the adjusted video segment as a corresponding target video segment, wherein a number of video frames in unit time of the video segment between the video capturing instruction and the video capturing pause instruction is different from a number of video frames in unit time of the corresponding target video segment, and a target video segment in a different video capturing mode corresponds to a different number of video frames in unit time; and in response to determining not to adjust the video segment between the video capturing instruction and the video capturing pause instruction, taking the video segment between the video capturing instruction and the video capturing pause instruction as a corresponding target video segment, wherein the number of video frames in unit time of the video segment between the video capturing instruction and the video capturing pause instruction is the same as the number of video frames in unit time of the corresponding target video segment;

determining whether a video generation instruction is acquired;

in response to determining that the video generation instruction is not acquired, repeatedly acquiring the video capturing mode instruction, the video capturing instruction and the video capturing pause instruction to obtain a corresponding target video segment until the video generation instruction is acquired; and generating a target video according to an existing target video segment.

2. The method of claim 1, wherein the video capturing pause instruction is triggered by a user or by determining whether a length of capturing time reaches a predetermined capturing time threshold.

3. The method of claim 2, wherein the video capturing pause instruction being triggered by determining whether the length of the capturing time reaches the predetermined capturing time threshold comprises:

determining whether the length of the captured video reaches the predetermined capturing time threshold, and triggering the video capturing pause instruction in response to determining that the length of the captured video reaches the predetermined capturing time threshold, wherein the length of the captured video comprises a length of one captured video segment or a total length of a plurality of captured video segments.

4. The method of claim 3, wherein before performing the video capturing on the target scene according to the video capturing instruction until the video capturing pause instruction is acquired, and obtaining the video segment between the video capturing instruction and the video capturing pause instruction, the method further comprises:

determining whether a special effect instruction is acquired; and wherein performing the video capturing on the target scene according to the video capturing instruction until the video capturing pause instruction is acquired, and obtaining the video segment between the video capturing instruction and the video capturing pause instruction comprises:

in response to determining that the special effect instruction is acquired, performing the video capturing on the target scene according to the special effect instruction and the video capturing instruction until the video capturing pause instruction is acquired, and obtaining the video segment between the video capturing instruction and the video capturing pause instruction.

5. The method of claim 2, wherein before performing the video capturing on the target scene according to the video capturing instruction until the video capturing pause instruction is acquired, and obtaining the video segment between the video capturing instruction and the video capturing pause instruction, the method further comprises:

determining whether a special effect instruction is acquired; and wherein performing the video capturing on the target scene according to the video capturing instruction until the video capturing pause instruction is acquired, and obtaining the video segment between the video capturing instruction and the video capturing pause instruction comprises:

in response to determining that the special effect instruction is acquired, performing the video capturing on the target scene according to the special effect instruction and the video capturing instruction until the video capturing pause instruction is acquired, and obtaining the video segment between the video capturing instruction and the video capturing pause instruction.

6. The method of claim 1, wherein before performing the video capturing on the target scene according to the video capturing instruction until the video capturing pause instruction is acquired, and obtaining the video segment between the video capturing instruction and the video capturing pause instruction, the method further comprises:

determining whether a special effect instruction is acquired; and wherein performing the video capturing on the target scene according to the video capturing instruction until the video capturing pause instruction is acquired, and obtaining the video segment between the video capturing instruction and the video capturing pause instruction comprises:

in response to determining that the special effect instruction is acquired, performing the video capturing on the target scene according to the special effect instruction and the video capturing instruction until the video capturing pause instruction is acquired, and obtaining the video segment between the video capturing instruction and the video capturing pause instruction.

7. The method of claim 1, wherein after generating the target video according to the existing target video segment, the method further comprises:

determining whether an edit instruction is acquired; and in response to determining that the edit instruction is acquired, processing the target video according to the edit instruction to obtain a processed target video.

8. The method of claim 7, wherein after in response to determining that the edit instruction is acquired, processing the target video according to the edit instruction to obtain the processed target video, the method further comprises:

determining whether a storage mode instruction is acquired, wherein the storage mode instruction comprises a draft box instruction or an issuing instruction; and in response to determining that the storage mode instruction is acquired, storing the processed target video according to the storage mode instruction.

9. The method of claim 8, wherein after in response to determining that the storage mode instruction is acquired, storing the processed target video according to the storage mode instruction, the method further comprises:
  determining whether a video play instruction is acquired; and
  in response to determining that the video display instruction is acquired, playing the processed target video according to the video display instruction.

10. The method of claim 1, wherein after generating the target video according to the existing target video segment, the method further comprises:
  determining whether an edit instruction is acquired; and
  in response to determining that the edit instruction is acquired, processing the target video according to the edit instruction to obtain a processed target video.

11. A terminal device, comprising:
  at least one processor; and
  a memory, configured to store at least one program;
  wherein the at least one program is configured to, when executed by the at least one processor, cause the at least one processor to implement the method of claim 10.

12. A non-transitory computer-readable storage medium, configured to store computer programs, wherein the computer programs are configured to, when executed by a processor, implement the method of claim 10.

13. A non-transitory computer-readable storage medium, configured to store computer programs, wherein the computer programs are configured to, when executed by a processor, implement the method of claim 1.

14. A video processing method, comprising:
  detecting a selection operation on a video capturing mode control and a triggering operation on a video capturing control of a target interface;
  displaying a target scene on the target interface until a release operation on the video capturing control is detected to obtain a video segment, storing the video segment between the triggering operation and the release operation as a corresponding target video segment according to a video capturing mode determined by the video capturing mode control, and displaying the video capturing mode control and the video capturing control on the target interface, wherein a target video segment in a different video capturing mode corresponds to a different number of video frames in unit time; the video segment in a different video capturing mode corresponds to a same capturing speed, and a number of video frames in unit time of the video between the triggering operation and release operation is different from or the same as a number of video frames in unit time of the corresponding target video segment according to the video capturing mode;
  determining whether a triggering operation on a next-step control of the target interface is detected;
  in response to determining that the triggering operation on the next-step control of the target interface is not detected, repeating the step of storing the corresponding target video segment according to the video capturing mode determined by the video capturing mode control, in response to detecting the selection operation on the video capturing mode control, the triggering operation on the video capturing control, and the release operation on the video capturing control, until the triggering operation on the next-step control of the target interface is detected; and
  jumping to a video storage interface and displaying a result that an existing target video segment is synthesized to obtain a target video.

15. The method of claim 14, wherein when displaying the target scene on the target interface, the method further comprises:
  displaying a progress bar; and
  in response to detecting that the progress bar is completely displayed, jumping to the video storage interface and displaying the result that the existing target video segment is synthesized to obtain the target video.

16. The method of claim 14, wherein before detecting the triggering operation on the video capturing control, the method further comprises:
  detecting a selection operation on a special effect control of the target interface; and
  wherein displaying the target scene on the target interface comprises:
  displaying a target scene in which a selected special effect control is superposed on the target interface.

17. The method of claim 14, wherein after jumping to the video storage interface and displaying the result that the existing target video segment is synthesized to obtain the target video, the method further comprises:
  jumping to a video edit interface, wherein the video edit interface comprises an edit control and the next-step control;
  in response to detecting a selection operation on the edit control, processing the target video according to a selected edit control, and taking the processed target video as the target video; and
  in response to detecting a triggering operation on the next-step control of the video edit interface, jumping to a video storage mode interface, wherein the video storage mode interface comprises a storage mode control.

18. The method of claim 17, wherein after jumping to the video storage mode interface, the method further comprises:
  in response to detecting a selection operation on the storage mode control, jumping to a video presentation mode interface and displaying a storage result of the target video, wherein the storage mode control comprises a draft box control and an issuing control.

19. The method of claim 18, wherein after jumping to the video presentation mode interface and displaying the storage result of the target video, the method further comprises:
  in response to detecting a triggering operation on a work control of a user home page interface, jumping to a video playing interface and playing the target video.

20. A terminal device, comprising:
  at least one processor; and
  a memory, configured to store at least one program;
  wherein the at least one program is configured to, when executed by the at least one processor, cause the at least one processor to implement the following steps:
  acquiring a video capturing mode instruction and a video capturing instruction;
  performing video capturing on a target scene according to the video capturing instruction until a video capturing pause instruction is acquired, and obtaining a video segment between the video capturing instruction and the video capturing pause instruction; wherein a video segment in a different video capturing mode corresponds to a same capturing speed;
  determining whether to adjust the video segment between the video capturing instruction and the video capturing pause instruction according to the video capturing mode instruction: in response to determining to adjust the video segment between the video capturing instruction and the video capturing pause instruction, adjusting the video segment between the video capturing instruction and the video capturing pause instruction and taking the adjusted video segment as a corresponding target video segment, wherein a number of video frames in unit time of the video segment between the video capturing instruction and the video capturing pause instruction is different from a number of video frames in unit time of the corresponding target video segment, and a target video segment in a different video capturing mode corresponds to a different number of video frames in unit time; and in response to determining not to adjust the video segment between the video capturing instruction and the video capturing pause instruction, taking the video segment between the video capturing instruction and the video capturing pause instruction as a corresponding target video segment, wherein the number of video frames in unit time of the video segment between the video capturing instruction and the video capturing pause instruction is the same as the number of video frames in unit time of the corresponding target video segment;

determining whether a video generation instruction is acquired;

in response to determining that the video generation instruction is not acquired, repeatedly acquiring the video capturing mode instruction, the video capturing instruction and the video capturing pause instruction to obtain a corresponding target video segment until the video generation instruction is acquired; and generating a target video according to an existing target video segment.

* * * * *